United States Patent [19]
Okuda et al.

[11] Patent Number: 5,639,322
[45] Date of Patent: Jun. 17, 1997

[54] JOINING METHOD FOR JOINING ELECTRICALLY CERAMIC BODIES

[75] Inventors: Kouji Okuda, Kobe; Tokumitsu Nishi, Osaka; Hisakiyo Hoshino, Settsu; Hiroshi Takai, Nishinomiya; Natsumi Miyake, Toyonaka, all of Japan

[73] Assignee: Daihen Corporation, Osaka, Japan

[21] Appl. No.: 282,976

[22] Filed: Jul. 29, 1994

Related U.S. Application Data

[62] Division of Ser. No. 836,305, filed as PCT/JP91/00561, Apr. 25, 1991, Pat. No. 5,368,623.

[30] Foreign Application Priority Data

| Jun. 28, 1990 | [JP] | Japan | 2-170955 |
| Jul. 9, 1990 | [JP] | Japan | 2-181276 |
| Oct. 26, 1990 | [JP] | Japan | 2-290032 |

[51] Int. Cl.$^6$ .................. B32B 31/20; B32B 31/06
[52] U.S. Cl. .................. 156/64; 156/274.4; 156/274.8; 156/275.7; 156/304.3; 156/358; 156/368
[58] Field of Search .................. 156/89, 274.4, 156/274.8, 275.7, 272.2, 358, 360, 368, 380.9, 64, 304.3

[56] References Cited

U.S. PATENT DOCUMENTS

| 3,779,446 | 12/1973 | Lemelson | 228/15 |
| 3,883,369 | 5/1975 | Badger et al. | 156/380.9 |
| 4,050,956 | 9/1977 | de Bruin et al. | 148/6 |
| 4,420,352 | 12/1983 | Schroeder et al. | 156/89 |
| 4,486,257 | 12/1984 | Ebata et al. | |
| 4,515,651 | 5/1985 | Maclaughlin | 156/380.9 |
| 4,652,318 | 3/1987 | Masuda et al. | 156/89 |
| 4,724,020 | 2/1988 | Ebata et al. | 156/52 |
| 4,943,928 | 7/1990 | Campbell et al. | 156/379.6 |
| 5,035,045 | 7/1991 | Bowen | 156/380.9 |
| 5,045,137 | 9/1991 | Gyarmati | 156/59 |

FOREIGN PATENT DOCUMENTS

| 1136927 | 9/1962 | Germany | 156/379.6 |
| 59-25754 | 6/1984 | Japan . | |
| 62-283879 | 12/1987 | Japan . | |
| 0362217 | 7/1962 | Switzerland | 156/308.4 |
| 925488 | 5/1963 | United Kingdom . | |

OTHER PUBLICATIONS

Y. Ebata, et al., *Electrical Joining of Silicon Nitride Ceramics*, Jan. 1989, pp. 83–85.

*Primary Examiner*—David A. Simmons
*Assistant Examiner*—M. Curtis Mayes
*Attorney, Agent, or Firm*—Scully, Scott, Murphy and Presser

[57] ABSTRACT

The present invention relates to a joining method, a joining apparatus and a joining agent capable of joining two bodies to be jointed in a large size or in a complicated shape in a good joining condition. Specially, the present invention is to provide an improvement in a control of the current supplying method applicable for the electrically heating of the ceramic bodies or a joining agent in an electric conduction (a elecrode switching type due to a plurality of fixed electrodes and a switching control type between two kinds of the electric power sources), a control method of a auxiliary heating, a control of the holding apparatus (the control by the free thermal expansion at the pre-heating, a adaption of a balance mechanism and a measurement of the displacement), the adjustment of the shape at the butted portion (improvement of the pipe joint structure) and a joining agent superior in the joining strength.

5 Claims, 37 Drawing Sheets

| switching | electrode | elapsed time | |
|---|---|---|---|
| | | 0 ~ 5 min. | 5 ~ 20 min. |
| | | holding time (ms) | holding time (ms) |
| 1 | 4a - 4c | 70 constant | 30 constant |
| 2 | 4b - 4d | | |
| 3 | 4c - 4e | | |
| 4 | 4d - 4f | | |
| 5 | 4e - 4g | | |
| 6 | 4f - 4h | | |
| 7 | 4g - 4a | | |
| 8 | 4h - 4b | | |
| 9. after | repeated as above | | |

| switching sequence | pattern 1 electrode | pattern 2 electrode | pattern 3 electrode | pattern 4 electrode |
|---|---|---|---|---|
| 1 | 41-42 | 41-44 | 41-44 | 41-44 |
| 2 | 42-43 | 42-45 | 43-46 | 44-47 |
| 3 | 43-44 | 43-46 | 45-48 | ⋮ |
| ⋮ | ⋮ | ⋮ | ⋮ | ⋮ |
| n-1 | 4(N-1)-4N | 4(N-1)-42 | 4(N-3)-4N | 4(N-4)-4N |
| n | 4N-41 | 4N-43 | 4(N-1)-42 | 4N-43 |
| after n+1 | repeated as above | repeated as above | repeated as above | repeated as above |

| switching sequence | electrode | | | |
|---|---|---|---|---|
| | pattern 1 | pattern 2 | pattern 3 | pattern 4 |
| 1 | 41-41' | 41-42' | 41-42' | 41-41' |
| 2 | 42-42' | 42-43' | 42-41' | 41-42' |
| 3 | 43-43' | 43-44' | 42-43' | 42-42' |
| 4 | : | : | 43-42' | 42-43' |
| : | : | : | : | : |
| n-1 | 4(N-1)-4(N-1)' | 4(N-1)-4N' | : | : |
| n | 4N-4N' | 4N-41' | : | : |
| after n+1 | repeated as above | repeated as above | : | : |
| : | | | : | : |
| 2n-2 | | | 4N-41' | 4(N-1)-4(N-1)' |
| 2n-1 | | | 41-4N | 4N-4N' |
| 2n | | | repeated as above | 4N-41' |
| after 2n+1 | | | | repeated as above |

| switching sequence | electrode pattern 1 | pattern 2 | pattern 3 | pattern 4 |
|---|---|---|---|---|
| 1 | 91-91' | 91-91' | 91-92' | 91-91' |
| 2 | 92-92' | 92-92' | 92-93' | 91-92' |
| 3 | 93-93' | 93-93' | 93-94' | 92-92' |
| 4 | : | : | : | 92-93' |
| : | : | : | : | : |
| n+1 | 9(N-1)-9(N-1)' | 9(N-1)-9(N-1)' | 9(N-1)-9N' | : |
| n | 9N-9N' | 9N-9N' | 9N-9(N-1)' | : |
| n+1 | repeated as above | 9(N-1)-9(N-1)' | 9(N-1)-9(N-2)' | : |
| : | | : | : | : |
| : | | : | : | : |
| 2n-3 | | 93-93' | 93-92' | (n-1)-(n-1)' |
| 2n-2 | | 92-92' | 92-91' | (n-1)-n' |
| 2n-1 | | repeated as above | repeated as above | n-n' |
| : | | | | n-(n-1)' |
| : | | | | (n 1)-(n-1)' |
| : | | | | : |
| : | | | | 3-2' |
| : | | | | 2-2' |
| 4n-4 | | | | 2-1' |
| 4n-3 | | | | repeated as above |

| switching sequence | electrode | | |
|---|---|---|---|
| | group G1 | group G2 | group G3 |
| 1 | 11-11' | 21-21' | 31-31' |
| 2 | 12-12' | 22-22' | 32-32' |
| 3 | 13-13' | 23-23' | 33-33' |
| ⋮ | ⋮ | ⋮ | ⋮ |
| l | ⋮ | ⋮ | 3L-3L' |
| m | ⋮ | 2M-2M' | repeated as above |
| n | 1N 1N' | repeated as above | |
| after n+1 | repeated as above | | |

Fig. 11

| switching sequence | electrode | energizing control apparatus |
|---|---|---|
| 1 | 11-11´ | 1 |
| 2 | 12-12´ | |
| : | : | |
| n | 1N-1N´ | |
| n+1 | 21-21´ | 2 |
| : | : | |
| n+m | 2M-2M´ | |
| n+m+1 | 31-31´ | 3 |
| | 32-32´ | |
| : | : | |
| n+m+l | 3L-3L´ | |
| n+m+l+1 | repeated as above | |

Fig. 12

| switching sequence | electrode | | |
|---|---|---|---|
| | control apparatus 1 | control apparatus 2 | control apparatus 3 |
| 1 | 11-11´ | 21-21´ | 31-31´ |
| 2 | 12-12´ | 22-22´ | 32-32´ |
| : | : | : | : |
| n | 1N-1N´ | 2M-2M´ | 3L-3L |
| n+1 | 21-21´ | 31-31´ | 11-11 |
| : | : | : | : |
| 2n | 2M-2M´ | 3L-3L´ | 1N-1N´ |
| 2n-1 | 31-31´ | 11-11´ | 21-21´ |
| : | : | : | : |
| 3n | 3L-3L´ | 1N-1N´ | 2L-2L´ |
| 3n+1 | repeated as above | repeated as above | repeated as above |

| switching sequence | electrode |
|---|---|
| 1 | 11-11', 21-21', 31-31' |
| 2 | 12-12', 22-22', 31-32' |
| ⋮ | |
| n | 1N-1N', 2M-2M', 3L-3L' |
| n+1 | repeated as above |

Fig. 17

| switching sequence | electrode | elapsed time | |
|---|---|---|---|
| | | 0~10 min. | 10~25 min. |
| | | holding time (ms) | holding time (ms) |
| 1 | 9a-9a' | 70 | 50 |
| 2 | 9a-9b' | 50 | 30 |
| 3 | 9b-9b' | 70 | 50 |
| 4 | 9b-9c' | 50 | 30 |
| 5 | 9c-9c' | 70 | 50 |
| 6 | 9c-9d' | 50 | 30 |
| 7 | 9d-9d' | 70 | 50 |
| 8 | 9d-9f' | 50 | 30 |
| 9 | 9f-9f' | 70 | 50 |
| after 10 | repeated as above | | |

Fig. 18 (A)
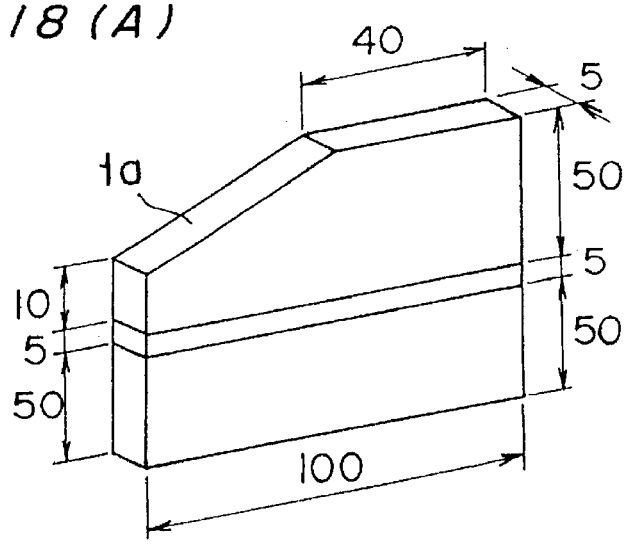
Fig. 18 (B)
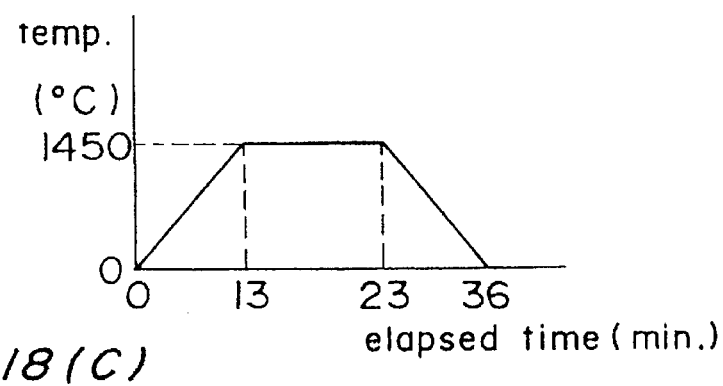
Fig. 18 (C)
| switching sequence | electrode | holding time |
|---|---|---|
| 1 | 9a – 9a´ | 50 msec |
| 2 | 9a – 9b´ | 55 |
| 3 | 9b – 9b´ | 60 |
| 4 | 9b – 9c´ | 65 |
| 5 | 9c – 9c´ | 70 |
| 6 | 9c – 9d´ | 75 |
| 7 | 9d – 9d´ | 80 |
| 8 | 9d – 9f´ | 80 |
| 9 | 9f – 9f´ | 80 |
| after 10 | repeated as above | |

| power (KW) | 0~1.5 | 1.5 | | 1.5~0 |
|---|---|---|---|---|
| holding time (ms) | 120 | | 60 | |
| elapsed time (min.) | 0~7 min. | 7~9 min. | 9~12 min. | 12~15 min. |
| switching sequence | electrode | electrode | | electrode |
| 1 | 41-43 | 41-45 | | 41-45 |
| 2 | 42-44 | 42-46 | | 42-46 |
| 3 | 43-45 | 43-47 | | 43-47 |
| : | : | : | | : |
| : | : | : | | : |
| 9 | 49-41 | 49-43 | | 49-43 |
| 10 | 40-42 | 40-44 | | 40-44 |
| after 11 | repeated as above | | | |

| power (A) | 0~1.6 | | 1.6~1.1 | | 1.1~0 | |
|---|---|---|---|---|---|---|
| holding time (ms) | 60 constant | | | | | |
| elapsed time (min.) | 0~2 | | 2~3 | 3~12 | 12~15 | 15~18 |
| control device | 5A | 5B | 5A | 5B | 5A | 5B |
| switching sequence | | | | | | |
| 1 | 4a-4b | 4g-4h | 4a-4c | 4g-4i | 4a-4d | 4g-4j |
| 2 | 4b-4c | 4h-4i | 4c-4e | 4i-4k | 4d-4g | 4j-4a |
| 3 | 4c-4d | 4i-4j | 4e-4g | 4k-4a | repeated as above | |
| 4 | 4d-4e | 4j-4k | repeated as above | | | |
| 5 | 4e-4f | 4k-4l | | | | |
| 6 | 4f-4g | 4l-4a | | | | |
| after 7 | repeated as above | | | | | |

Fig. 25

| switching sequence | pattern 1 | pattern 2 | pattern 3 | pattern 4 |
|---|---|---|---|---|
| 1 | A1.B1 — a1.b1 | A1.B1 — a1.b1 | A1.B1 — a2.b2 | A1.B1 — a1.b1 |
| 2 | A2.B2 — a2.b2 | A2.B2 — a2.b2 | A2.B2 — a3.b3 | A1.B1 — a2.b2 |
| 3 | A3.B3 — a3.b3 | A3.B3 — a3.b3 | A3.B3 — a4.b4 | A2.B2 — a2.b2 |
|  | : | : | : | A2.B2 — a3.b3 |
|  | : | : | : | A3.B3 — a3.b3 |
|  | : | : | : | : |
|  | : | : | : | A(N-1) — aN |
|  | : | : | : | B(N-1) — bN |
| n | AN.BN — aN.bN | AN.BN — aN.bN | A(N-1) — aN<br>B(N-1) — bN | AN.BN — aN.bN |
| n+1 |  | A(N-1) — a(N-1)<br>B(N-1) — b(N-1) | AN — a(N-1)<br>BN — b(N-1) | AN — a(N-1)<br>BN — b(N-1) |
|  |  | : | : | : |
|  |  |  |  | A3.B3 — a3.b3 |
|  |  | A3.B1 — a3.b3 |  | A3.B3 — a2.b2 |
|  |  | A2.B2 — a2.b2 | A3.B3 — a2.b2 | A2.B2 — a2.b2 |
| 2n |  | A1.B1 — a1.b1 | A2.B2 — a1.b1 | A2.B2 — a1.b1 |
| after 2n+1 |  | repeated as above | repeated as above | repeated as above |

Fig. 27

| switching sequence | patetrn 1 | pattern 2 | pattern 3 |
|---|---|---|---|
| 1 | A1-a1 | A1-a1 | A1-a2 |
| 2 | A2-a2 | A2-a2 | A2-a3 |
| ⋮ | ⋮ | | ⋮ |
| n | AN-aN | AN-aN | A(N-1)-aN |
| n+1 | B1-b1 | BN-bN | B1-b2 |
| n+2 | B2-b2 | ⋮ | B2-b3 |
| | ⋮ | B2-b2 | ⋮ |
| 2n | BN-bN | B1-b1 | B(N-1)-bN |
| 2n+1 | C1-c1 | C1-c1 | C1-c2 |
| 2n+2 | C2-c2 | C2-c2 | C2-c3 |
| | ⋮ | | ⋮ |
| 3n | CN-cN | CN-cN | C(N-1)-cN |
| after 3n+1 | repeated as above | repeated as above | repeated as above |

Fig. 31

| switching sequence | electrode | holding time | elapsed time |
|---|---|---|---|
| 1 | A1-a1 | 70msec | 0~5 min. |
| 2 | A1-a2 | | |
| 3 | A2-a2 | | |
| 4 | A2-a3 | | |
| 5 | A3-a3 | | |
| 6 | A3-a4 | | |
| 7 | A4-a4 | | |
| 8 | A4-a5 | | |
| 9 | A5-a5 | 50msec | 5~35 min. |
| 10 | A5-a6 | | |
| 11 | A6-a6 | | |
| 12 | A6-a7 | | |
| 13 | A7-a7 | | |
| 14 | A7-a8 | | |
| 15 | A8-a8 | | |
| 16 | A8-a1 | | |
| after 17 | repeated as above | | |

Fig. 32(A)
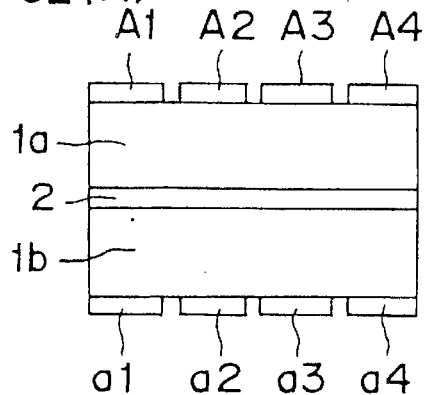
Fig. 32(B)
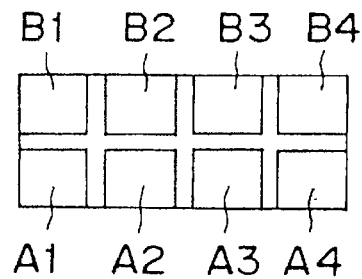
Fig. 32(C)
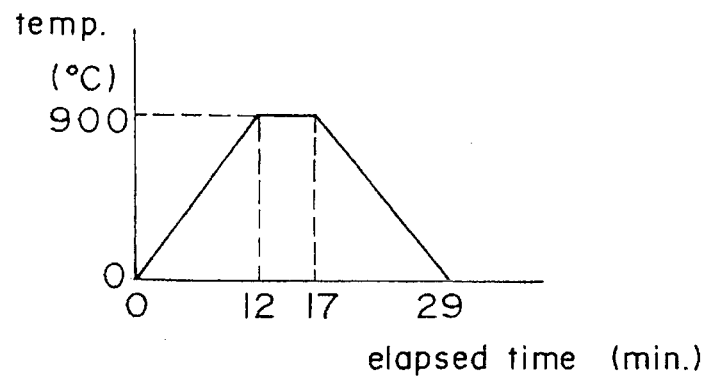
Fig. 33
| switching sequence | electrode | holding time |
|---|---|---|
| 1 | A1-a1 | |
| 2 | A2-a2 | |
| 3 | A3-a3 | |
| 4 | A4-a4 | 50msec |
| 5 | A5-a5 | |
| 6 | A6-a6 | |
| 7 | A7-a7 | |
| 8 | A8-a8 | |
| after 9 | repeated as above | |

Fig. 36

| switching sequence | electrode | elapsed time 0~5 min. holding time | 5~29 min. holding time |
|---|---|---|---|
| 1 | A1-a | 70msec | 50msec |
| 2 | A2-a | | |
| 3 | A3-a | | |
| 4 | A4-a | | |
| 5 | A5-a | | |
| 6 | A6-a | 100msec | 70msec |
| 7 | A7-a | | |
| 8 | A8-a | | |
| 9 | A9-a | | |
| 10 | A10-a | | |
| after 11 | repeated as above | | |

JOINING METHOD FOR JOINING ELECTRICALLY CERAMIC BODIES

This is a divisional of application Ser. No. 07/836,305, filed on Feb. 28, 1992, now U.S. Pat. No. 5,368,673 International Application PCT/JP91/00560, filed on Apr. 25, 1991 and which designated the U.S.

BACKGROUND OF THE INVENTION

1. Field of the Invention

The present invention relates to an improvement of a joining method for joining two ceramic bodies in a large size or in a complicated shape by heating electrically a butted portion to be jointed with, as main heat source, Joule heat caused by supplying electric current to the portion to be jointed, and more particularly to an improved joining method applicable for a method described below (a joining method to supply electric current to a ceramic body or a joining agent having an electric conductivity at a high temperature to complete the joining process).

2. Discussion of the Prior Art

A conventional joining method for joining electrically ceramic bodies is divided into the following four groups:

(A) A method which joins ceramic bodies by supplying electric current to the ceramic bodies or a joining agent having an electric conductivity at a high temperature. In this case, a joining agent is inserted at butted planes to be jointed between the ceramic bodies to form a butted portion and the portion is preheated with an auxiliary heating method by using a gas burner or a preheating means. After the ceramic bodies or the joining agent is in an electric conduction, the electric voltage is applied across at least two electrodes attached to the butted portion to be jointed to flow electric current through the electric conductive ceramic body or the joining agent at a high temperature. As a result, the plane to be jointed is heated with the Joule heat caused by the electric current flowing through the conductive ceramic body or the joining agent, and a reaction between the joining agent and the ceramic body is carried out to complete the joining.

(B) A method for joining ceramic bodies at least one of which has an electric conductivity at room temperature by permitting an electric current to flow through the electric conductive ceramic body in parallel to portion to be jointed.

A joining agent is inserted between the ceramic bodies at least one of which has an electric conductivity at room temperature. The ceramic body having an electric conductivity has two electrodes or an electrode in a belt form linked thereto at the vicinity of the butted portion and is supplied the electric current to the conductive ceramic body for heating the vicinity of the butted portion by Joule heat. As a result, the joining agent reacts with the ceramic bodies to join the butted planes of the ceramic bodies.

(C) A joining method in which an inserting member for heating having an electric conduction at room temperature is inserted between planes to be jointed of two ceramic bodies and is heated by an electric current flowing in parallel to the butted planes to be jointed.

(a) The inserting member for heating is composed of an electrically conductive ceramic body having the joining agents attached to the both surfaces thereof and is inserted into the butted planes to be jointed between ceramic bodies of an insulating property or of a high electrical resistance. The both terminal surfaces of the inserting member for heating are linked with at least two electrodes or an electrode in a belt form and are heated by an electric current flowing in parallel to the butted planes to be jointed. The Joule heat generated by the electric current heats the butted portion and executes the reaction between the joining agent and the ceramic bodies to complete the joining.

(b) The inserting member for heating to be heated is composed of an electric conductive ceramic base laminated by an insulating ceramic layer and is inserted into the butted planes to be jointed of ceramic bodies, at least one of which is in an electric conduction or between a metal body and a ceramic body in such an arrangement of facing the insulating ceramic layer to the electric conductive body to be jointed. The electric conductive ceramic of the inserting member for heating has at least two electrodes or a belt form electrode linked to the both terminals thereof and is heated by an electric current flowing in parallel to the butted planes to be jointed. The Joule heat generated by the electric current heats the butted portion and executes the reaction between the joining agent and planes of the ceramic bodies to complete the joining thereof.

(D) A method which joins bodies to be jointed having an electric conductivity at room temperature by permitting an electric current to flow in a direction crossing the butted planes to be jointed.

(a) A joining agent is inserted into butted planes to be jointed between ceramic bodies having an electric conductivity or between an electric conductive ceramic body and a metal body. The ceramic bodies having an electric conductivity or the electric conductive ceramic body and the metal body are provided with two electrodes, respectively and are heated an electric current flowing in a direction to cross the butted planes to be jointed. The Joule heat generated by the electric current heats the butted portion and executes the reaction between the joining agent and the planes of bodies to be jointed to complete the joining thereof.

(b) Butted portion to be jointed between electric conductive ceramic bodies or an electric conductive ceramic body and a metal body is formed by setting an inserting member for heating, has an electric conductivity less than that of the electric conductive ceramic body, there between with a joining agent. The two bodies to be jointed are connected with two electrodes, respectively and are heated by an electric current flowing in a direction to cross from one to another butted planes to be jointed. The Joule heat generated by the electric current heats the butted portion and executes the reaction between the joining agent and the bodies to be jointed to complete the joining thereof.

SUMMARY OF THE INVENTION

A butted portion to be jointed can be heated uniformly by fixing electrodes or by using electrodes in a decreased number when the bodies to be jointed are in a small size or in a simple shape. In connection with a joining method for joining materials in a large size having a large joining length (or a long joint portion) or in a complicated shape of the joint portion, the following joining methods are proposed: (1) A method for joining by making a relative movement between electrodes and joining materials with a suitable moving means. (2) A method for joining by linking a plurality of electrodes or an electrode in a belt form to an electric conducive material along with butted portion to be jointed and by applying voltage to all of the plurality of electrodes at the same time to heat the butted portion (Japanese Patent Publication (unexamined) 1989-176282). In connection with a method (1), in order to heat uniformly the butted portion to be jointed, the method requires moving means for moving the electrodes or ceramic bodies in a high speed and results in a high cost and a necessity for a large space for installing the equipment. In addition, the movable portion for joining require a many times of maintenance and a special care of the safety. In addition, in order to heat the butted portion to be jointed up to a necessary temperature in case of a low electric resistance of the materials to be jointed, this method requires that an electric current in a large range flows from the electrodes to the ceramic bodies and accordingly requires the contact resistance as low as possible. On the other hand, the contact between the electrodes and the ceramic bodies becomes poor with the movement of the electrodes or the ceramic bodies. This causes an arc to generate easily at the electrode contact area and thus the ceramic bodies to be damaged or degraded.

On the other hand, a method (2) is to supply electric current to all of the butted portion to be jointed at the same time and has a problem to have an electric power source in a large capacity which results in a high cost. When the joining process is executed with ceramic bodies having a complicated shape or asymmetry shape, the electric resistance and the heat capacity between the electrodes in the butted portion to be jointed are different from a position to a position. Therefore, when all of the butted portion to be jointed are heated by an electric current flowing to at the same time, a local over-heating occurs to result in the poor joining property. This limits the shape and the size of the ceramic bodies applicable for this joining method. Therefore, it has been long expected to achieve a joining method or an apparatus for joining the ceramic bodies in a good condition by preventing the problems such as a poor joining property, a high cost and a poor safety caused by a movable portion and a simultaneous current supplying of all of the butted portion to be jointed according to the prior art.

An object of the present invention is to improve the conventional above methods (A) to (D) wherein the butted portion of the two bodies to be jointed, at least one of which is a ceramic body, is formed by inserting a joining agent between butted planes (which are two planes to be jointed of the two bodies to be jointed to each other in accordance with the specification of the present invention), or by inserting an conductive ceramic based inserting member for heating combined with joining agents into the butted planes to be jointed and the joining agent is heated with the Joule heat to cause a reaction between the joining agent and the bodies to be jointed for completion of the joining process and, therefore, is to provide a joining method capable of joining bodies to be jointed in a large size or in a complicated shape by means of a switching manner.

A joining method for joining by carrying out a relative movement between the electrodes and the bodies to be jointed has been previously practiced at a constant value of the movement speed and/or a constant value of the electric current at all position of the butted portion. When the two ceramic bodies are in a large size or in a complicated shape or has a thickness of the butted portion in a direction of supplying electric current different from position to position along with a longitudinal direction (a relative movement direction between the butted portion and two electrodes) or a long length of the butted portion to be jointed along with the longitudinal direction, it is difficult to achieve the joining in a good condition. The reason is considered as follows:

(1) Under above condition a heat capacity differs from position to position at the butted portion to be jointed. When the joining is carried out at a constant value of electric current or electric power and a relative movement speed, the joining agent at a position which meets to requirements of a good condition can be melt sufficiently. In connection with the butted portion to be jointed in a shape shown in FIG. 38 (A), the joining agent can be melt insufficiently at the portion where the butted portion to be jointed is in a large thickness in a direction of supplying electric current, and the ceramic body to be jointed decomposes and sublimates portionially at the position where the butted portion to be jointed is in a short distance in a direction of supplying electric current and generates the heat in an excessively large amount. The decomposition and sublimation may sometimes damages the ceramic body.

(2) In a case when the butted portion to be jointed is uniform in the thickness in a longitudinal direction and the two ceramic bodies have simple and the same shapes as each other, the butted portion to be jointed, which is in a large length along with longitudinal direction, is not uniform in the heat diffusion coefficient between the center and the terminal. This causes the poor joining at the terminals of the butted portion to be jointed. The heat diffusion coefficient is a ratio of the heat diffusion amount at an arbitrary position to that of a standard position. When a positions of preheating means and electrodes are in a relation dependent on each other, the terminals of the butted portion to be jointed have a large coefficient of heat diffusion which results in the generation of the poor joining because the butted portion to be jointed can not be kept all the time in the pre-heating state.

A second object of the present invention is aimed at a joining method for joining electrically two ceramic bodies which are different in the heat capacitance and the heat diffusion coefficient from each other by melting the joining agent under making a relative movement between the butted portion to be jointed and at least two electrodes. The joining method of the second object is able to join electrically the above of ceramic bodies in a good condition by heating uniformly all of the butted planes to be jointed at a desired joining temperature.

In an operation to join bodies to be jointed at least one of which is a ceramic material by heating electrically, there is a case in which the joining agent, the inserting member for heating or the ceramic body to be jointed has a high negative temperature dependence of electric resistance. The case requires an electric power source in a high voltage and a high electric current, that is, in a high electric capacitance. This results in a high cost and a high input power kVA and accordingly in a decrease in the power efficiency and in a high running cost.

When the ceramic bodies having a poor resistance to thermal shock are joined, it is necessary to adjust the temperature with a control of an electric current in a small range at the initial current-flowing stage. In a case of requirement to control the electric current in a wide range from a small value to a large value, as mentioned above, the electric power source in an unit output type has a difficulty to control exactly an electric current in a small range. The execution over the difficulty needs a high cost for the electric power source.

Therefore, in order to achieve a decrease in the cost of the electric power source, a third object of the present invention is to provide a method for controlling the output power of an electric power source, which is suitable for joining electrically ceramic bodies in a large size or in a complicated shape.

The problem mentioned above relates to an electric apparatus. In addition, there is the following problem relating to the joining apparatus for use in joining ceramic bodies in a large size or in a complicated shape. It has been reported that the method to join ceramic bodies in a large size or in a complicated shape with a local heating can be achieved by supplying electric current to the joining agent inserted into the butted portion to be jointed or an electric conductive ceramic body. In a joining method to supply current and heat the joining agent or ceramic body having an electric conduction at a high temperature, the butted portion to be jointed is heated with a gas flame in a fixed heat amount in order to provide the joining agent or ceramic body with the electric conductivity. After a main heating is over, the ceramic body is cooled naturally with the flame stifled. Even in such an auxiliary heating with a fixed heat amount, the influence on the thermal shock is small in cases of using a ceramic body in a shape having no sharp corner to generate the concentrated stress, a ceramic body in a small size or a ceramic body in a higher resistance to the thermal shock such as $Si_3N_4$ ceramic body. In such cases, there is no problem of cracking during pre-heating or cooling. However, there is a problem to generate the crack due to the thermal stress at the initial stage of pre-heating, when the used ceramic body is a ceramic body in a low resistance to the thermal shock such as $Al_2O_3$, a ceramic body having a sharp corner, or a ceramic body in a large size. Further, there is a problem to generate the crack due to the thermal stress at the initial stage of natural cooling under erasing the gas flame after the main heating by means of the current supplying there to.

A fourth object of the present invention is to provide a joining method for joining bodies to be jointed in a large size or in a complicated shape to obtain an excellent joint under decreasing the thermal shock.

When two bodies to be jointed are to be joined at a high accuracy, a joining agent layer 4003 is inserted into the butted planes to be jointed of the two bodies to be jointed 4001 and 4002 and is heated into a melt and cooled for joining the two bodies to be jointed 4001 and 4002. In this case, the two bodies to be jointed 4001 and 4002 are held with a ceramic body holding equipment having two clamp jigs 4004 and 4005.

The joining agent layer 4003 is prepared by drying the joining agent in a paste form applied to the butted planes to be jointed of the bodies to be jointed, by forming the joining agent in a sheet form or by cutting the sintered joining agent lump into a desired thickness. The most preferable way for executing the joining method is that the butted planes to be jointed of the two bodies to be jointed are parallel to each other and the joining layer 4003 is uniform in the thickness. Such a structure makes it possible to heat uniformly all of the butted planes to be jointed to suppress the decrease in the joint strength and also to join accurately the two bodies to be jointed with a straight line (in a way to make the axial lines of the two bodies to be jointed coincident to each other). As a practical matter, it is rather difficult and expensive to make the thickness of the joint layer 4003 uniform. As a result, the joint layer 4003 is inclined as a practical matter. With the joining layer 4003 having the thickness decreased from one side to another side as shown in FIG. 55 (B) in an enlargement manner, the two bodies to be jointed 4001 and 4002 are joined in a curved line. Even when the joining agent layer 4003 is in a uniform thickness, an use of inclined planes to be jointed of the bodies to be jointed 4001 and 4002 results in the curved joining line as shown in FIG. 55(c).

A fifth object of the present invention is to provide a holding device for use in joining two bodies to be jointed at a straight line even when the bodies to be jointed have a joining agent layer in a heterogenous thickness but butted planes to be jointed not parallel to each other. Further, the object is to also provide a holding apparatus which is able to join correctly two bodies to be jointed through the joint layer in a uniform thickness by the modification of the non-uniformity during joining process even when the two bodies to be jointed are provided with the joining agent layer having a non-uniform thickness as long as the butted portion to be jointed are parallel to each other.

In a case of preparing a ceramic pipe joint by joining two ceramic bodies in around pipe form having no flat plane at the outside periphery in a way that the axial lines of the two ceramic bodies cross to each other, the ceramic pipe has a butted planes to be jointed in a three dimensional curve at the periphery thereof in a similar way to a preparation of a metal pipe joint. Then the two ceramic bodies are joined to each other by using a ceramic joining agent to obtain a ceramic pipe joint. However, it has been found that it is very difficult to form the ceramic body into a complicated three dimensional shape when compared with the metal case. Even when the two metal pipes have a large gap at the butted planes to be jointed, a welding material melts and fills the gap. Therefore, there is no problem with the metal pipe. However, when the ceramic pipes are joined to each other to prepare the ceramic joint, the butted planes to be jointed must be filled with the joining agent to satisfy various dimensional sizes. It is difficult to add additional joining agent during the joining process. Even if the gap can be filled with the joining agent, the joint is very poor in the strength. Accordingly, the three dimensional butted planes to be jointed of the bodies to be jointed requires very high accuracy.

A sixth object of the present invention is to provide a joining method for preparing, in a simple way, a ceramic pipe joint by joining two bodies to be jointed in a pipe form having no a flat plane on the outside periphery.

The problem to be solved as mentioned above is a common problem to all of the joining methods for joining electrically the two bodies to be jointed. Especially, in the (A) method is to join the two ceramic bodies by comprising steps of inserting a joining agent between the butted planes to be jointed of the two ceramic bodies, pre-heating the butted portion composed of the joining agent and a part of the two ceramic bodies adjacent to the joining agent, supplying electric current to the joining agent and melting the joining agent to react with the two ceramic bodies, in order to obtain the sufficiently high joint strength, it has been clearly necessary to carry out sufficiently the reaction between the molten joining agent and the two ceramic bodies and to make the joint layer as thin as possible. In this method, when the two ceramic bodies are merely lapped to each other, the light ceramic bodies produces a problem that the blow holes remain in the joint layer or the joint portion is inclined and slipt out. On the other hand, the heavy ceramic bodies causes the joining agent to be excluded from the butted planes to be jointed before the sufficient reaction between the joining agent and the planes to be jointed of two ceramic bodies. As a result, the butted planes to be jointed is not sufficiently heated and results in a poor joining strength. In order to solve these problems, the prior art has reported a method to control the distance between the butted planes to be jointed of the two ceramic bodies with a distance control mechanism or a method to press the two ceramic bodies, in a direction of joining the two ceramic bodies, with a pressing mechanism. (Japanese Patent Publication (examined) 1989-225583). As a practical matter, when the ceramic body is light, the lapped ceramic bodies during a pre-heating stage are pressed, in a direction to join the two ceramic bodies, by using the pressing mechanism. When the ceramic body is heavy, the distance control mechanism manages the upper ceramic body to be positioned at a given place and the distance between the butted planes of the two ceramic bodies to change to a given distance after the sufficient melting of the joining agent.

The technology described above is to restrict the free movement in the axis direction of ceramic body during the pre-heating stage. Accordingly, when the pre-heating and the electric heating at the later step causes the joining agent, the ceramic bodies to be jointed, a clamp jig for holding the ceramic body, the pressing mechanism linked to the jig and the linking portion of the distance control mechanism (linking bar and holding jig) to expand, the expanding amount is absorbed by the jig system comprising the clamp jig, the pressing mechanism, and the linking portion of the distance control mechanism. Hence, the jig system strains, and the strain amount increases with an increase in the thermal expansion coefficient of the materials (joining agent, ceramic body, jig and linking portion) and an increase in the size of longitudinal length. The strain due to the thermal expansion causes the jig system to damage. In addition, it is not possible to control exactly the distance control mechanism without knowing the strain amount. As a result, the distance between the planes to be jointed of two ceramic bodies is made smaller beyond necessity and the molten joining agent is pushed away from the planes to be jointed. This prevents the continuation of electric heating and causes the poor joint portion.

A seventh object of the present invention is to provide a joining method to decrease the effect of the thermal expansion of the ceramic body and jig and to produce a high joint strength at the joint portion between the two ceramic bodies.

The previous method according to Japanese Patent Publication 1989-225583 (examined) sets the apparent weight of the ceramic body placed on the upper position to zero when the ceramic body placed at the upper position is heavy. The resultant joint strength depends on the position control and the current supplying time. An error in the position control or the adjustment of the current supplying time causes a gap between the shrinked joining agent and the ceramic body placed at the upper position. This results in the generation of blow holes and a weak joint strength. Accordingly, in order to achieve the suitable position control, the previous method must carry out a lot of preliminary experiments and carry out the complicated calculation and control.

A eighth object of the present invention is to provide a method for joining two ceramic bodies, which is capable of tracing simply and surely the ceramic body placed at the upper position in accordance with the thickness variation due to the shrinkage of the molten joining agent, executing sufficiently the reaction between the molten joining agent and the two ceramic bodies, making the thickness of the joint layer as thin as possible and preventing the poor joining due to the excessive electrical heating.

In the (A) method can be achieved by an electric joining method for joining two ceramic bodies by applying a joining agent having an electric conductivity at a high temperature to the butted portion to be jointed of ceramic bodies, pre-heating the butted portion to be jointed with a gas flame, supplying an electric current to flow through the joining agent and heating the joining agent by Joule heat for a short time to join the two ceramic bodies, there is a problem that the joint formed by a joining agent comprising, as an electric conductive component, fluoride has not a sufficiently high strength. For example, the joining composition reported in the Japanese Patent Publication (examined) 1987-65986 includes fluoride (practically $CaF_2$) of 70 weight %. The large amount of 70 weight % of $CaF_2$ is resulted from the idea that the electric conductive component in a higher amount results in a better joining because the higher content of the electric conductive component make it possible to blow a stable current through the joining agent.

However, it has been clarified according to the present inventors that the higher amount of fluoride gives the joint strength at a high temperature a bad effect. For example, the joint strength at 1000° C. is only 20 MPa when silicon nitride ceramic is joined by using the joining agent consisting of 70 weight % of calcium fluoride. As a practical matter, the strength of 200 MPa at 1000° C. has been desirable.

Therefore, a ninth object of the present invention is to provide a joining agent to produce a joint characterized by a reproducible and stable formation and the high strength practically usable at a high temperature when the refractory ceramic such as silicon nitride is joined by the electric joining method.

Further, a tenth object of the present invention is to provide a joining agent to produce a joint characterized by a reproducible and stable formation and the high strength practically usable as described above when the refractory oxide ceramic is joined by the electric joining method.

It has been known that the joining agent including especially $CaF_2$ or NaF produces a good joint characterized by a reproducible and stable formation of the joint layer.

However, the conventional joining agent remains $Ca^{2+}$ or $Na^+$ ions at the joint portion. This causes the degradation of the properties at the joined joint. For example, in connection with the joint strength, $Ca^{2+}$ ion or $Na^+$ ion in the joint layer lowers the viscosity of the joint layer, which results in the decrease in the joint strength at a high temperature. For example, the joint strength at the joint of $Si_3N_4$ ceramic bodies decreases appreciably at a temperature higher than 1000° C.

Therefore, a eleventh object of the present invention is to provide a ceramic joining agent capable of improving the joining strength and a resistance to the corrosion of the ceramic body having a joint portion used as a structural material.

DISCLOSURE OF THE INVENTION

In order to achieve the above first object, the present invention is to provide a method for joining electrically two bodies to be jointed, in which a current-flowing member to be energized or be supplied with electric current for generating joule heat is composed of at least one of three groups of the bodies to be jointed, a joining agent and a inserting member for heating. The one member has at least three electrodes linked thereto at a given interval. The electric current supplying is carried out with at least one pair of electrodes selected in serial from the at least three electrodes in accordance with a given electrode switching pattern to move the current flowing area along with the butted portion to be jointed.

It is possible to arrange the at least three electrodes at a equivalent distance or a different distance in accordance with the shape of the butted portion to be jointed or the heat capacity of the heating area.

The inserting member for heating is composed of, as a basic material, an electrically conductive ceramic. It is possible to use, as an inserting member for heating, an electrically conductive ceramic having an insulating ceramic layer laminated to one or both surfaces thereof as shown in the Japanese Patent Publication (unexamined) 1989-320273 or (unexamined) 1989-320276.

As the electrically conductive ceramic, there can be examplified of an oxide ceramic such as lanthanum chromite, a nitride ceramic such as TiN and ZrN, a carbide ceramic such as SiC and TiC, a siliside ceramic such as $MoSi_2$, a boride ceramic such as $TiB_2$ and $ZrB_2$, a composite ceramic of an insulating ceramic such as $Al_2O_3$ and $Si_3N_4$ and a electric conductive ceramic such as TiN and ZrN and a composite ceramic of a said insulating ceramic and a metal.

There are various kinds of a combination of two bodies to be jointed such as a combination of two ceramic bodies in an insulating property, a combination of ceramic bodies having not an electrically conduction at room temperature but having an electrically conduction at a high temperature, a combination of ceramic bodies at least one of which is electrically conductive and a combination of a ceramic body and a metal body.

It is possible to use any method for supplying electric current to the member to generate Joul heat to heat the joining agent. For example, it is possible to permit the electric current to flow in a parallel direction or a crossing direction to the butted planes to be jointed from at least three electrodes.

An electrode switching pattern can be achieved by any pattern capable of moving the current-flowing area along with the butted portion to be jointed. Further, the electrode switching pattern is composed not only of one pattern but also of a plurality of electrode switching patterns from which a desired pattern is sequentially selected in accordance with a change in the condition of the butted portion to be jointed. The change in the condition of the butted portion to be jointed is referred to the change in the condition based on a temperature elevation at the butted portion to be jointed, a decrease in the electric resistance of the current flowing area or a change in the heat capacitance of the current flowing area.

It is possible to use an electrode switching pattern to carry out the current supplying at the shortest distance at the initial stage of the current supplying and then to increase the current-flowing distance step by step. The step by step method referred to herein includes one step. Further, it is possible to use an electrode switching pattern capable of carrying out the current supplying in which the previous current flowing area and the next current flowing area are overlapped partially to each other.

It is possible to use an electrode switching pattern to carry out the current supplying under the combination of the following two current supplying conditions. One (a) of the combination is that the butted portion to be jointed are uniformly heated by changing at least one of the electric current or power and the hold time in accordance with the condition at other current supplying position of the butted portion to be jointed. Another (b) is to decrease the thermal shock of the bodies to be jointed or to promote the reaction with the joining agent and the bodies to be jointed by changing at least one of the electric current or power and the hold time with the time passage in accordance with the predetermined temperature control pattern.

It is possible to divide at least three electrodes into a plurality electrode groups and to control each of the plurality of electrode groups in accordance with a given electrode switching pattern and a given current supplying condition, in addition to the collective control of all of at least three electrodes when the butted portion to be jointed is in a long size or in a complicated shape. In this case, the current-flowing distance between the electrodes can be changed with the condition the butted portion to be jointed. In case of the control for divided electrode groups, each of divided electrode groups can be controlled in the electric current with one current supplying control apparatus but can be controlled with an independent current supplying control apparatus attached to each of electrode groups. The control pattern of each of electrode groups is arbitrary.

The joining method according to the present invention is to supply electric current to sequentially at least three electrodes linked to the electrically conductive member and to move the current flowing area along with the butted portion to be jointed. Accordingly, the joining method according to the present invention does not require the relative movement between the electrodes and the bodies to be jointed and needs only few times of maintenance, which is resulted in a safety operation. A close contact between the electrodes and the current supplying member permits the high electric current to flow without the generation of the arc and does not cause the ceramic body to damage or to degrade. Moving the current flowing area along with the butted portion to be jointed makes it possible to heat the butted portion to be jointed in a long size to a desired temperature with an electric power source in a small capacity when compared with the conventional method to supply electric current to all of the butted portion to be jointed at the same time. When the two ceramic bodies having a complicated shape or a asymmetry shape are joined to each other, it is possible to heat uniformly every portion by controlling the current supplying condition in accordance with the change in the electric resistance between the electrodes and the heat capacity with the current supplying position. As a result, it is possible to prevent the local over-heating which occurs with the conventional joining method to supply electric current to all of the butted portion to be jointed at the same time. When the joining is carried out with the butted portion to be jointed of two ceramic bodies in a pipe form having a large diameter, in a plate form having a large length or in a complicated shape or an asymmetry shape, the method according to the present invention is very useful and is able to join the two bodies to be jointed by heating uniformly all of the butted portion to be jointed up to a desired temperature under a suitable heating pattern.

The joining method according to the present invention is to supply electric current under the suitable electrode pattern selected from the plurality of electrode switching patterns in accordance with the change in the condition of the butted portion to be jointed and is able to control the current supplying in a high efficiency and to join easily the bodies to be jointed having a complicated shape.

When the current-flowing member has an electric resistance decreasing with an increase in the temperature, the current supplying requires a high voltage at the initial current-flowing time because the butted portion to be jointed are in a low temperature and have a high electric resistance at the initial time. The butted portion to be jointed is in a high temperature and then the current flowing areas become to be of a low electric resistance. Accordingly, the current flowing distance area can be extended with the voltage the same as that of the initial time. A method of the present invention is to supply electric current to between the shortest distance at the initial time and to use the longer distance for the current flowing step by step under the electrode switching pattern, it is possible for an electric power source having a small capacity to heat the butted portion to be jointed up to a desired temperature.

In a case that the current supplying is carried out in a way that the previous current flowing area and the next current flowing area are over-lapped partially to each other, this method can execute the current supplying under making the electric resistance of the current flowing area as low as possible when compared with the case where the current flowing areas are no over-lapped. Accordingly, it is possible to move smoothly the current flowing area at a small variation in the voltage under suppressing the decrease in the temperature of the heated area.

The method according to the present invention can achieve the better joining by a combination of the electrode switching pattern and at least one of the current supplying conditions (a) and (b). An current supplying condition (a) is to make it possible to heat uniformly the butted portion to be jointed when the butted portion to be jointed shows a different temperature rising ratio or a different reducing ratio of the electric resistance at the current flowing area from position to position with the current supplying position in a similar way to that of the case when the two bodies to be jointed have a complicated shape. It is possible to heat uniformly the butted portion to be jointed in a high efficiency without changing the current-flowing distance due to the change in the selection of the electrode when one of the electric current, electric power and hold time is changed. For example, the butted portion to be jointed can be heated uniformly by changing the hold time in the following way under making the electrode switching pattern constant: The hold time at the initial current-flowing time is set to a relatively long time period. Then, the hold time is set to a short time period at the stable current flowing time after the reaction of the joining agent and the hold time is set to the time period as short as possible at the final stage. Further, the current supplying condition (b) is to change at least one of the electric current, electric power and hold time with the time passage in accordance with the predetermined temperature control pattern (heating speed, holding time for keeping the joint temperature and cooling speed) and accordingly is to reduce the thermal shock of the bodies to be jointed or to promote the reaction of the joining agent. The used temperature pattern can be determined by a preliminary experiment.

According to the method wherein at least three electrodes are divided into a plurality electrode groups and each of the plurality of electrode groups is controlled in accordance with the current supplying condition of a given electrode switching pattern, the butted portion to be jointed in a long size or in a complicated shape can be joined in a high efficiency and heated up to a desired temperature in a short time period.

According to the method wherein each of electrode groups is controlled with independent current supplying control apparatus, it is relatively easy to control each of electrode groups.

Further, the present invention is to provide a following method in order to achieve the second object to obtain a good joining condition by heating uniformly all of the butted portion to be jointed at the desired temperature even when the bodies to be jointed are in a complicated shape having a heat capacity and heat diffusion coefficient different from position to position:

The method according to the present invention is to control an electric energy supplied from the two electrodes to the butted portion to be jointed in accordance with the heat capacity of the two ceramic bodies at each position under consideration of the heat diffusion coefficient in order to heat uniformly all of the butted portion to be jointed at a desired temperature.

When the two ceramic bodies in a rectangular plate form and in sizes the same as each other are to be joined, the heat generated at each position becomes constant at the constant electric current because of a constant thickness of the butted portion to be jointed in a current flowing direction. However, the heat diffusion coefficient is different between the center portion and the terminal portion. It is necessary to increase the electric energy per unit area at the terminal portion and decrease the electric energy with a direction from the terminal to the center portion.

When the electric energy per unit area supplied from the two electrodes to the butted portion to be jointed is controlled in accordance with the heat capacity at each of position of the butted portion to be jointed under consideration of the heat diffusion coefficient, it is possible to supply a suitable electric energy to each portion of the butted portion to be jointed. As a result, the butted portion to be jointed can be uniformly heated at the desired temperature without an excess or a lack of heat to obtain a good joint even when the ceramic bodies are in a complicated shape or have a long portion to be jointed.

In accordance with the method of the present invention, it is possible to control simply the electric energy by changing at least one of the relative movement speed between the electrodes and the butted portion to be jointed and the electric power supplied to the electrodes or by changing at least one of relative movement speed and the electric current supplied to the electrodes.

In a case of necessity of an auxiliary heating, when the electrode for supplying elecric current is made movable independently from the auxiliary heating means in accordance with the method of the present invention, the electrode can be positioned near to the butted portion to be jointed and carry out supplying electric current under executing the auxiliary heating at the place available for the auxiliary heating.

The method of the present invention is to employ an output power control method for the electric power source which is used for joining the ceramic body and which switches an output of a high voltage and a low current into an output of a low voltage and a high current in accordance with either of the predetermined values of the electric current, voltage and temperature when the current supplying is carried out to at least one of a joining agent, a inserting member for heating and a ceramic body, at least one of which have a high negative temperature dependence of electric resistance. This makes it possible to reduce extremely the capacity of the electric power source when the ceramic bodies having a high negative temperature dependence of electric resistance. Further it is possible to provide, at a low cost, an electric power source capable of controlling exactly an electric current in a small range at the initial stage of the current supplying and an electric current in a large range at the final stage of joining when the ceramic bodies are in a low resistance to the thermal shock.

The following method can achieve the fourth object to prevent the generation of the cracking due to the thermal shock occurring with the bodies to be jointed in large size or in a complicated shape and to offer the joint in a good condition: The method relates to the three auxiliary heating methods which are carried out by controlling the plurality of auxiliary heating devices arranged around the butted portion to be jointed and/or the bodies to be jointed from the time before the initiating of the main heating to the time after the termination of the main heating when the bodies to be jointed one of which is a ceramic one are joined electrically. One method is to sequentially initiate or terminate differential the plurality of auxiliary heating devices. Another method is to increase or decrease the distance between the auxiliary heating devices and the butted portion to be jointed and/or the bodies to be jointed. A third method is to varies the output energy from the auxiliary heating devices. The auxiliary heating can be carried out by increasing or decreasing gradually the temperature of the butted portion to be jointed and/or the bodies to be jointed by using at least one of the above three methods.

In such a way to use the auxiliary heating to increase or decrease gradually the butted portion to be jointed and/or the bodies to be jointed, it is possible to lower the temperature gradient at the butted portion to be jointed and the bodies to be jointed in the pre-heating process before the starting of the main heating and to lower the temperature gradient at the butted portion to be jointed and the bodies to be jointed in the cooling process after the termination of the main heating. As a result, it is possible to reduce the thermal stress generated due to the temperature gradient at the ceramic body and the butted portion to be jointed.

A holding apparatus in the following structure can achieve the fifth object to join, in a straight line, the bodies to be jointed one of which is a ceramic one.

A holding apparatus according to the present invention provides a clamp angle displacing mechanism for displacing the angle of at least one clamp jig in a way to coincide the axes of the two bodies to be jointed to each other when the joining agent melts in connection with at least one clamp jig of the two clamp jigs.

Further, an apparatus according to the present invention provides a ceramic joining holding apparatus when two clamp jigs are arranged apart from each other in a vertical direction. The apparatus manages an upper clamp jig to hold the body to be jointed in a way that the axis of the bodies to be jointed is in a vertical line and provides the lower clamp jig with a clamp angle displacing mechanism which comprises a convex sphere plane positioned at the terminal of a non-clamp side portion of the lower clamp jig and a housing for supporting movably the convex sphere plane with a concave sphere plane corresponding to the convex sphere plane. The convex sphere plane and the concave sphere plane have a curvature which is determined in a manner that each radius centers of the spheres is positioned at a position where the vertical line and the butted portion to be jointed cross to each other.

Further, an apparatus according to the present invention provides a ceramic joining holding apparatus wherein two clamp jigs are arranged apart from each other in a vertical direction. The apparatus manages a lower clamp jig to hold the body to be jointed in a way that the axis of the body to be jointed is in a vertical line and provides the upper clamp jig with a clamp angle displacing mechanism which comprises a rotation supporting member for supporting rotatably the rotation center of the terminal of a non-clamp side portion of the upper clamp jig, a holding member for holding movably the rotation supporting member in a direction crossing the vertical line and an actuating means for actuating the rotation center of the rotation supporting member to be positioned on the vertical line.

Further, an apparatus according to the present invention provides a holding apparatus for joining bodies to be jointed wherein two holding jigs consisting of a clamp jig and a linking jig are arranged apart from each other in a horizontal direction. The apparatus fixes the linking jig in a way that the axis of the body to be jointed is positioned on the horizontal line and provides the clamp jig with a clamp angle displacing mechanism and a horizontal holding guide for guiding the two bodies to be jointed in a horizontal direction when the axes of the bodies to be jointed coincide to each other. The clamp angle displacing mechanism comprises a sphere holder positioned at the terminal of the non-clamp side portion, a sphere enveloped in the sphere holder and a sphere pressing member which is flexible and presses the sphere with a given pressure to the side of the sphere holder under being in contact with the sphere and which is capable of moving the clamp jig in a horizontal direction when the joining agent melts and solidifies.

Further, an apparatus according to the present invention provides a holding apparatus for joining bodies to be jointed wherein a pair of clamp jigs are arranged apart from each other in a horizontal direction. The apparatus comprises one of the clamp jigs with a clamp angle displacing mechanism in a fix side not to move in a horizontal direction. Another clamp jig is provided with a clamp angle displacing mechanism in a moving side and further a horizontal holding guide for guiding the two bodies to be jointed in a horizontal direction when the axes of the bodies to be jointed coincide to each other. The clamp angle displacing mechanism at the fixed side comprises a sphere holder positioned at the terminal of the non-clamp side portion, a sphere enveloped in the sphere holder and a sphere pressing member in contact with the sphere which is flexible. The clamp angle displacing mechanism at the moving side is in the same structure as that previously described.

Accordingly, when the joining agent layer is in a heterogeneous thickness (inclined) or when the butted planes to be jointed are inclined and not parallel to each other even with the uniform thickness of the joining agent layer, the holding apparatus comprising the clamp angle displacing mechanism is able to displace the angle of at least one clamp jig in a way that the two bodies to be jointed have the axes to coincide to each other. As a result, the two bodies to be jointed can be joined to each other in a straight line. When the two bodies to be jointed have the butted planes parallel to each other, the joining layer is of an uniform thickness and results in the highest joining strength.

Further, an apparatus according to the present invention manages the axes of the two bodies to be jointed to coincide to each other with the help of gravity when two clamp jigs are arranged apart from each other in a vertical direction. When one of the two bodies to be jointed is clamped with the upper clamp jig in a way that the axis of the body to be jointed is in a vertical line with the joining agent layer in a non-uniform thickness or with the butted planes not parallel to each other, another body to be jointed is arranged in a inclined position to the vertical line. When the joining agent is heated to melt, the convex sphere plane positioned at the terminal of the non-clamp side portion moves along with the concave sphere plane enveloped in the housing to change the axis angle of the lower clamp jig. At the final stage, the axes of the lower clamp jig coincides with the vertical line. As a result, the body to be jointed clamped by the lower clamp jig and another body to be jointed clamped by the upper clamp jig have the axes coincident to each other and then are joined to each other. When the curvatures of the convex sphere plane and the concave sphere plane are determined in such a way that the radius centers of the convex sphere plane and the concave sphere plane are positioned at the point where the vertical line and the butt planes of the two bodies to be jointed cross to each other, the axis of the lower clamp jig can be surely made coincident with the vertical line.

A holding apparatus according to the present invention comprises the upper clamp jig with a clamp angle displacing mechanism. In this case, the lower clamp jig is fixed in a way that the clamped body to be jointed has the axis coincident with a vertical line. When the joining agent is heated to melt, the butted plane of the body to be jointed positioned upward becomes free from the locking. The rotation supporting member for supporting rotatably the upper clamp jig with the actuating force of actuating means moves to cause the rotation center to be on the vertical line. Then the upper clamp jig rotates around the rotation center of the rotation supporting member in a way that the axis comes to be along with the vertical line with the action of gravity. As a result, the body to be jointed clamped by the lower clamp jig and another body to be jointed clamped by the upper clamp jig have the axes coincident to each other and then are joined to each other.

When the clamp jigs clamp the bodies to be jointed in a poor working size accuracy, the axis of the clamped bodies to be jointed sometimes do not coincide with the vertical line.

An apparatus according to the present invention is to make the axes of the two bodies to be jointed coincident to each other with the action of the gravity when two holding members consisting of a pair of clamp jigs are arranged apart from each other in a horizontal direction. Especially, an apparatus according to the present invention is very suitable for the body to be jointed in a good working size accuracy. When one of the two holding members is merely fixed, the holding member uses the linking jig in order to move smoothly one of the two bodies to be jointed at the joining step. When the joining agent layer is not in a uniform thickness, another body to be jointed having the joining agent applied thereto is arranged in a inclined position against axis of the one body to be jointed. Even when another body to be jointed is inclined, another body to be jointed can be held by rotating the sphere holder positioned at the terminal of another clamp jig at the non-clamp side around the sphere and by bending the flexible sphere pressing member. When the joining agents heated to melt, the butted plane of another body to be jointed is free from the locking. The rotation function between the sphere holder and the sphere, the action that the sphere pressing member permits another clamp jig to move in a horizontal direction and the action of the gravity causes the terminal positioned above another body to be jointed to move downward. Accordingly, another body to be jointed is held with a horizontal holding guide, and hence two bodies to be jointed are joined to each other in a way that the two bodies to be jointed have the axes coincident.

In the holding apparatus according to the present invention, the two bodies to be jointed linked to the linking jig must satisfy a given size accuracy for the working. On the other hand, the joining apparatus has a clamp angle displacing mechanism against the clamp jig at the fixing side and accordingly can join two bodies to be jointed, even if provided with to a poor size working. When both of clamp jigs at the fixing side and the moving side are provided with the clamp angle displacing mechanisms, the two bodies to be jointed can be joined to each other in a way that the axes of the two bodies to be jointed coincide to each other by only clamping the two bodies to be jointed in such a way that the butted portion to be jointed is positioned at the upper area. The operation during the joining is the same as that previously described.

The sixth object of the present invention is to join two ceramic bodies having no flat plane at the outside periphery as original shapes and being in a large size or in a complicated shape or to prepare easily a ceramic pipe joint and can be achieved by the following method in accordance with the present invention.

A flat plane is formed on the outside periphery of a first ceramic pipe by a flat plane making work and then a through-hole is formed on the flat plane by a hole making work. Next, a joining agent is inserted at butted planes between the flat plane of the first ceramic pipe and a butted plane of a second ceramic pipe. The first and second ceramic pipes are heated at the butted portion to be jointed having the joining agent inserted therein to be joined to each other. In such a way, the ceramic pipe joint can be prepared. The flat plane making work includes all of working methods known in the prior art such as a grinding method. The joining step can be executed by an electrically joining method or a furnace heating method known in the prior art.

In order to carry out easily the position determining work with the second ceramic pipe and not to produce the defective joint, the following steps of forming an engagement stair at the terminal of the flat plane side having the through hole and forming an engagement convex portion at a terminal of the butted plane of the second ceramic pipe. The engagement stair and the engagement convex portion are formed in a such a way that a gap is formed between the terminal plane of the engagement stair and the terminal plane of engagement convex portion at the matching state between the engagement stair and the engagement convex portion.

When two ceramic bodies are joined by an electric joining method, the size of the flat plane of the first ceramic body is determined in order to approach closely a joining torch to the butted portion to be jointed.

Therefore, it is possible to join the first and the second ceramic pipes at the flat planes when the flat plane is formed on the outside periphery of the first ceramic pipe. The flat plane work is simple and achieves a high accuracy when compared with a three dimensional work. Accordingly, it is possible to manufacture the ceramic joint in a short time, to decrease extremely the size error between the butted portion to be jointed and to obtain a sufficiently high strength. In addition, it is easy to achieve the position determination of the ceramic pipes for the arrangement of the joining agent when the engagement stair is formed at the terminal of the flat plane having the through-hole and the engagement convex portion is formed at the terminal where the butted plane of the second ceramic pipe is formed. The engagement stair and the engagement convex portion are formed in a such a way that a gap is formed between the terminal plane of the engagement stair and the terminal plane of engagement convex portion at the matching state between the engagement stair and the engagement convex portion. In such a case, even when the melting and reaction of the joining agent causes the volume shrinkage, the distance between the butted planes to be jointed of the two ceramic pipes can be decreased in accordance with the shrinkage and accordingly there is no defective joint.

Further, when the flat plane is made larger, it is possible to join surely with the electrically joining method because the joining torch can be positioned at the best position.

The seventh object of the present invention is to join two ceramic bodies in a large size or in a complicated shape under decreasing the effect of the thermal expansion of the ceramic body and the jig and to achieve the high strength of the joint and can be achieved by the following structure. An improved method aimed by the present invention comprises steps of inserting a joining agent between the butted planes to be jointed of the two ceramic bodies, pre-heating the butted portion to be jointed area comprising the joining agent and the partial of the two ceramic bodies at the vicinity of the joining agent layer, supplying current to the butted portion to be jointed to melt the joining agent and carrying out the reaction between the molten joining agent and the two ceramic bodies. The method is to join the two ceramic bodies by using a control mechanism comprising at least one of a distance control mechanism to control the distance between the butted planes to be jointed and pressing mechanism to press the two ceramic bodies in a direction of joining the two ceramic bodies. It is possible to use any control pattern for controlling the ceramic joining by using at least one of the distance control mechanism and the pressing mechanism. The joining method according to the present invention is characterized by that the two ceramic bodies are not locked in the axis direction of the ceramic bodies by the control mechanism until the initiation of the control by the control mechanism.

In order to eliminate surely the effect of the thermal expansion, the joining method of the present invention detects whether or not the joining agent and the two ceramic bodies to be jointed complete the saturation of the thermal expansion. After detection of the saturation of the thermal expansion, the control mechanism starts controlling the two ceramic bodies to be jointed.

In the joining method according to the present invention, the two ceramic bodies to be jointed are not fixed in an axial direction until the control mechanism starts controlling. Therefore, it is prohibited that the two ceramic bodies to be jointed are pressed by making the pressing mechanism to be in an operation state. Further, it is prohibited that the distance between the butted planes of the two ceramic bodies to be jointed are adjusted (including the case when the distance is kept constant) by making the distance control mechanism to be in an operation state. Accordingly, when the joining agent, the two ceramic bodies and the jig system expand with the thermal expansion caused by the pre-heating or the combination of the pre-heating and the heating by the current supplying, the expansion is not actually suppressed by the jig system. As a result, the clamp jig and the structural portion of the control mechanism do not generate the strain. This solves the problem occurring through the generation of the strain in the jig system caused by the expansion.

When the control mechanism starts the operation before the saturation of the expansion, the jig system is subjected to the strain in a smaller amount than that caused when the two ceramic bodies are fixed from the initial stage. Therefore, the joining method according to the present invention is to make the effect of the thermal expansion as low as possible by measuring the saturation of the expansion and by differential the control mechanism after the saturation of the expansion.

The eighth object of the present invention is to follow quickly the variation due to the shrink of the molten joining agent when two ceramic bodies in a large size or in a complicated shape are joined to each other and is achieved by the following method. A method for joining two ceramic bodies comprises the following steps of; inserting a joining agent between the butted planes of two ceramic bodies placed in a vertical direction, pre-heating a joint portion consisting of said joining agent and a portion of said two ceramic bodies at the vicinity of the joint, supplying current to said butted portion to melt said joining agent, moving downward the ceramic body placed at the upper position with the weight itself and an external load to be loaded to said two ceramic bodies, and joining the two ceramic bodies. When the ceramic body placed at the upper position has a relatively small weight (including the weight of jig system), the method mentioned above can decrease the distance between the butted planes to be jointed of two ceramic bodies in accordance with the shrinkage of the molten joining agent and in a way to prevent the generation of the blow holes.

When the two ceramic bodies are heavy, the method according to the present invention makes it possible to achieve the excellent joint layer by balancing the weight of the ceramic body placed at the upper position and a portion of the external load with a given balance load to transform the weight of the ceramic body and the load of the jig system into a small load. As a result, the apparent weight of the ceramic body placed at the upper position is decreased. The "external load" referred to here is a sum of the weight to be loaded on the upper ceramic which is consisting of a portion of the weight of clamp jig for holding the ceramic body and a portion of the weight of the mechanism linked to the clamp. The "balance load" is a load to be subtracted from the sum of the weight of the ceramic body placed at the upper position and the external load. The balance load can be realized by providing the ceramic body placed at the upper position and the jig system with an upward force (equivalent to the balance load) smaller than the sum of the weight of the ceramic body and the external load. The mechanism for making the balance load can be achieved by any arbitrary method practically available.

The method according to the present invention is to press the ceramic body placed at the upper position against the ceramic body placed at the lower position after the ceramic body placed at the upper position is moved down to a given position.

The method according to the present invention is to terminate the current supplying upon detection of the saturation of the displacement amount by detecting the displacement amount after initiation of the current supplying.

The method according to the present invention can decrease the apparent weight of the ceramic body placed at the upper position by balancing the weight of the ceramic body and the external load with the balance load even when the ceramic body placed at the upper position and the external load is heavy. In a joining method to move downward the ceramic body placed at the upper position by the gravity action, it is possible to move downward the ceramic body placed at the upper position in accordance with the shrinkage of the molten joining agent under executing the reaction between the molten joining agent and the two ceramic bodies only by changing the balance load in accordance with the weight of the ceramic body placed at the upper position. A simple preliminary experiment can determine the apparent weight of the ceramic body placed at the upper position and the external load. It is possible to determine the apparent weight as a load per unit area. The joint layer having a sufficiently high strength can be obtained with the two ceramic bodies having various weights and various areas to be jointed without doing many preliminary experiments. When the apparent weight of the ceramic body placed at the upper position is made low, it is not necessary to carry out a precise adjustment of the current supplying or electrically heating time.

In the method which comprises to press the ceramic body placed at the upper position against the ceramic body placed at the lower position at the final joining step, it is capable of expelling the gas included in the joint layer to form the joint layer in a high density and of correcting the inclined plane between the two ceramic bodies at the upper and lower positions.

The method according to the present invention is to prevent the excessive electric current supplying and to terminate to supply electric current upon detection of the saturation of the displacement amount by detecting the displacement amount after initiation of current supplying. The saturated displacement amount after current supplying means that the joining agent reacts sufficiently with the two ceramic bodies to be jointed to decrease sufficiently the thickness of joint layer. The further current supplying after the saturated displacement amount causes the excessive electric current supplying, although it is different due to the condition which makes the temperature of the butted portion higher than the necessary value. As a result, the ceramic material at the butted portion is portionally decomposed to form blow holes at the joint layer, which results in the defective joint. The method according to the present invention terminates the current supplying in accordance with the saturated displacement amount and is free from the problem in this kind.

The ninth object of the present invention is to provide a joining agent suitable for use in the electric joining method with the silicon nitride ceramic. The joining agent comprises, as a basic component, $CaF_2$ of 10 to 40 weight %, and the residual of $SiO_2$ and as an additives, at least one element of $Al_2O_3$ more than 10 weight % $Y_2O_3$ of 10 to 55 weight % and $Si_3N_4$ of 15 to 45 weight %.

In the above joining agent, $CaF_2$ more than 40 weight % makes the joining strength lower at a high temperature and $CaF_2$ less than 10 weight % makes the electric conductivity lower and causes the defective joint.

An use of aluminum oxide results in the following function: Al incorporated with Ca in the joint layer suppresses the action of Ca at a high temperature and increases the viscosity of the joint layer (softening temperature) to elevate the joining strength at a high temperature.

The minimum content of $Al_2O_3$ is more than 10 weight %. The content of $Al_2O_3$ less than 10 weight % can not achieve the above function mentioned above and decreases the joining strength at a high temperature.

The addition of silica $SiO_2$ is to promote the wetability to the ceramics and elevates the joining strength at room temperature and a high temperature when compared with a case having only $Al_2O_3$ incorporated. The decrease in the amount of $CaF_2$ can be compensated by the addition of $SiO_2$ in a similar way to the addition of $Al_2O_3$.

The incorporated $Y_2O_3$ enters the net work structure of silicate (silicate glass) at the joint layer and promotes the elastic coefficient at the joint layer. As a result, the joining agent with $Y_2O_3$ incorporated increases the joining strength over the joining agent without $Y_2O_3$. The higher amount of the additive $Y_2O_3$ does not results in the higher strength of the joint layer. An excess of Y element enters the joint layer (silicate glass) and destroys the net work structure of silicate to decrease the softening temperature, which is results in the decrease in the joining strength at a high temperature. The additive Y element reacts with the other component of the joining agent to increase the joint strength but the effect can be achieved by an addition of $Y_2O_3$ of 10 to 55 weight %.

The addition of $Si_3N_4$ makes the joint layer oxynitride and changes the thermal expansion coefficient close to that of the mother material and elevates the elastic coefficient. Accordingly, the strength at the joint layer is elevated at room temperature and at a high temperature. As a result, the joining agent with the additive $Si_3N_4$ increases the joint strength over that without additive $Si_3N_4$. An increase in the additive $Si_3N_4$ is not in a regular relation with the increase in the joint strength. An excess of additives makes the electric conductivity poor and results in the poor joint layer. The material of $Si_3N_4$ is very stable but the additive content is 15 to 45 weight %.

The tenth object of the present invention is to provide a joining agent of an oxide system and can be achieved by composition including NaF of 5 to 20 weight %, $SiO_2$ of 30 to 70 weight % and the residual of one element selected from the group consisting of $Al_2O_3$, $TiO_2$, $Y_2O_3$ and MgO.

This joining agent is based on NaF. The Joining agent including NaF more than 20 weight % lowers the joint strength at a high temperature and the joining agent including NaF less than 5 weight % makes the electric current flow poor and results in the defective joint.

The addition of $SiO_2$ promotes the wetability to the ceramic and also compensates the decreased amount of NaF.

The incorporation of $Al_2O_3$ with Na element can repair the net work (silicate glass structure) having a non-bridging oxygen formed therein by Na element and elevate the softening temperature of the joint layer. Accordingly, the strength of the joint layer at a high temperature can be elevated.

The ingredient of MgO is a component for the electric conduction and can elevate the electric conductivity without increasing the amount of NaF and make the glass structure stronger at the range of 2.5 to 10 weight %. As a result, the joint strength at room temperature and a high temperature is made higher.

The additive $Y_2O_3$ enters the silicate net work structure at the joint layer (silicate glass) and permits the joint layer to have a higher elastic coefficient. Accordingly, the joint strength is made stronger than that of the joint without $Y_2O_3$.

$TiO_2$ has the same effect as $Y_2O_3$.

Further, the eleventh object of the present invention is achieved by the following composition: The joining agent includes, as fluoride additives, III A group fluoride $ScF_3$ or $YF_3$ and achieves the higher strength at a high temperature. The composition is the III A group fluoride more than 15 weight % and the residual of at least one element selected from the group consisting of $Al_2O_3$ and $SiO_2$.

The reason for limiting the III A group fluoride more than 15 weight % is that the joining agent having the III A group fluoride less than 15 weight % is in a high electric resistance and does not permit the electric current to flow. Even when the electric current flows, the generation of Joule heat is not uniform. Accordingly, the portion to be jointed melt portionially and result in the poor properties.

The joining agent including at least one element selected from the group consisting of $Al_2O_3$ and $SiO_2$ having a high wetability with the ceramic improves the wetability with the ceramic and results in the superior joint.

A composition of 100 weight % of the III A group fluoride $ScF_3$, or $YF_3$ can achieve the superior joint. The reason is that when the $Si_3N_4$ ceramic is joined, the joining agent catches $SiO_2$ produced by a oxidizing reaction of the mother material and a promoting agent for the sintering of the mother material and accordingly improves the wetability.

The joint achieved by the joining agent according to the present invention is improved in the joint strength, especially the strength at a high temperature and the corrosion resistance in the following reason: When a comparison is made between the III A group element (Y, and Sc) obtained from the III A group fluoride ($ScF_3$, or $YF_3$) and group of (Ca or Na) obtained from $CaF_2$ or NaF, $Sc^{3+}$ ion, $Y^{3+}$ ion, $Ca^{2+}$ ion or $Na^+$ ion destroys the Si—O net work structure in the joint layer and enters the net work structure as a net work modifying ion. The glass having $Sc^{3+}$, or $Y^{3+}$ ion incorporated therein is superior in the various properties to the glass having $Ca^{2+}$, or $Na^+$ ion incorporated therein.

The higher joint strength comes from the higher packing density of the glass at the joint layer, which makes the strain ratio of glass smaller to improve the Young coefficient. Further, the higher strength at a high temperature results from the reason that Sc or Y ion has a stronger bonding force with oxygen and improves the softening temperature, that is, the viscosity at a high temperature.

Next, the description is directed to a reason why the joining agent according to the present invention improves the corrosion resistance against acid and alkali solution. The corrosion by the acid solution is carried out by exchanging between $H^+$ ion or $H_3O^+$ ion in the corrosive solution and the modifying ions in the net work of glass. Accordingly, $Sc^{3+}$ ion, or $Y^{3+}$ ion has a stronger bonding force with oxygen than $Ca^{2+}$ ion or $Na^+$ ion and makes it difficult to be exchanged with $H^+$ ion or $H_3O^+$ ion. This results in the improvement of the corrosion resistance. The corrosion with the alkali solution is carried out by destroying the bonding Si—O in the net work in glass with $OH^-$ ion in the corrosion solution. The glass having $Sc^{3+}$ ion or $Y^{3+}$ ion incorporated therein increases the packing density and suppresses the diffusion of $OH^-$ ion and improves the corrosion resistance.

BRIEF DESCRIPTION OF THE DRAWINGS

FIG. 11 is a table showing another electrode switching pattern used in the sixth embodiment.

FIG. 12 is a table showing further another electrode switching pattern used in the sixth embodiment.

FIG. 14 (C) is a table showing an electric power control pattern for use in the seventh embodiment.

FIG. 17 is a table showing an electrode switching pattern used in the eighth embodiment shown in FIG. 16.

FIG. 18 (A) is a perspective view of two ceramic bodies used in the ninth embodiment, FIG. 18 (B) is a table showing a temperature control pattern for use in the ninth embodiment and FIG. 18 (C) is a table showing an electrode switching pattern used in the ninth embodiment.

FIG. 25 is a table showing an electrode switching pattern used in the twelfth embodiment.

FIG. 27 is a table showing an electrode switching pattern used in the thirteenth embodiment.

FIG. 31 is a table showing an electrode switching pattern used in the 14th embodiment shown in FIG. 28.

FIGS. 32 (A) and (B) are a side view and plane view of a joining apparatus practicing the fifteenth embodiment, respectively, and FIG. 32 (C) is a graph showing a temperature control pattern used in the fifteenth embodiment.

FIG. 33 is a table showing an electrode switching pattern applicable for the fifteenth embodiment shown in FIG. 32.

FIG. 36 is a table showing an electrode switching pattern applicable for the sixteenth embodiment shown in FIG. 34.

FIG. 50 (B) is a cross sectional view obtained at B—B line of FIG. 50 (A).

FIG. 51 (B) is a cross sectional view obtained at B—B line of FIG. 51 (A).

FIG. 55 (B) is a cross sectional view of two ceramic bodies to be jointed with a joining agent in an inclined arrangement. FIG. 55 (c) is a cross sectional view of two ceramic bodies to be jointed with a joining agent in an uniform thickness but not parallel at the terminal portion to each other.

DETAILED DESCRIPTION OF THE DRAWINGS

The following description will be directed to a embodiment using four kinds of electrically joining methods.

EMBODIMENT GROUP 1

FIGS. 1 to 13 are directed to the embodiments in which two bodies to be jointed at least one of which is an electrically conductive material are jointed with a joining agent inserted at butted planes therebetween under the electric current flowing in a direction parallel to the butted planes. (B method)

Embodiment 1

Figure 1A:
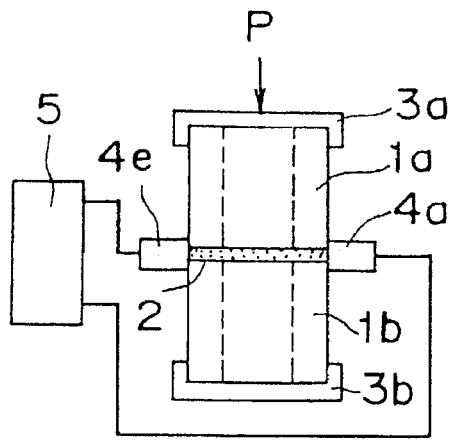
FIG. 1 (A) and FIG. 1 (B) are a front view and a top view of a joining apparatus practicing the joining method according to the present invention, respectively.
Figure 1B:
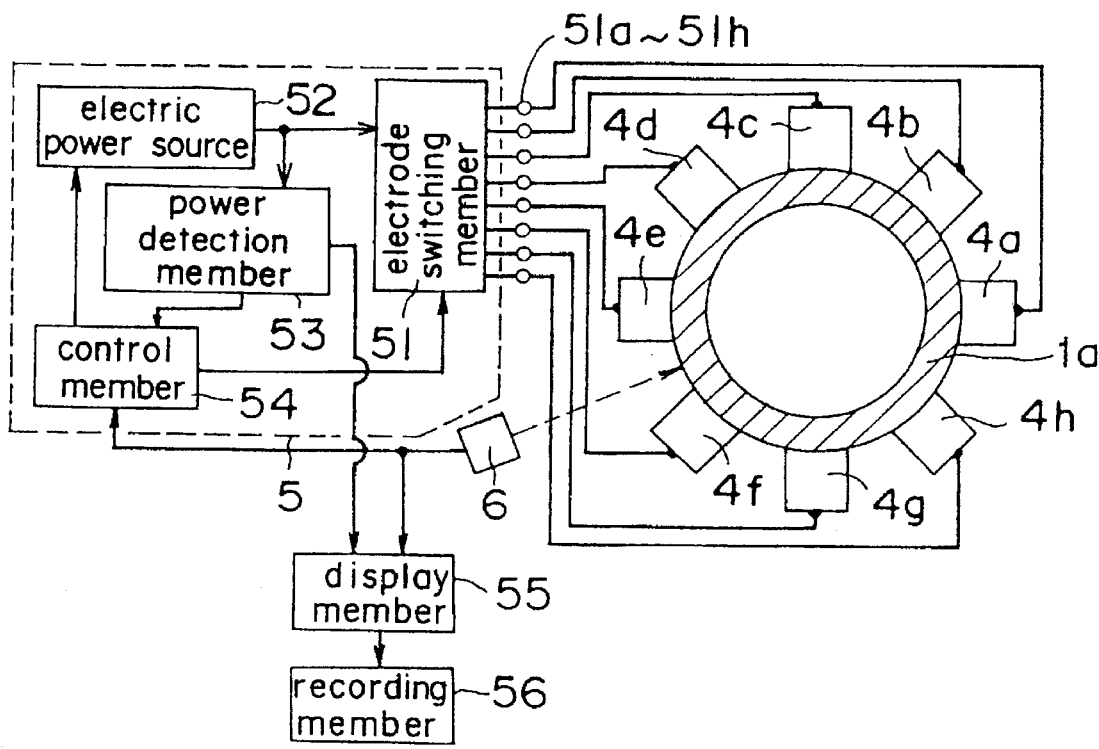

FIG. 1 (A) and FIG. 1 (B) are a front view and a top view of the joining apparatus practicing the joining method according to the present invention, respectively. Two ceramic bodies in a pipe form are connected with butted portion to be jointed and are jointed to each other by arranging electrodes at the periphery around the butted portion to be jointed.

An used ceramic body is, as an electric conductive ceramic, an electric conductive $Si_3N_4$ ceramic body $1a$ ($\phi 60 \times \phi 48 \times 100$ L) including, as an electric conductor, TiN or TiC and having an electric resistance of $10^{-2}$ $\Omega$ cm and, as an electric insulating ceramic, an insulating $Si_3N_4$ ceramic body $1b$. The butted portion to be jointed of these ceramic bodies are applied with a joining agent 2 comprising Ti active metal solder. These ceramic bodies are held by holding jigs $3a$ and $3b$ under being pressed at a suitable pressure(P).

In order to enable the heating electric current to flow through the butted portion to be jointed, eight electrodes $4a$ to $4h$ made of tungsten and being in a cross sectional form similar to the form of the periphery of the ceramic bodies are brought into a contact to the periphery of the electric conductive ceramic bodies ($1a,1b$) along with the butted portion to be jointed. In this case, a conductive carbon paste are between the ceramic body ($1a$) and the electrodes the electrodes $4a$ to $4h$ are in a fixed state and arranged along the periphery of the ceramic bodies at regular intervals. In order to prevent the heat diffusion from the butted portion to be jointed, the adiabatic material is provided near the periphery of the butted portion to be jointed. Futher, as shown in Japanese Patent unexamined 1989-20273, a reflective plate may be attached to the adiabatic material.

Next, there is explained an current supplying control apparatus 5 shown in FIG. 1 (B). The electrodes $4a$ to $4h$ are connected to an electric power source 52 through switching terminals $51a$ to $51h$ of an electrode switching member 51. A control member 54 receives a signal from a detection member 53 for detecting the output voltage, electric current and electric power of the electric power source 52. Further, the control member 54 receives a signal from a temperature detector 6 for detecting the temperature at the butted portion to be jointed. The switching member 51 and the electric power source 52 are controlled by the output signal from the control member 54 in accordance with the signal of these dedection. A current supplying control apparatus 5 comprises the electric power source switching member 51, the electric power source 52, the voltage, current and electric power detection member 53 and the control member 54. The electric power source 52 can be in either of AC or DC operation type. The electric power source in a AC type can use an arbitrary frequency. As the temperature detector 6, a radiation pyrometer, a thermo-couple and the like can be used for detecting the temperature of portion to be jointed and its vicinity.

Figures 2A, 2B:
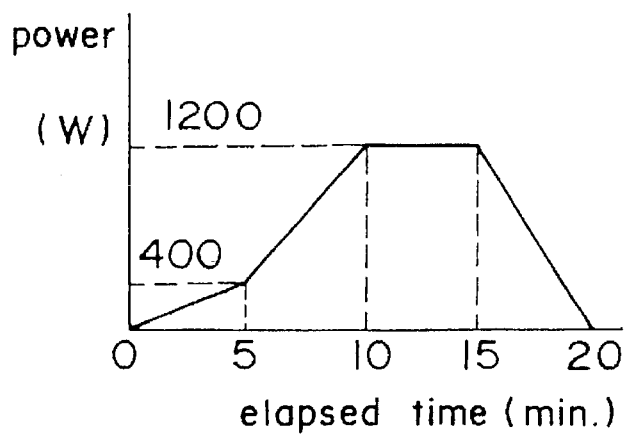
FIG. 2 (A) and FIG. 2 (B) are a table showing an electric power control pattern used in the first embodiment and a graph showing an electrode switching pattern, respectively.

A joining process is carried out in argon gas and is controlled by an electric power control pattern as shown in FIG. 2 (A) under mainly supplying current the electric conductive ceramic body 1a and joining agent 2. In order to heat uniformly the butted portion to be jointed, as shown by an electrode switching pattern of FIG. 2 (A), the switching terminals 51a and 51c are operated at a first time to apply the electric voltage across the electrodes 4a and 4c. Then, at second time to eighth time the switching terminals 51b - - - 51d, 51h - - - 51b are sequentially operated under supplying current to the electrodes 4b - - - 4d . . . , 4h - - - 4b to move a current flowing area in a circumferential of butted portion to be jointed. At a ninth switching time, the electrodes 4a - - - 4c are again supplied current and then the two of the electrodes the same order as before are operated repeatedly. Each of the two electrodes have an current supplying hold time (referred to a hold time hereinafter) of a constant value of 70 msec during 5 minutes after initiation of the current supplying and 30 msec during 20 min before the termination of the current supplying. A switching time between two pairs of electrodes is made nearly 0. This electrode switching pattern makes it possible to elevate the temperature of butted portion to be jointed effectively by means of variation of current supplying time and electric power at a constant distance between selected electrodes to be supplied current. These electric power control pattern and electrode switching pattern are input in advance in the control member 54 of the current supplying control apparatus 5 to be automatically controlled.

The joining apparatus according to this embodiment further comprises a display member 55 and a recording member 56. The display member 55 displays the voltage, current and the electric power detected at the output detector 53 and the temperature detected at the temperature detector 6. The recording member 56 records the time passage of the data from the output detector 53 and the temperature detector 6. It is possible to control manually the current and the electric power under watching the data displayed on the display member 55 with an operation button of the control member 54.

The butted portion to be jointed is heated electrically up to a temperature of about 920° C. for 5 min to execute the reaction between the joining agent and the ceramic bodies and is cooled to a room temperature in accordance with the electric power control pattern to complete the joining.

A gas tight test with the sample so obtained indicates the high gas tight degree which can not be detected by the helium leakage detector. The observation of the cross sectional plane of the joint indicates that the joint is in a very fine and is very superior. For a comparison, a sample in the same shape as that of the above embodiment is prepared by joining the ceramic bodies by using two electrodes facing to each other under rotating the ceramic bodies at 100 rpm. During the joining process, the sample shows an arc generation and a cracking. It is not possible to obtain a good joint.

Embodiment 2

Figures 3A, 3B:
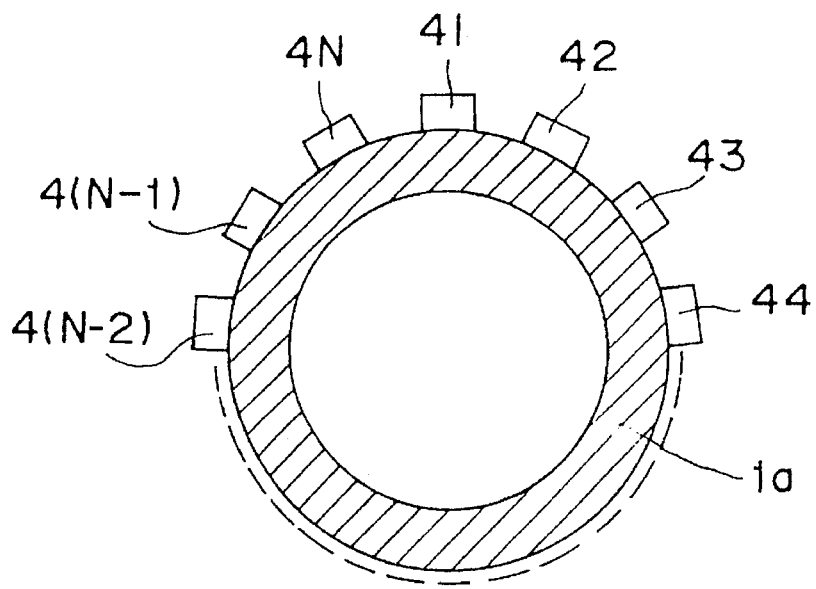
FIG. 3 (A) is a top view showing an arrangement of electrodes, and FIG. 3 (B) is a table showing an electrode switching pattern used in second embodiment.

FIG. 3 (A) shows the arrangement of N electrodes in a way to enlarge the structure of embodiment 1, wherein the N electrodes of 41, 42, 43 . . . 4 (N-2), 4 (N-1), 4N are brought into a contact with the periphery of the butted portion to be jointed along with the conductive ceramic body 1a in a similar way to that of the embodiment 1.

The electrode switching pattern can be obtained with a suitable combination of four kinds of patterns as shown in FIG. 3 (B). In connection with a pattern 1, the current supplying is carried out between the two electrodes adjacent to each other, that is, the two electrodes having the shortest distance therebetween causes the current supplying to move the current flowing area around the butted portion to be jointed. At a first time the electrodes 41 - - - 42 are supplied current and then at a second time to n time, 42 - - - 43, 43 - - - 44, . . . 4 (N-1) - - - 4N, 4N - - - 41 are consequently energized. After a (N+1) time, an order of the switching electrodes is repeated in the same way as that of above. In connection with a pattern 2 or 3, the current supplying is carried out between the two electrodes having other two electrodes inserted therebetween and accordingly, the current-flowing distance is two times larger than that of the pattern 1. As a practical matter, in connection with a pattern 2 at a switching time first to n time, the electrodes to be supplied current are 41 - - - 44, 42 - - - 45, 43 - - - 46, . . . , 4 (N-1) - - - 42, 4N - - - 43 , respectively. In connection with a pattern 3, at a switching time first to n time, the electrodes to be supplied current are 41 - - - 44, 43 - - - 46, 45 - - - 48, . . . , 4 (N-3) - - - 4N, 4 (N-1) - - - 42 , respectively. The pattern 2 has a more number of the portion at which the previous current flowing area and the next current flowing area are over-lapped to each other than that of the pattern 3. In connection with a pattern 4, the electrodes to be supplied current are selected at a distance two times larger than that of pattern 1 in way that the previous current flowing area does not over-lap to the next current flowing area. As a practical matter, at a switching time first to n time, the electrodes to be supplied current are 41 - - - 44, 44 - - - 47, . . . , 4 (N-4) - - - 4N, 4 N - - - 43 , respectively and then after (n+1) time, the electrode switching order is repeated in a similar way that of the above example.

The various kinds of patterns other than the above patterns are applicable for the electrode switching pattern in accordance with the shape and a heat capacity of the butted portion to be jointed of the ceramic body. For example, in accordance with a value of outside diameter or a thickness of the pipe wall, an arbitrary pattern is selected. The current supplying may be carried out in a pattern the same as from that of the initiation time to that of the termination time. There is a case at which the current supplying may be carried out at the patterns more than two kinds from the initiation to the termination of the current supplying. For example, in connection with the electric conductive ceramic body having an electric resistance in a negative temperature dependency, the current supplying is set to two electrode having the shortest current-flowing distance (pattern 1) at the initiation time, to make the initial voltage decreased. The electric resistance of the ceramic body decreases with the increase in the temperature. Hence, the current-flowing distance is increased so as to extend the heating area. This makes it possible to obtain the excellent heating condition with the electric power source having a small capacity. Therefore, the current supplying process at the initial time employs a pattern 1 and 2 and then may employ the pattern 3 and 4 after increased temperature which pormits the previous current flowing area and the next current flowing area to be overlapped at the small area. The current supplying can be carried out by using any other pattern combination in accordance with the ceramic characteristic and the size of the butted portion to be jointed. For example, the pattern 1 is selected at the initial step, and after the desired time for current supplying has passed, the pattern 2 is selected to finish the current supplying with two patterns from the initial step to the termination step.

In the embodiments 1 and 2, the ceramic body to be jointed can be in any pipe form including the round pipe or in a round column.

Embodiment 3

Figures 4, 5:
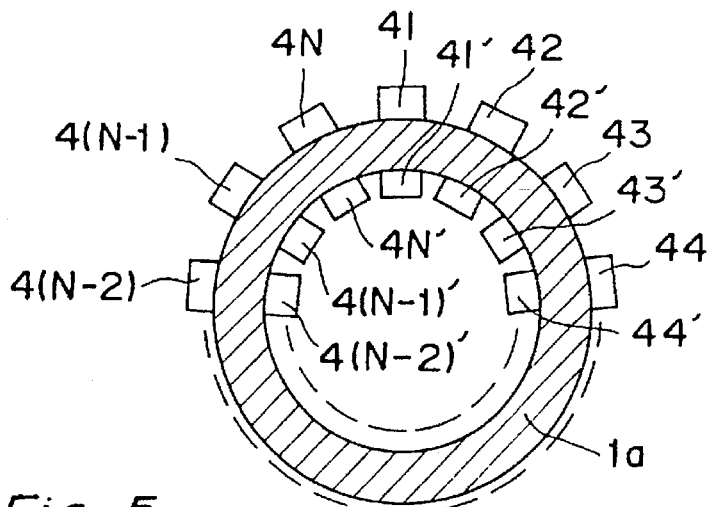
FIG. 4 is a top view showing an arrangement of electrodes obtained with the third embodiment.
FIG. 5 is a table showing an electrode switching pattern used in the third embodiment.

FIG. 4 shows the arrangement of N outside electrodes in a way to enlarge the structure of the above embodiment. The out side electrodes and the inside electrodes are the same in the number as each other and the current supplying is carried out between the corresponding electrodes between the inside electrodes and the outside electrodes. The N electrodes of 41, 42, 43 ... 4 (N-2), 4 (N-1), 4N are brought into a contact with the periphery of the butted portion to be jointed along with the conductive ceramic body 1a in a similar way to that of the embodiment 2. The inside electrodes divided into N of 41', 42', 43', ... 4 (N-2)', 4 (N-1)', 4N' are arranged to face to the outside electrodes, respectively. The inside electrodes are spaced from each other at regular intervals along with the periphery of the butted portion to be jointed.

The electrode switching pattern comprises various kinds and, for example, four kinds of patterns as shown in FIG. 5. A pattern 1 has the shortest distance between the inside electrodes and the outside electrodes. As a practical mater, at a first time the electrodes 41 - - - 41' are supplied current and then at a second time to n time, 42 - - - 42', 43 - - - 43', ... . 4 (N-1) - - - 4(N-1)', 4N - - - 4N' are consequently supplied current. After a (n+1) time, an order of the switching electrodes is repeated in the same way as that of above. A pattern 2 has a longer current-flowing distance than the pattern 1. As a practical matter, at a switching time first to n time, the electrodes to be supplied current are 41 - - - 42', 42 - - - 43', ... , 4 (N-1) - - - 4N', 4N - - - 41', respectively. After that, the order mentioned above is repeated. A pattern 3 caries out the current supplying in a way that various current supplying directions cross on one area. As a practical matter, at a switching time first to n time, the electrodes to be supplied current are 41 - - - 42', 42 - - - 41', 42 - - - 43', ... ,4N - - - 41', 41 - - - 4N', respectively. After that, the order mentioned above is repeated. A pattern 4 is a combination of the patterns 1 and 2. As a practical matter, at a switching time first to n time, the electrodes to be supplied current are 41 - - - 41', 41 - - - 42', 42 - - - 42', ... ,4 (N-1) - - - 4N, 4N - - - 4N', 4N - - - 41', respectively. After that, the order mentioned above is repeated. This embodiment uses the outside electrodes and the inside electrodes in the same number as each other but it is possible to use the different number between the inside electrodes and the outside electrodes.

It is possible to use a pattern to supply electric current to between the outside electrodes or between the inside electrodes instead of between the outside electrode and the inside electrode. For example, the energized electrodes to be supplied current can be in the following order; 41 - - - 42, 41'- - - 42', 42 - - - 43', 42'- - - 43' ... , 4 (N-1) - - - 4N, 4(N-1) - - - 4N'. Various kinds of patterns can be applicable in a way mentioned above. It is possible to supply electric current to with one pattern from the initial stage to the final stage but to use a plurality of patterns suitable for the characteristics of a current-flowing member.

Embodiment 4

Figure 6A:
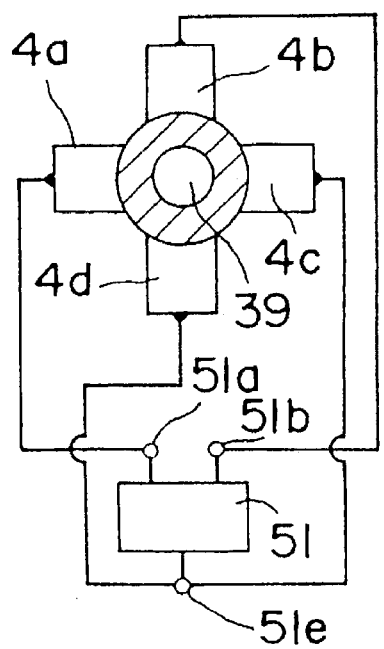
FIG. 6 (A) and FIG. 6 (B) are a cross sectional horizontal view and a cross sectional vertical view of another joining apparatus of the fourth embodiment, respectively.
Figure 6B:
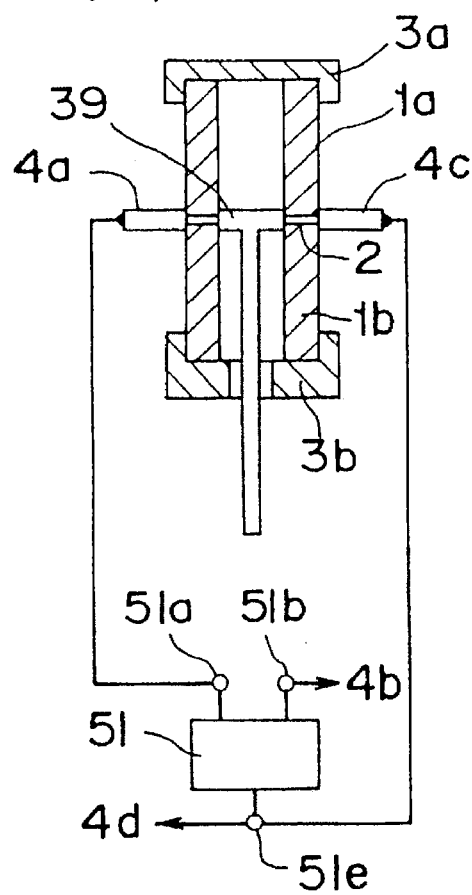

FIG. 6 (A) and FIG. 6 (B) are a horizontal cross sectional view and a vertical cross sectional view of the joining apparatus practicing the joining method according to the present invention, respectively. Two ceramic bodies to be jointed 1a and 1b in a round pipe form are connected at the internal periphery along with butted portion to be jointed through a electric conductive member 39. The plurality of electrodes 4a to 4d are arranged at the outside periphery along with the butted portion to be jointed. FIG. 6 shows only the electrode switching member 51 of the current supplying control apparatus 5 of FIG. 1 (B).

An used ceramic body is, as an electric conductive ceramic, an electric conductive SiC ceramic bodies 1a, and 1b ($\phi 40 \times \phi 24 \times 30$ L) having an electric resistance of $10^{-1}$ $\Omega$ cm. The butted portion to be jointed of these ceramic bodies are applied with a joining agent 2 comprising Ge powder. These ceramic bodies are held by holding jigs 3a and 3b.

In order to enable the heating electric current to flow through the butted portion to be jointed, four outside electrodes 4a, 4b, 4c and 4d being in a cross sectional form similar to the form of the periphery of the ceramic bodies and an inside electric conductive member 39 in a round disc form are brought into a contact to the outside periphery of the butted portion to be jointed and the inside periphery of the butted portion to be jointed between the two ceramic bodies 1a and 1b, respectively. The outside periphery and the inside periphery have a conductive carbon paste applied thereto. In this case, the outside electrodes are not moved and are in a fixed state. The outside electrodes 4a and 4b are arranged in a nearly perpendicular to each other, and the two outside electrodes 4a and 4c or 4b and 4d are faced to each other. The inside electrical conductive member can be in a form of a donut. The electrode and the switching member are connected by each connection between outer electrode 4a and switching terminal 51a of the switching member 51, between second electrode 4b and second switching terminal 51b, and between outher electrodes 4c,4d and the earth terminal 52e.

A joining process is carried out in vacuum by applying the voltage of about 36 V through the electric power source 52 to the butted portion to be jointed between the ceramic bodies. The electric current is made to flow mainly through the butted portion to be jointed of the SiC ceramic bodies. Each of electrodes is provided with a hold time of 1/60 sec. The switching terminals 51a to 51b are switched alternatively from each other at an arbitrary time interval. In such away, the current flowing direction is switched sequentially in an order 4a→ceramic body→electric conductive member 39→ceramic body 4c, and 4b→ceramic body→4d. As a result, the current flowing area moves intermittently around the butted portion to be jointed.

The electric current increases gradually from the initiation of the current flowing and reaches 130 A which makes the joint temperature 1200° C. The joint is heated by Joul heat at the temperature of 1200° C. for about 10 min. After the sufficient reaction between the joining agent and the ceramic bodies, the electric current is gradually decreased to cool the ceramic bodies to a room temperature. A test pieces in size of 3×4×40 mm is cut from the jointed ceramic bodies and is subjected to a four point bending test. The resultant joint strength is 120 MPa.

Embodiment 5

Figures 7, 8:
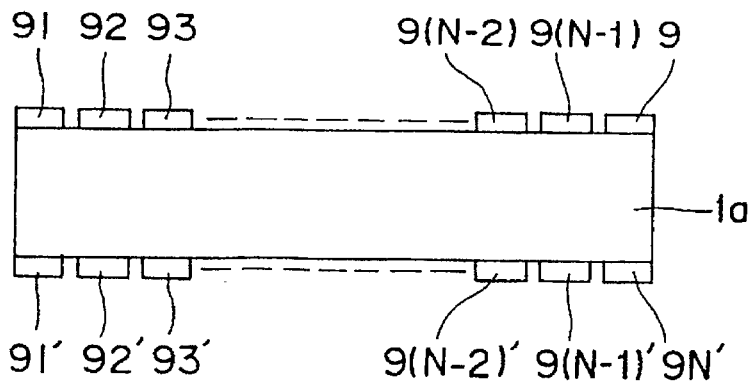
FIG. 7 is a top view showing an arrangement of electrodes used in the fifth embodiment.
FIG. 8 is a table showing an electrode switching pattern used in FIG. 7.

FIG. 7 is a plane view showing the arrangement of N plate electrodes attached to two ceramic bodies in a plate form of a long size. The first N electrodes of 91, 92, 93 ... 9 (N-2), 9 (N-1), 9N and the second N electrodes N of 91', 92', 93', ... 9 (N-2)', 9 (N-1)', 9N' are brought into a contact with the ceramic body 1a (1b) along with the butted portion to be jointed. The corresponding electrodes such as 91 and 91' are arranged to face to each other. The first or second electrodes are spaced from each other at regular intervals along with the periphery of the butted portion to be jointed. In this embodiment, the first and the second electrode groups are the same in the number but can be different from each other. The first electrodes group or the second electrodes group can be are formed into a one body.

This embodiment can use, as an electrode switching pattern, various kinds and, for example, four kinds of patterns as shown in FIG. 8. In connection with a pattern 1, at a first time the electrodes 91 - - - 91' are supplied current and then at a second time to n time, 92 - - - 92', 93 - - - 93', ... 9 (N-1), - - - 9(N-1)', 9N - - - 9N' are consequently supplied current, and the current flowing area is moved to a longitudinal direction. After a (n+1) time, an order of the switching electrodes is repeated in the same way as that of above. Accordingly, in this pattern, the current flowing area is moved from one end to another end along with the butted portion to be jointed, that is on a proceeding way only. On the other hand, in patterns 2 to 4, the current flowing area is alternatively moved from one end to another end and from another end to one end, that is, alternative both ways.

In connection with a pattern 2, the electrodes to be supplied current are selected in an order the same as that of the pattern 1. In connection with a pattern 3, the current-flowing distance is made longer. At a switching time first to n time, the electrodes to be supplied current are 91 - - - 92', 92 - - - 93', ..., 9 (N-1) - - - 9N', 9N - - - 9 (N-1)', and the current flowing area moves on a going way. At a (n+1)th to (2n-2)th, the electrodes to be supplied current are 93 - - - 92', 92 - - - 91' and the current flowing area moves a going back way. After (2n-1)th, the electrode switching order the same as the above is again repeated. A pattern 4 is a combination of the pattern 2 and the pattern 3 and causes the current supplying in a way to overlap the previous current flowing area and the next current flowing area at the portionial portion to each other.

When the ceramic body having the electric resistance decreasing with an increase in the temperature is joined, it is preferable that the initial stage having a low temperature at the butted portion selects the pattern 1 or 4 and then the stage having a high temperature selects the pattern 2 or 3. It is also possible to change the current supplying holding time and electric power and so on during the control time.

Embodiment 6

Figures 9, 10:
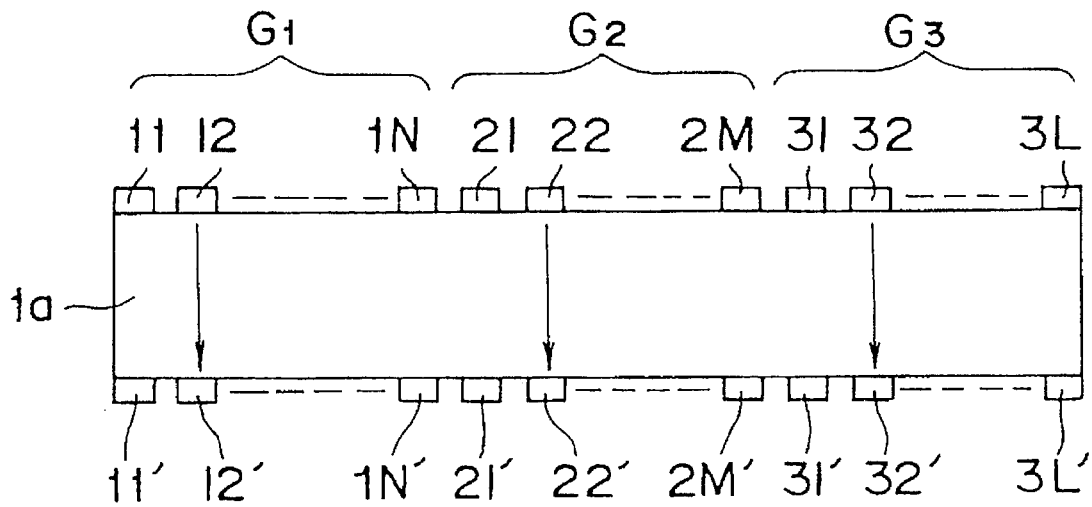
FIG. 9 is a top view showing an arrangement of electrodes which is used in the 6th embodiment and which is obtained by enlarging that of the 5th embodiment.
FIG. 10 is a table showing an electrode switching pattern used in the sixth embodiment.

FIG. 9 shows an embodiment to divide a plurality of electrodes into a plurality of groups and to control the current supplying of each of groups with a given electrode switching pattern. This structure can be applied suitably for following case: When the joining process is carried out with a large ceramic body having a long joint and a plurality of ceramic bodies each having complicated shape or non-symmetric shape, all of the butted portion to be jointed can not be uniformly heated easy. The ceramic body is divided into a plurality of portion along with the butted portion to be jointed. Each of the divided portion has a plurality of electrodes attached thereto. Each of electrodes groups is controlled with the current supplying control apparatus and all of the butted portion to be joint is heated and joined by moving the plurality of current flowing areas at the same time. In this embodiment, the ceramic plates having the same shape as each other are provided with the plurality of electrodes in a way to enlarge the arrangement of the electrodes of the embodiment 5. The plurality of electrodes are divided into three groups, G1 to G3. The G1 group consists of a first group and a second group: the first group of N electrodes of 11, 12, . . . , 1N and the second group of electrodes N of 11', 12', . . . , 1N'. The G2 group consists of a third group and a fourth group: the third group of M electrodes of 21, 22, . . . , 2M and the fourth group of electrodes M of 21', 22', . . . , 2M'. The G3 group consists of a fifth group and a sixth group: the fifth group of L electrodes of 31, 32, . . . , 3L and the sixth group of electrodes L of 31', 32', . . . , 3L'. Each of the first group to the third group G1–G3 of the electrodes can be formed into one electrode in a belt form.

This embodiment can use, as an electrode switching pattern, various kinds of electrode switching patterns. As shown in FIG. 10, in the G1 group of the electrodes, at a first time, the electrodes 11 - - - 11' are supplied current and then at a second time to n time, 12 - - - 12', 13 - - - 13', . . . , 1N - - - 1N' are consequently supplied current. After a (n+1) time, an order of the switching electrodes is repeated in the same way as that of above. In connection with the G2 group of the electrodes, at the first time, the electrodes 21 - - - 21' are supplied current and at 2 to m time, the electrodes to be supplied current are 22 - - - 22', . . . , 2M - - - 2M'. After (m+1) time, the above electrode switching is repeated in an order similar to the above. In connection with the G3 group of the electrodes, at a first switching time, the electrodes 31 - - - 31' are supplied current. After second to L time, 32 - - - 32', . . . 3L - - - 3L' are supplied current in this order. After (L+1) time, the electrode switching order the same as the above is repeated. Since L<M<N in the number of electrode, the hold time must be in an order of electrode group G1<G2<G3.

Figures 13, 19:
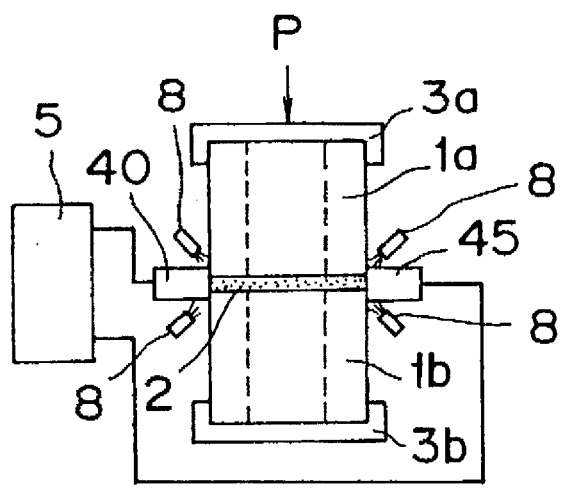
FIG. 13 is a table showing another electrode switching pattern used in the sixth embodiment.
FIG. 19 is a plane view of a joining apparatus for practicing the tenth embodiment.

In a case that the butted portion to be jointed is in a simple form and only in a long size as shown in FIG. 9, it is possible to set that L=M=N. The butted portion to be jointed can be joined by executing the current supplying control with each of the electrodes groups at the same time as shown in FIG. 13 by using one current supplying control apparatus or the current supplying control apparatuses attached independently to each of the electrodes groups. However, when the two ceramic bodies in a complicated shape from each other are electrically joined to each other, it is desirable to heat uniformly the butted portion to be jointed by changing the number or the arrangement distance of each of electrodes groups or by changing the current supplying condition with each of the electrode groups in accordance with the variation in the heat capacity at each position of the butted portion to be jointed.

In connection with the current supplying switching pattern, when the electrode groups G1 to G3 have the electrodes the same number as each other that is, L=M=N, it is possible to move the current flowing area at the plurality of positions of the butted portion to be jointed by using the three current supplying control apparatuses (not shown in the figure) and carrying out independently the electrode switching with the electrode groups G1 to G3 in accordance with the electrode switching pattern shown in FIG. 12. When the three current supplying control apparatuses 1 to 3 are used, it is possible to move always only one current flowing area along with the butted portion to be jointed without moving the plurality of current flowing areas along with the butted portion to be jointed under selecting sequentially the electrode group G1 to G3 and carrying out the electrode switching in a similar way to the electrode switching pattern shown in FIG. 11.

When a plurality of electrode groups are controlled in the current supplying with each of a plurality of current supplying control apparatuses, it is desirable to select independently the electrode switching pattern and the current supplying condition (the electric current, the electric power, the hold time, the temperature control). Further, it is necessary to control the switching of the electrode of each of current supplying control apparatuses in a way that a specified electrode is not supplied from the different current supplying control apparatuses at the same time.

In the above embodiment, the two ceramic bodies in a plate form are subjected to the current supplying control by dividing a plurality of electrodes into a plurality of groups. Two ceramic bodies having any other shape than the plate form, for example, a pipe form can be joined in a similar way to that of the above method.

EMBODIMENT GROUP 2

The following description is directed to a method for joining two bodies to be jointed having a inserting member for heating insertied therebetween (C method). An use of the inserting member for heating makes it possible to join not only two ceramic bodies but also a ceramic body and metal body. Even with the joining method using the inserting member for heating, it is possible to use a basic structure of the current supplying control apparatus and a pressing device shown in FIGS. 1 (A) and (B). Therefore, the description with the current supplying control apparatus and the pressing device is omitted. The inserting member for heating can be not only of a structure to apply the joining agent to the butted planes to be jointed of an electrically conductive ceramic bodies but also of a composite structure to apply the insulating ceramic to one or both sides of the electrically conductive ceramic body as shown in Japanese Patent Publication (unexamined) 1989-320273 and 1989-320276.

Embodiment 7

Figure 14A:
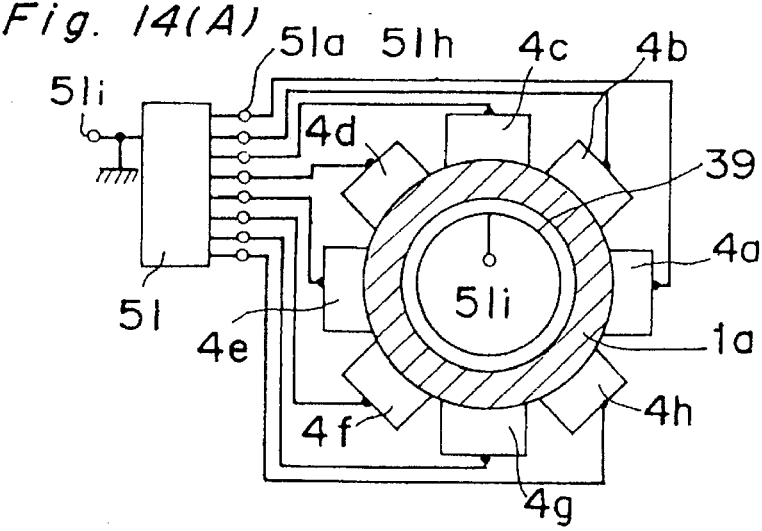
FIG. 14 (A) is a top view showing the arrangement of electrodes for use in the seventh embodiment and FIG. 14 (B) is a cross sectional view of a joining apparatus practicing the joining method according to the present invention.
Figure 14B:
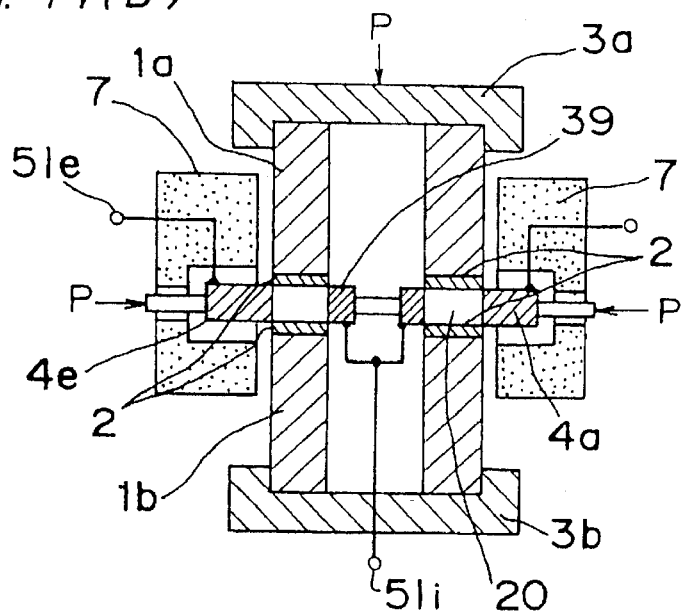
Figure 14C:
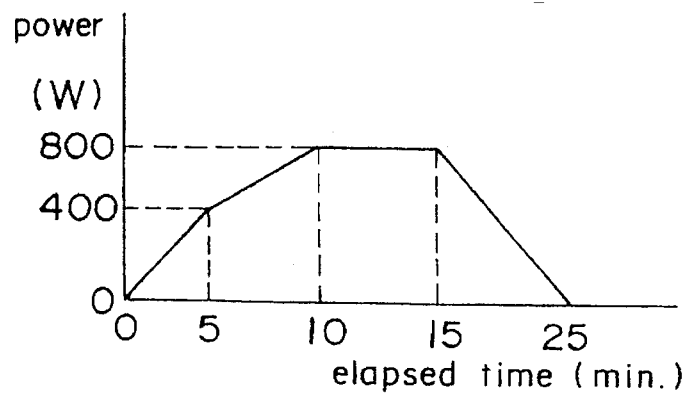

The present embodiment uses an electrode arrangement to equip eight outside electrodes $4a$ to $4h$ and a one inside electrode 39 as shown in FIGS. 14 (A) and (B). Except for the adiabatic material 7 and the inserting member for heating 20, the structure of FIG. 14 is the same as that of the embodiment shown in FIGS. 1 (A) and (B). Therefore, the description with these is omitted. In this embodiment, two insulating ceramic bodies in a round pipe are connected to each other at the butted portion to be jointed through the inserting member for heating 20. The inserting member for heating 20 has the electrodes $4a$ to $4h$ linked thereto. The two ceramic bodies $1a$ and $1b$ are in a size of 50 mm outside diameter×42 mm inside diameter×100 mm length and are composed of an usual $Al_2O_3$ of an insulating property. The inserting member for heating is in a structure that the electrically conductive $Al_2O_3$ oxide which is in a ring form and has an electric resistance of $10^{-3}$ Ω cm and has a glass NaF system solder at the both sides. The electrodes $4a$ to $4b$ and 30 are composed of tungsten and are linked closely to the inserting member for heating 20 through a carbon paste or carbon sheet. According to the experiment to confirm the effect of the embodiment, the current supplying is initiated at room temperature in argon gas with the following order of the two electrodes, $4a$ - - - 39, $4b$ - - - 39, $4c$ - - - 39, $4d$ - - - 39, $4e$ - - - 39, $4f$ - - - 39, $4g$ - - - 39, $4h$ - - - 39. The butted portion to be jointed and vicinity area are heated at a electric power control shown in FIG. 14 (C) under switching sequentially the current flowing area. Each of the two electrodes are provided with the holding time of 70 msec of a constant value. The butted portion to be jointed and vicinity area are heated at 1000° C. for 10 min to causes the joining agent to react with the two ceramic bodies and the electrically conductive ceramic of the inserting member for heating. The resultant joined bodies are subjected to a gas tight test with a helium leak detector and shows no gas leakage. The joint area is cut to a test piece, polished and then observed with a optical microscope. The joint area shows a dense jointed layer of 20 microns. The whole of the joint area shows a formation of a good joined area.

The present embodiment shows the case at which the switching of the electrodes pattern and the hold time are made constant. The joining can be completed by changing the electrode switching pattern and the hold time when a given time has passed after the initiation of the current supplying. The present method is applicable for the bodies to be jointed having an other sectional shape such as a rectangular and shape of expecting concentric circles which are used in the present embodiment. In the present embodiment, the inside electrode is formed into a one body, but the outside electrode can be formed into a one body and the inside electrode can be divided into a plurality of electrodes.

Embodiment 8

Figure 15A:
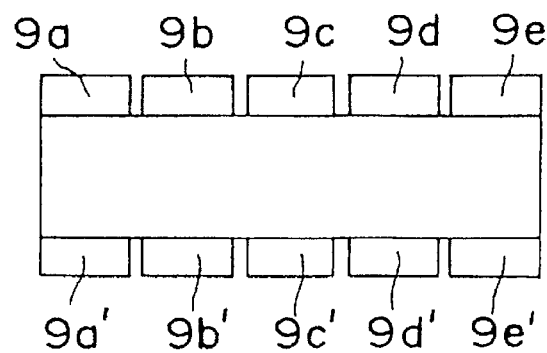
FIG. 15 (A) is a top view showing the arrangement of electrodes for use in the eighth embodiment and FIG. 15 (B) is a cross sectional view of a joining apparatus practicing the joining method according to the present invention.
Figure 15B:
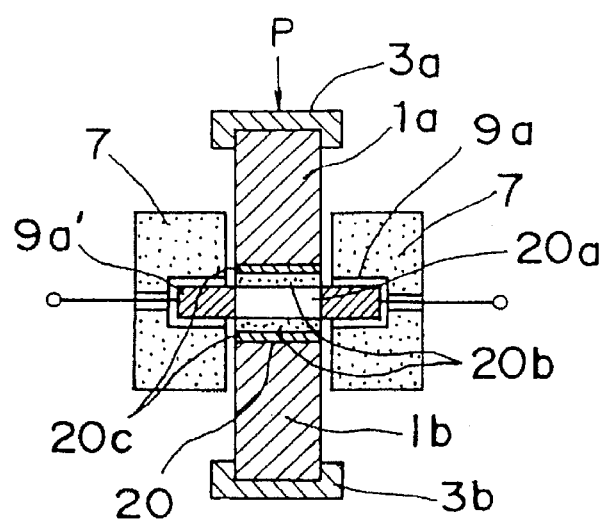
Figure 16:
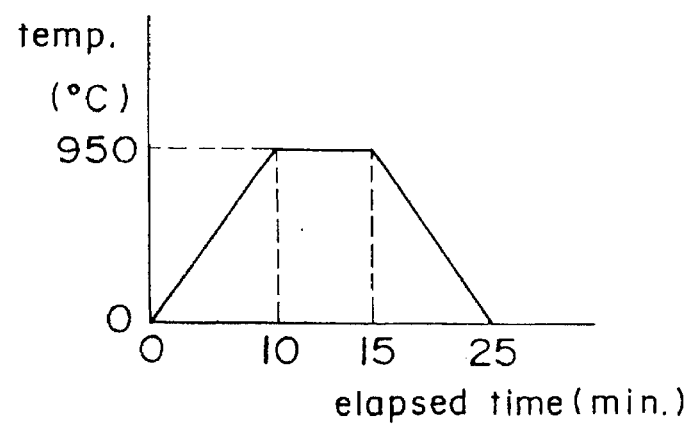
FIG. 16 is a table showing a temperature control pattern for use in the eighth embodiment.

The present embodiment relates to a case in which two ceramic bodies $1a$ and $1b$ which are in a long shape and in an electric conduction are joined with a inserting member for heating 20 as shown in FIG. 15 (A) showing the arrangement of the electrodes with the butted portion to be jointed and in FIG. 15 (B) showing a joining method. In the experiment for confirming the effect of the embodiment, the two ceramic bodies are composed of electrically conductive $Si_3N_4$ having an electric resistance of $10^{-3}$ Ω cm and in a size of 10×150×20 mm (the butted plane, 10×150 mm). The inserting member for heating 20 is in a sandwich structure that an electrically conductive $Si_3N_4$ $20a$ in an electric resistance of $10^{-2}$ Ω cm has insulating layers of $Si_3N_4$ $20b$ in an electric resistance of higher than $10^{+5}$ Ω cm integrated at both surfaces thereof. The joining agent $20c$ is composed of a Ti system matal solder and is inserted between a butted plane of the insulating layers $20b$ and butted planes of the two ceramic bodies $1a$ and $1b$. The heating atmosphere is vacuum of $10^{-5}$ torr. The current supplying is initiated at room temperature under switching sequentially the current flowing area as shown in FIG. 17. The butted portion to be jointed and vicinity area are heated under a temperature control pattern shown in FIG. 16 at 950° C. for 5 min to causes the joining agent to react with the two ceramic bodies to be jointed and the inserting member for heating. The resultant joined body is cut to a size of 3×4× 40 mm and is subjected to a four points bending test. The resultant joining strength is about 220 MPa. The joint area is cut to a test piece, polished and then observed with a optical microscope. The joint area shows a fine joined layer of 8 microns. The whole of the joint area shows a formation of a good joined area.

This embodiment is directed to a case when two electrically conductive ceramic bodies are joined. However, it is possible for the inserting member for heating having both insulating layers applied to the both surfaces thereof to join a ceramic body and a metal body. In connection with the joining of ceramic and metallic bodies, it is preferable to insert a soft metal or material having an intermediate thermal expansion coefficient between the metallic body and the inserting member for heating in order to decrease the strain between the metallic body and the inserting member for heating in view of releasing the residual strain.

Embodiment 9

The present embodiment is directed to a case to join two ceramic bodies $1a$ and $1b$ of an insulating $Si_3N_4$ ceramic having a complicated shape from each other as shown in FIG. 18 (A). The arrangement of the electrodes is the same as that of embodiment 8 shown in FIG. 15 (A) and can be omitted. The inserting member for heating is in a sandwich structure that an electrically conductive $Si_3N_4$ ceramic in an electric resistance of $10^{-2}$ $\Omega$ cm has a joining agent of $CaF_2$ system applied to the both surfaces thereof and is inserted between the two ceramic bodies $1a$ and $1b$. The current supplying is carried out automatically in argon atmosphere under a temperature control pattern shown in FIG. 18 (C) by inputting various given value to program. A variation in the hold time with the current flowing area is resulting from the reason to heat the whole of butted planes to be jointed as aninformly as possible in view of the heat content in consideration of heat capacity of the butted poriton to be jointed. Accordingly, the similar effect can be obtained with a change in the electric current or the electric power. As shown in FIG. 18 (B), the butted portion to be jointed is heated at 1450° C. for 10 min and than is pressed pressure in a vertical direction of the butted planes to be jointed and then is cooled to a room temperature under the program. The sample piece of 3×4×40 mm is cut from the resultant joined bodies and subjected to a four point bending test. The test result shows the joining strength of 280 MPa and proves the good joined condition.

EMBODIMENT GROUP 3

Referring to FIGS. 19 to 23, the description is directed to a case to join two ceramic bodies having an electric conduction at a high temperature but not at room temperature or to use a joining agent having an electric conduction at a high temperature under an auxiliary heating apparatus (A method). The prior art describes a method to join two ceramic bodies by heating the butted portion to be jointed with an auxiliary heating apparatus and by heating through the electrodes to react the joining agent with the ceramic bodies. Therefore, the description of the above method is omitted. The embodiment group 3 is essentially the same as that of embodiment groups of 1 and 2 and is different in the use of the auxiliary heating apparatus. The available auxiliary heating method comprises a gas flame, an electric furnace or a lamp heating or the combination of those.

When the current flowing member has a sufficiently high electric conduction at room temperature as shown in the embodiment groups 1 and 2 or the embodiment group 4 described later, there can be used an electric power source having a low voltage and high electric current depending on the electric conduction degree. In connection with the current flowing member according to the embodiment group 3 having no sufficiently high electric conduction at room temperature and requiring an auxiliary heating apparatus, it is generally necessary to use an electric power source having a high voltage and a low electric current because of a high electric resistance of the current flowing member heated with the auxiliary heating apparatus.

Embodiment 10

Figures 20, 21:
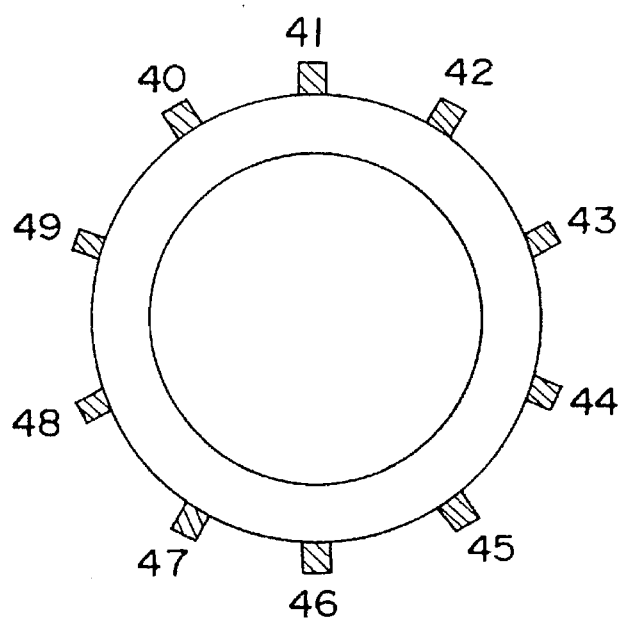
FIG. 20 is a top view showing an arrangement of electrodes used in the tenth embodiment.
FIG. 21 is a table showing an electrode switching pattern used in the tenth embodiment.

The present embodiment is directed to a case to join two ceramic bodies in a pipe form. FIG. 19 is a outline drawing showing the joining apparatus according to the embodiment and is similar to that of FIG. 1 (A) except for ten gas burners 8 arranged around the butted portion to be jointed at a given space. FIG. 20 shows the arrangement of the electrodes for use in the experiment for confirming the effect of the invention. FIG. 21 shows an electrode switching pattern used in the experiment. The used two ceramic bodies are in a pipe form of outside diameter, 60×inside diameter, 44×length, 100 mm and is composed of an insulating $Si_3N_4$ ceramics. The used joining agent is a $CaF_2$ system joining agent. The ten electrodes 40 to 49 linked closely with the outside periphery of the butted portion to be jointed are made of tungsten. The gas burners 8 as an auxiliary heating apparatus are arranged around the butted portion to be jointed regular intervals (not shown in drawing). The ten gas burners are arranged to cover the whole of the butted portion to be jointed with flame.

The butted portion to be jointed is heated with gas flame at about 800° to 900° C. and then is heated with the electric voltage applied across the electrodes. The current supplying process is carried out to be controled electric power as shown in FIG. 21 in an automatic control by inputting the electric power, the current supplying time, a switching pattern and a hold time to a program of an current supplying control apparatus. After the joining time of 12 min, the pressing pressure is applied to the two ceramic bodies in the axial direction to face the two ceramic bodies to each other. After 15 min, the gas flame is stopped and the joined ceramic bodies are cooled to room temperature to complete the joining process. The resultant joined bodies are subjected to a gas tight test with a helium leakage detector and shows a gas leakage in a level below a detectable value. The sample piece of 3×4×40 mm is cut from the resultant joined bodies and subjected to a four point bending test. The test result shows the joining strength of 300 MPa and proves the good joint condition.

In connection with the above embodiment, the preferably uniform heating can be achieved by changing the hold time, the current supplying passing time and the electric power with the elapsed time after the initiation of the current flowing. In the above embodiment, the electrode switching pattern are changed from the following reason: Because the joining agent has a high electric resistance at the initial stage of the current flowing, the voltage in a low level is applied across the electrodes having the shorter distance therebetween in accordance with the electrode switching pattern. As the electric resistance of the joining agent decreases with an increase in the temperature, the voltage is applied across the electrodes having a longer distance therebetween in accordance with the electrode switching pattern. This makes it possible to heat more uniformly the butted portion to be jointed with the electric power source having a small capacity by heating a wider current flowing area. In the above embodiment, the hold time is changed from the following reason: Since the joining agent is heated at a low heating rate due to a large diffusion of heat into the ceramic bodies at the initial current flowing stage, the longer hold time can heat more sufficiently each of the joint portion. After the temperature rises up sufficiently, the shorter hold time can heat more uniformly the whole of the butted portion to be jointed.

In the above embodiment, the current supplying process is carried out in a way to over-lap the previous current flowing area with the next current flowing area. The reason is that the over-lap process makes the variation in the electric resistance between the electrodes smaller than the non-overlap process. As a result, it is possible to move the stable current flowing area having a small variation in the voltage.

The electric joining process with the embodiment group 3 requires fundamentally a high voltage due to a large variation in the electric resistance with the temperature of the current flowing member. In such a case, an use of this electrode switching pattern has a large effect to decrease the capacity of electric power source, to achieve an uniform heating and to improve the safety operation.

It is noted that the joining can be carried out by using a constant value of the hold time and a constant electrode switching pattern or by using any other control pattern in accordance with the condition of the bodies to be jointed, different from the control pattern shown in FIG. 21.

Embodiment 11

Figures 22, 23:
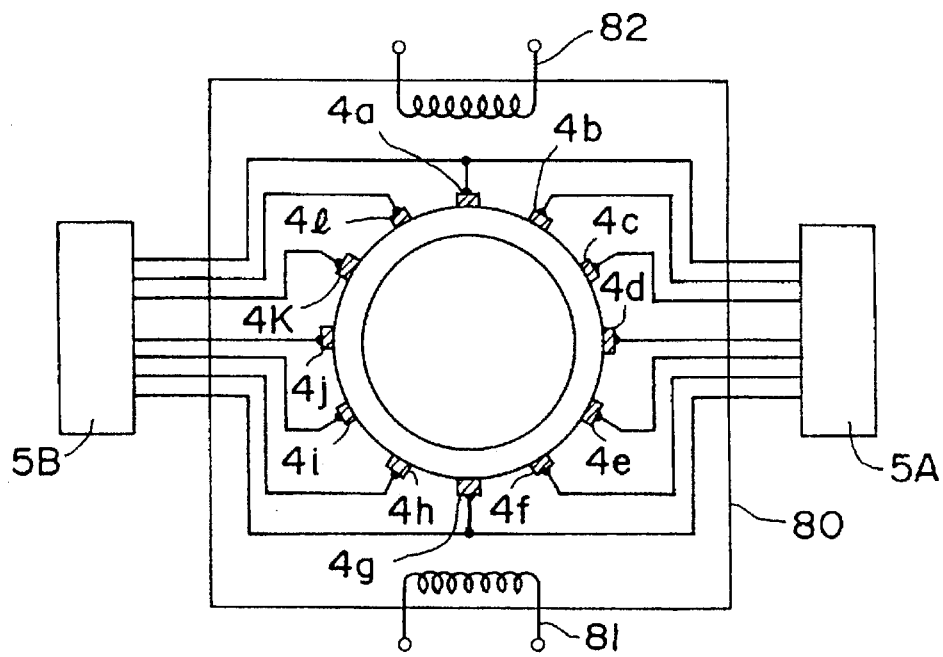
FIG. 22 is a top view showing an arrangement of electrodes used in the eleventh embodiment.
FIG. 23 is a table showing an electrode switching pattern used in the eleventh embodiment.

This embodiment is directed to a case in which a plurality of electrodes 4a to 4l arranged around the butted portion to be jointed between the two ceramic bodies in a pipe form are divided into a first electrode group G1 (electrode 4a to 4g) and a second electrode group G2 (4g to 4a). The electrodes of the two electrode groups are controlled in the electric power with the current supplying control apparatuses 5A and 5B. The auxiliary heating apparatus comprises an electric heating furnace 80. FIG. 22 is a top view showing the arrangement of the electrodes for use in the experiment to confirm the effects and FIG. 23 is a table showing the electrode switching pattern and the current supplying condition for use in the experiment. Two ceramic bodies for use in the experiment are pipes in a size of 100 outside diameter×90 inside diameter×30 mm length and are composed of an insulating $Si_3N_4$ ceramics. A used joining agent is a $CaF_2$ system joining agent. Twelve electrodes 4a to 4l made of tungsten are arranged around the periphery of the butted portion to be jointed at a regular intervals. The auxiliary heating apparatus is constructed from an electric heating furnace 80. The bodies to be jointed and all of electrodes are placed in the auxiliary electric heating furnace and heated to 900° C. with a heater 81 and 82. Then a voltage is applied across the electrodes 4a to 4l to start heating the joining agent. The electric heating furnace 80 is kept in argon gas atmosphere. The current supplying is carried out with the current control. As shown in FIG. 23, in accordance with the electrode switching pattern and the current supplying condition, both electrodes selected from the first electrode group G1 and the second electrode group G2, respectively are simultaneously supplied current with the current supplying control apparatuses 5A and 5B. In this case, it is necessary to control the current supplying control apparatuses 5A and 5B not to apply the voltage at the same time to the electrodes 4a and 4g of the first electrode group G1 and the second electrode group G2. After the joining time of 15 min, the pressing pressure is applied to the two ceramic bodies in the axial direction to face the two ceramic bodies to each other. Then, the joined ceramic bodies are cooled in accordance with the current supplying switching pattern. After the stop of the current supplying the heaters 81 and 82 are also stopped to cool the electric heating furnace 80 to room temperature to complete the joining process. The following is the reason why the electric current is in a large size at the initial stage and is decreased at the latter stage: The joining agent is heated as quickly as possible to lower the electric resistance of the joining agent and is subjected to a stable current supplying process. Next, after the butted portion to be jointed are sufficiently heated and are subjected to a stable current supplying and to be the temperature suitable for reaction, the current is caused to decrease. When the current is kept a large size, the butted portion to be jointed are over-heated and are resulted in a poor joining condition. The reason for the variation in the distance between the electrodes is resulted from the reason the same as that described in the embodiment 10. The evaluation test the same as that with the embodiment 10 shows the formation of good joining condition. It is noted that the auxiliary heating can be effected by any available gas flame instead of the electric heating furnace. In this embodiment, the whole of the bodies to be jointed are subjected to an auxiliary heating in the electric furnace. It is possible to use gas flame in place of electric furnace. The bodies to be jointed in a long size can be subjected at the butted portion vicinity to an auxiliary heating by placing only the butted portion vicinity in the electric furnace. This is preferable in view of the joining cost. The present embodiment is to divide the electrodes into two groups, but there may be a case to divide the electrodes into a plurality of groups more than two. In addition, the various methods described with the embodiment 6 are applicable for the present method of this embodiment.

The above embodiment groups are coincident with each other in a point that the electric current flows through the current flowing member in a direction parallel to the butted planes to be jointed. Therefore, the electrode switching pattern shown in embodiments 1 to 11 are applicable for the cases of above embodiment groups 1 to 3.

EMBODIMENT GROUP 4

In the above embodiments, the electric current is permitted to flow in a direction parallel to the butted planes to be jointed between the bodies to be jointed. The joining method according to the present invention is applicable for the joining method to permit the electric current to flow in a direction vertical to the butted planes to be jointed from one body to be jointed to another body to be jointed (D method). The present joining method is divided into two classes one of which uses a inserting member for heating and another of which uses no inserting member for heating as described in, for example, Japanese Patent Publication (unexamined) 1989-176283. These methods are conventional and hence are omitted in the detailed description. In a method to use the inserting member for heating, the inserting member for heating has an electric resistance larger than that of the bodies to be jointed and hence is heated convergently to generate a Joule heat. This is a very high efficient joining method. The joining method described with the following embodiments is applicable for a joining process to join two electrically conductive ceramic bodies to each other and a electrically conductive ceramic body with a metallic body.

Embodiment 12

Figure 24A:
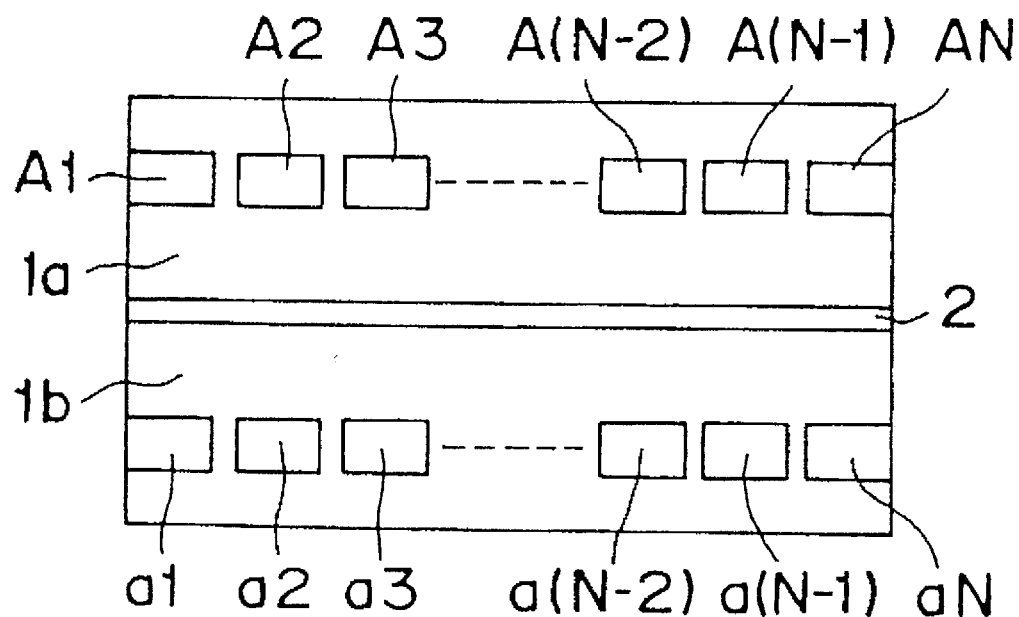
FIG. 24 (A) is a front view of two ceramic bodies used in the 12th embodiment, and FIG. 24 (B) is a plane view of that of FIG. 24 (A).
Figure 24B:
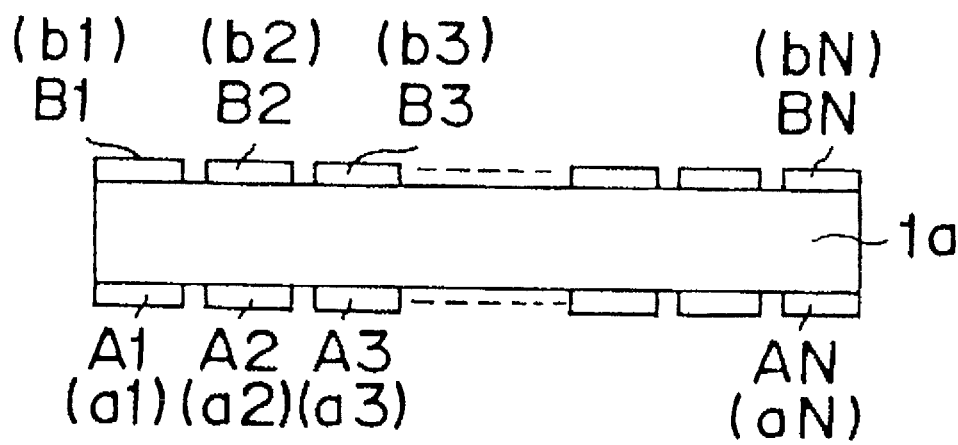

FIGS. 24 (A) and (B) are side view and a plane view of two ceramic bodies 1a and 1b which are in a rectangular form having a size the same as to each other and which are combined through a joining agent 2 at the butted portion to be jointed. In this embodiment, the ceramic body 1a has electrodes A1 to AN and B1 to aB linked closely to both sides thereof. The ceramic body 1b has electrodes a1 to aN and b1 to bN linked closely to both sides thereof. The electrodes A1 to AN and the electrodes a1 to aN make up a first electrode group and the electrodes B1 to BN and the electrodes b1 to bN make up a second electrode group. Each of the electrode groups are arranged in a longitudinal direction at regular intervals. In this embodiment, the first electrode group and the second electrode group can be supplied current by using various an electrode switching patterns. FIG. 25 shows an example of an electrode switching pattern usable in this embodiment. A pattern 1 is a pattern in which the two electrodes show the shortest distance and the current flowing area moves sequentially from one terminal to another terminal along with the butted portion to be jointed (a going way). A pattern 2 permits the current flowing area to move reciprocally along with the butted portion to be jointed. A pattern 3 has a current-flowing distance longer than that of the patterns 1 and 2 and permits the current flowing area to move reciprocally along with the butted portion to be jointed. A pattern 4 is a combination of the pattern 2 and the pattern 3. The above embodiment is directed to a case having no inserting member for heating. It is noted that the above electrode switching pattern can be applicable for the case having the inserting member for heating.

Embodiment 13

Figure 26A:
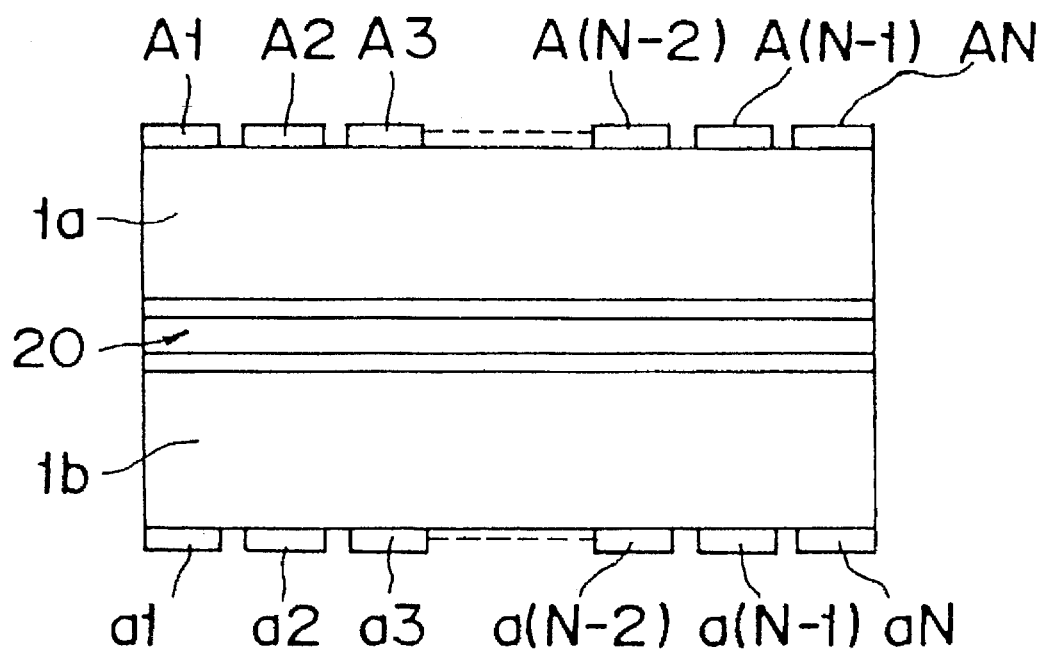
FIG. 26 (A) is a front view of two ceramic bodies used in the thirteenth embodiment, and FIG. 26 (B) is a plane view of that of FIG. 26 (A).
Figure 26B:
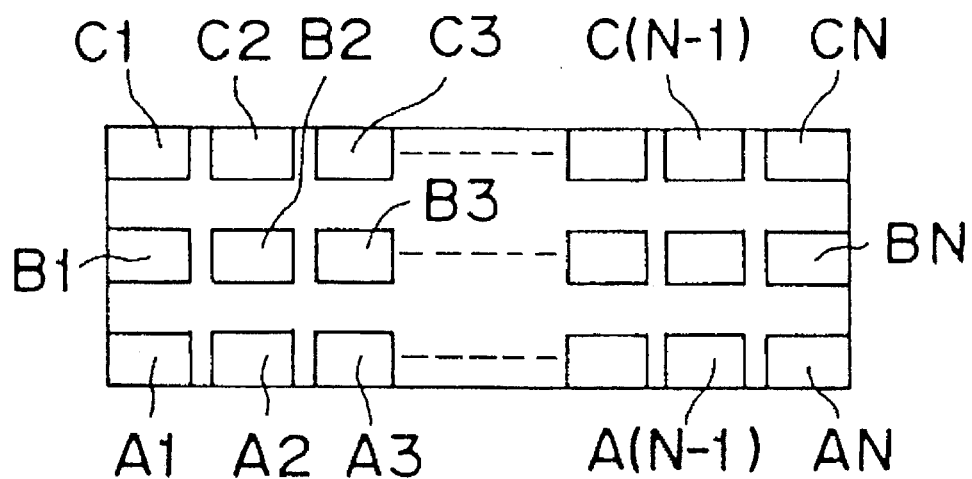

FIGS. 26 (A) and (B) are a side view and a plane view of two ceramic bodies 1a and 1b which are in a wide rectangular form having a size the same as each other and which are combined through a inserting member for heating 20 having a joining agent applied to both portion thereof at the butted portion to be jointed. In this embodiment, the ceramic body 1a has a first array of electrodes A1 to AN, a second array of electrodes B1 to BN and a third array of electrodes C1 to CN linked closely to the upper plane thereof with a pressing pressure. The ceramic body 1b has a third array of electrodes a1 to aN, a fourth array of electrodes b1 to bN (not shown in FIG. 26) and a fifth array of electrodes c1 to cN (not shown in FIG. 26) linked closely to the lower plane thereof with a pressing pressure. Each of electrodes a1-aN and b1-bN is linked to each other under a pressing pressure. The electrodes A1 to AN and the electrodes a1 to aN make up a first electrode group, the electrodes B1 to BN and the electrodes b1 to bN make up a second electrode group and the electrodes C1 to CN and the electrodes c1 to cN make up a third electrode group. The present embodiment uses three groups of electrodes but it is possible to use a plurality of groups of electrodes more than three. Therefore, FIG. 27 shows an example of electrodes switching patterns to use m groups of electrodes. It is possible to use an electrode switching pattern other than those shown in FIG. 27 in accordance with the width of the ceramic body. In this embodiment, the body to be jointed has the electrodes attached to both sides thereof in a way that the electrodes number at the both sides are the same to each other. It is possible to use the electrodes different in the number between both sides. The electrodes attached to one side can be formed into one body. The present embodiment uses a inserting member for heating but the electrode arrangement according to this embodiment can be applicable for the case not to use the inserting member for heating.

The current supplying method according the present embodiment is applied for the two ceramic bodies in a plate form but can be applicable for two bodies to be jointed in a pipe form or a complicated shape from each other.

Embodiment 14

Figure 28:
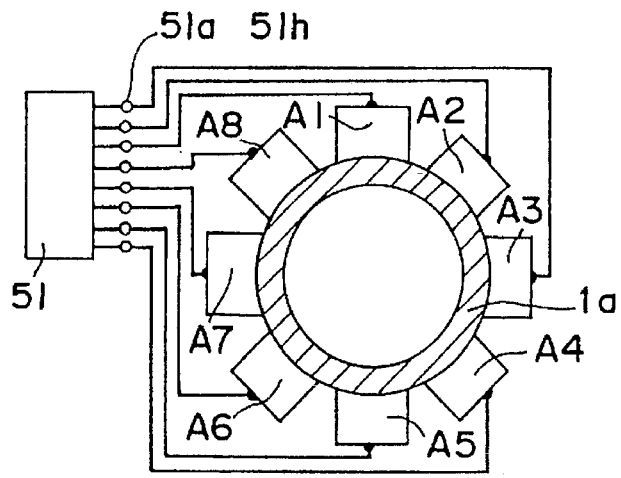
FIG. 28 is a plane view of a joining apparatus practicing the fourteenth embodiment and FIG. 29 is a front view of the joining apparatus shown in FIG. 28.
Figure 29:
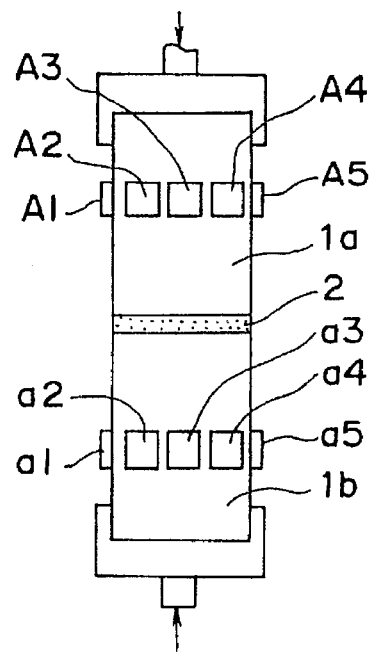
Figure 30:
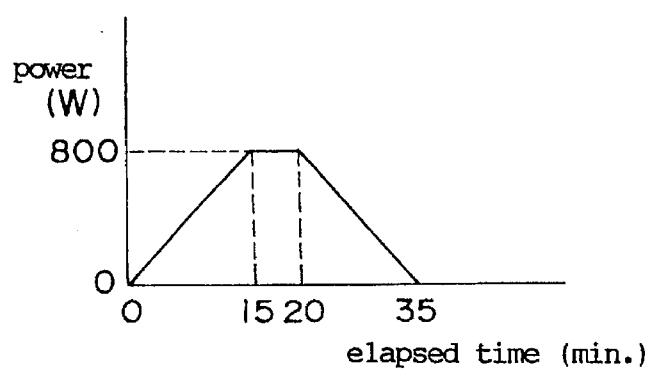
FIG. 30 is a graph showing an electrode switching pattern used in the fourteenth embodiment.

This embodiment is an example to confirm an effect of the current supplying method applied for two ceramic bodies in a pipe form. FIGS. 28 and 29 are a top view and a side view showing an arrangement of 16 electrodes made of carbon A1 to A8 and a1 to a8 linked to two ceramic bodies 1a and 1b which are composed of a SiC ceramic body in a pipe form of outside diameter 60×inside diameter 48×length 100 mm and which has an electric resistance of $10^{-2}$ Ω cm. A Ge—Si system joining agent 2 is inserted into the butted planes to be jointed of the two ceramic bodies and are held with a holding jigs at a given pressing pressure. It is necessary to provide a adiabatic material at the vicinity of the butted portion to be jointed in order to hold the butted portion to be jointed at a high temperature (not shown in FIG. 28). The joining process is carried out in argon gas atmosphere. The electrodes are arranged at regular intervals at the outside periphery of the ceramic bodies and are linked to the outside periphery of the ceramic bodies at a position apart from 50 mm from the butted portion to be jointed. These are carbon paste between the ceramic bodies and the electrodes. The butted portion to be jointed is heated by applying the voltage to the electrodes at room temperature. The current supplying process is carried out to be controled electric power in an automatic control by inputting an electrode switching pattern, the elapsed time after the current supplying, an current supplying hold time and the electric power shown in FIG. 30 to a program. After the joining time of 5 min at the joining temperature of 1200° C., the two ceramic bodies are cooled in accordance with the program to complete the joining process. The resultant joined bodies are subjected to a gas tight test with a helium leakage detector and shows a gas leakage in a level below a detectable value. The joint area is cut to a test piece, polished and then observed with a optical microscope. The joint area shows a uniformly jointed layer. The whole of the joint area shows a formation of a good joint area in a high air tight condition.

Embodiment 15

This embodiment is an example to confirm an effect of the current supplying method applied for two ceramic bodies in a wide rectangular form. Referring to FIGS. 32 (A) and (B), two ceramic bodies 1a and 1b are in a size of 100×50×10 mm (butted plane to be jointed, 50×100 mm) are composed of an electrically conductive $Si_3N_4$ having an electric resistance of $10^{-2}$ Ω cm. A Ti active metal brazing agent 2 is used. Each of ceramic bodies has eight carbon electrodes A1 to A4 and B1 to B4 and a1 to a4 and b1 to b4 (not shown in FIG. 32) attached to the upper plane and the lower plane thereof, respectively. The electrodes in each group (A1 to A4, B1 to B4, a1 to a4, b1 to b4) are arranged in regular intervals. The electrode has a contact area of 20×20 mm and are closely linked with the ceramic bodies thorough a carbon paste at a given pressing pressure. It is necessary to provide an adiabatic material at the vicinity of the butted portion to be jointed in order to hold the butted portion to be jointed at a predetermined temperature (not shown in FIG. 32). The joining process is carried out in argon gas atmosphere. The butted portion to be jointed are heated by applying the voltage to the electrodes at room temperature. The current supplying process is carried out to be controlled temperature in an automatic control by inputting a temperature, an electrode switching pattern, and an current supplying hold time shown in FIGS. 32 (C) and FIG. 33 to a program. The joining agent is heated at 900° C. for 5 mit. The sample piece of 3×4×40 mm is cut from the resultant joined body and subjected to a four point bending test. The test result shows the joining strength of 200 MPa and proves the good joint condition. The joint area is cut to a test piece, polished and then observed with a optical microscope. The joint area shows a uniformly joint layer. The whole of the joint area shows a formation of a good jointed area. Embodiment 16

Figure 34A:
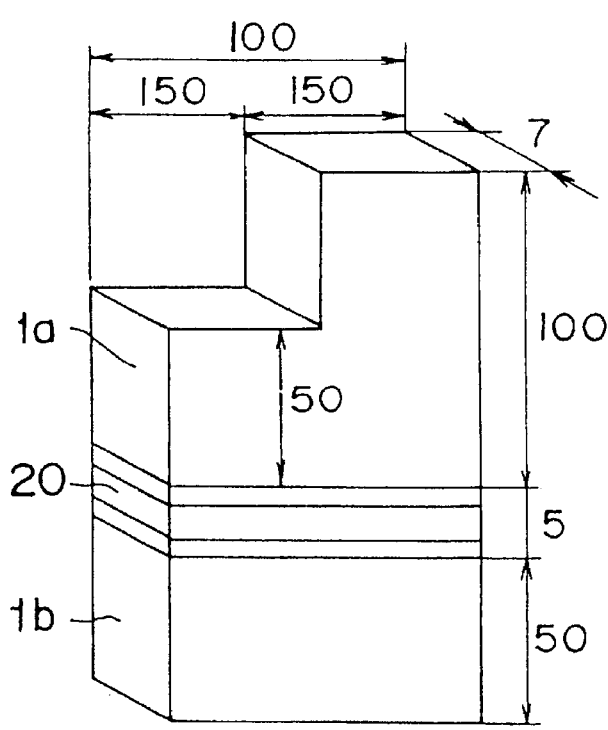
FIGS. 34 (A) and (B) are a perspective view and a side view of two ceramic bodies used in the sixteenth embodiment, respectively.
Figure 34B:
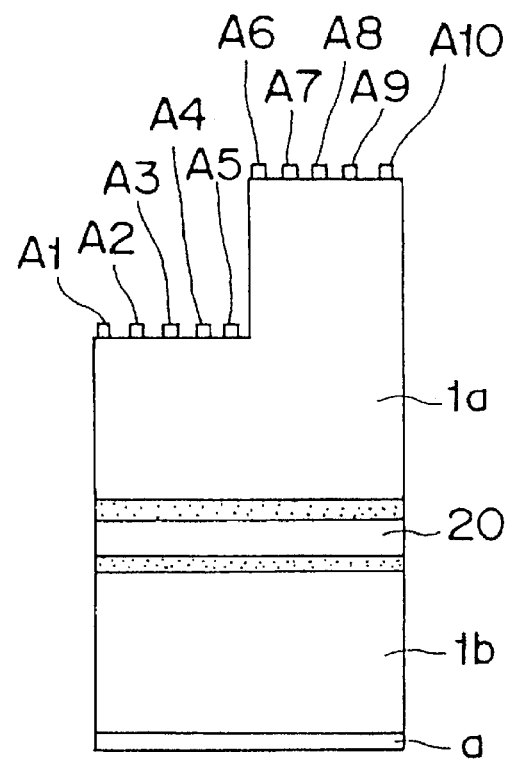
Figure 35:
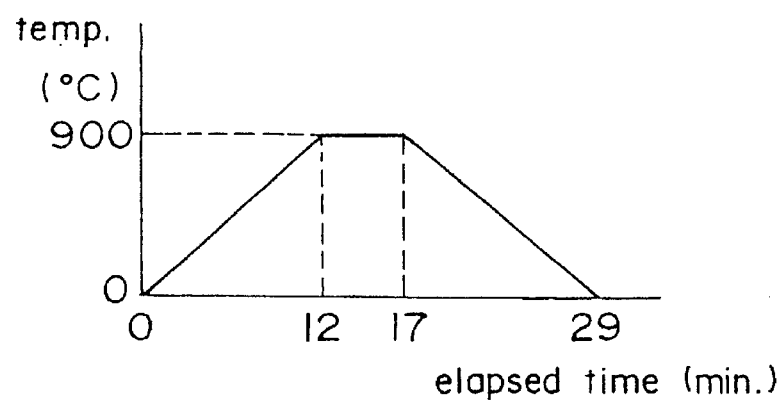
FIG. 35 is a graph showing a temperature control pattern used in the sixteenth embodiment.

This embodiment is an example to confirm an effect of the current supplying method applied for two ceramic bodies in a different shape from each other. Referring to FIGS. 34 (A) and (B), two ceramic bodies 1a and 1b are in a size shown in FIGS. 34 (A) and (B) and are composed of SiC ceramic having an electric resistance of $10^{-2}$ Ω cm. An inserting member for heating 20 is composed of a ceramic SiC body having an electric resistance larger by two figures than that of the ceramic bodies 1a and 1b and has a Ti system joining agent applied to both butted planes thereof. A lower electrode is made of carbon and is in close contact to the whole of lower plane of the ceramic body 1b. The ten upper electrodes A1 to A10 made of carbon are arranged at regular intervals as shown in FIG. 34 and are in close contact with the upper plane of the ceramic body 1a by a pressing pressure by a pressing apparatus (not shown in FIG. 34). There are carbon paste between inserting member for heating and each ceramic bodies. These are cazbon paste between inserting member for heating and each ceramic bodies. The joining process is carried out in vacuum atmosphere. The butted portion to be jointed is heated by applying the voltage to the electrodes at room temperature. The current supplying process is carried out to be controlled temperature to be controlled temperature in an automatic control by inputting a temperature, a time, an electrode switching pattern and an current supplying hold time shown in FIGS. 35 and 36 to a program. After the joining time of 5 min at the joining temperature of 900° C., the two ceramic bodies are cooled in accordance with the program to complete the joining process. The reason why the switching time for the electrode is made slow at a projection area of the ceramic body 1a is that the projection area is prevented from the delay of the temperature rising due to the large heat capacity for achievement of a uniform temperature distribution. The same result as the above can be obtained by making the electric power at the projection area larger under making the switching time constant. The joint area is cut to a test piece, polished and then observed with a optical microscope. The joint area shows a uniformly joint layer. The whole of the joint area shows a formation of a good joint area.

When the joining process is carried out with the electric current flowing in a direction to cross the butted plane to be jointed, that is, in a direction vertical to the butted plane to be jointed, it is possible to divide a plurality of electrodes into a plural groups and to supply electric current to every group with an electrode switching pattern the same as that of the embodiment 6.

With a joining process between a ceramic body and a metallic body, it is preferable to insert a soft metal member or an intermediate member having an intermediate value of a thermal expansion coefficient between the ceramic body and the metallic body and to decrease the residual stress for obtaining a good joint.

The electrically conductive ceramic body can be supplied current at room temperature not only at this embodiment but also at the embodiment groups 1 and 2. Hence, the auxiliary heating apparatus is not necessary for elevating the electric conduction but is useful for reducing the thermal shock. The auxiliary heating means comprises gas flame, electric furnace, lamp heating and their combination.

The method according to the present invention is to move the current flowing area along with the butted portion to be jointed by current supplying selectively and sequentially the electrodes more than a relative movement between three. It is not necessary to move the electrode and the ceramic body to be jointed during the current supplying according to the method of the present invention. The method according to the present invention requires movable portion in a small number and a maintenance in few times and is more safety. The close contact between the electrode and the current-flowing member permits the electric current to flow without generation of arc and results in a decrease in the damage or degradation of the ceramic bodies to be jointed due to the arc. The method to move the current flowing area along with the butted portion to be jointed permits the electric power source in a smaller capacity to heat the butted portion to be jointed in a long size up to a temperature desired when compared with the electric power source used in the conventional method to heat the whole of the butted portion to be jointed at the same time. In order to join two ceramic bodies having a different sectional shape or asymmetry shape, the current supplying condition can be controlled with the differences in the electric resistance between the electrodes and in the heat capacity for achievement of uniform heating at every portion. This can prevent the overheat at the local place in a different way from the conventional method to heat the whole of the butted portion to be jointed at the same time. Therefore, the method according to the present invention is capable of joining effectively two ceramic bodies in a large pipe form, two ceramic bodies having a long butted portion to be jointed or two ceramic bodies having a different sectional shape or asymmetry shape from each other. These butted portion to be jointeds can be supplied current in a good condition and heated to a desired temperature under a desired heating pattern to complete the joining.

The method according to claim 2 of the present invention is to supply electric current to under a suitable electrode switching pattern selected from the plurality of electrode switching patterns in accordance with a variation in the condition of the butted portion to be jointed and to control effectively the current supplying. In addition, the present method has a feature to join easily the two ceramic bodies in a complicated shape.

The method according to claim 3 of the present invention is to supply electric current to the electrodes having the shortest distance at the initial stage and to use the electrode switching pattern to increase stepwisely the current-flowing distance. This makes it possible to decrease a necessary maximum voltage and to heat the butted portion to be jointed in a long size to a desired temperature with a electric current in a low level. In addition, this method is superior in the safety.

The method according to claim 4 of the present invention is to supply electric current in a way that the previous current flowing area over-laps with the next current flowing area. This method makes it possible to supply electric current at a condition in which the current flowing area has an electric resistance as low as possible, compared with the case having no overlap current flowing area. Hence, this method has a feature to permit the current flowing area to move smoothly with a slight variation in the voltage under suppressing the temperature lowering at the heated portion.

The method according to claim 5 of the present invention is to heat uniformly the butted portion to be jointed without changing the current-flowing distance due to the variation in the selection of the electrodes and in accordance with an increase in the temperature of the butted portion to be jointed, a decrease in the electric resistance of the current flowing area and a variation in the heat capacity of the current-flowing portion. Further, this method can decrease the thermal shock of the ceramic bodies and control the reaction of the joining agent with the ceramic bodies.

The method according to claim 6 of the present invention is to classify the electrodes into a plurality of electrode groups along with the butted portion to be jointed and to control the current supplying process in accordance with the given electrode switching pattern and a given current supplying condition in respect to every electrode group. Therefore, it is possible for this method to join effectively two ceramic bodies having a long butted portion to be jointed or a complicated shape by heating the butted portion to be jointed to a desired temperature in a short time.

The method according to claim 7 of the present invention is to control each of electrode groups with each of independent current supplying control apparatus and accordingly has a feature to control, in the current supplying condition, easily each of electrode groups.

Embodiment 17

Figure 37:
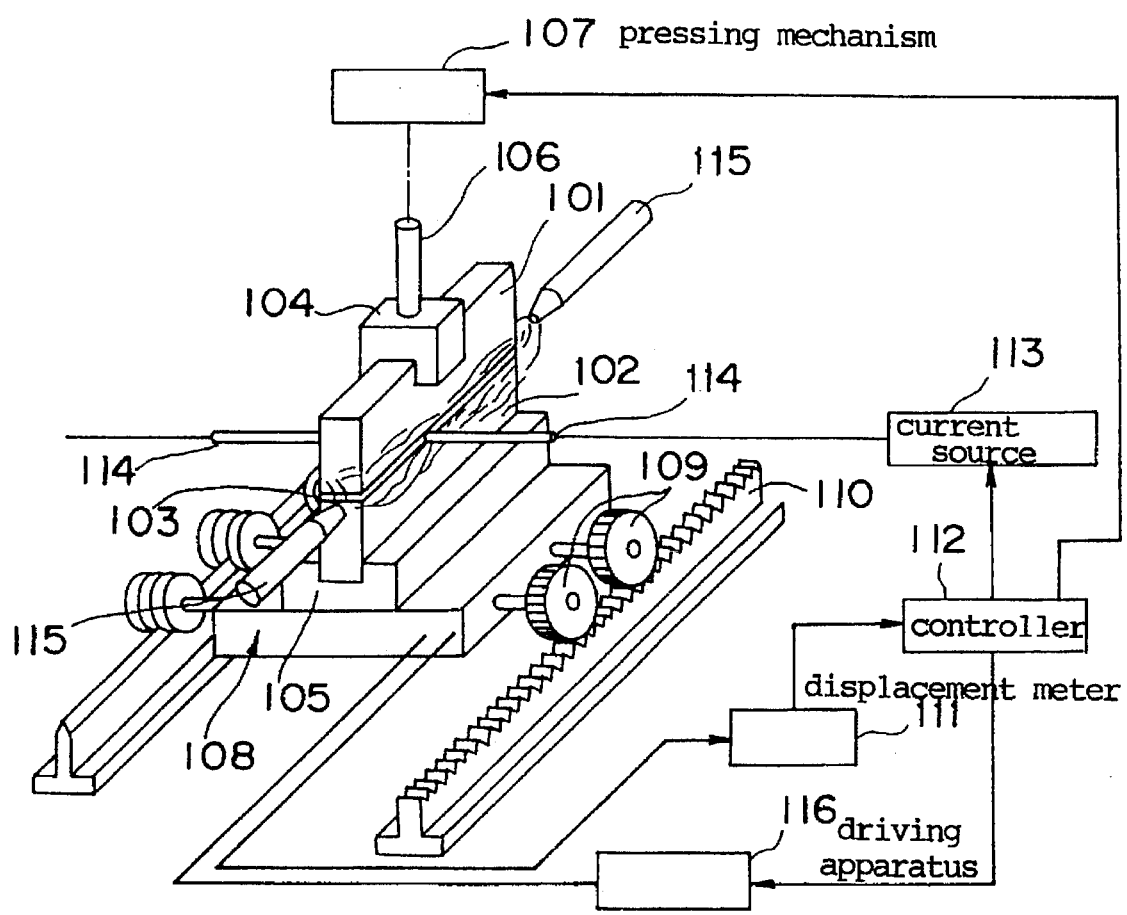
FIG. 37 is a perspective view of a joining apparatus for practicing the seventeenth embodiment.

FIG. 37 is a perspective view of a joining apparatus for practicing the joining method according to the present invention. Referring to FIG. 37, reference numerals 101 and 102 denote two ceramic bodies to be jointed in a rectangular form. A reference numeral 103 denotes a joining agent in a solid sheet form, the composition of which varies with the materials of ceramic bodies. The description of the joining agent is disclosed in the Japanese Patent Publication (examined) 1987-65986 and other publication and is omitted. Reference numerals 104 and 105 denote clamp jigs for holding the two ceramic bodies 101 and 102 in a vertical direction. The upper clamp jig 104 is attached with a linking jig or linking member 106 which is an element of a control mechanism. It is noted that a holding mechanism for holding movably the linking member 106 is omitted in the description. The linking member 106 is driven with a pressing mechanism 107 having a liquid cylinder operated as a driving source. The linking member 106 is separated from the diving member (not shown in the drawing) of the pressing mechanism 107. The linking member 106 is linked with the driving member when the pressing mechanism executes the pressing. It is possible to control the pressing mechanism 107 to take either of two states: One state is a pressing state that the pressing mechanism 107 presses the two ceramic bodies 101 and 102 thorough the linking member 106 in accordance with the outside command. Another state is a release state that the pressing mechanism 107 does not press and permits the linking member to move freely in an axial direction (a vertical direction).

The lower clamp jig 105 is fixed at a moving carrier 108. The moving carrier 108 is provided with a motor and a driving mechanism at the inside and also with a position detector including an encoder consisting of a magnetic sensor or optical sensor (not shown in the drawing). The moving carrier 108 can be moved by an engagement between a pinion 109 equipped at a wheel attached to the one side of the moving carrier and a lack 110 to guide the pinion 109. The output signal from the position detector (not shown in the drawing) attached to the moving carrier 108 is inputted to a displacement meter 111 which transforms the data for the position of the moving carrier 108 into a signal necessary for calculation control of a controller 112 (information with a position relation between the electrodes and the two ceramic bodies to be jointed).

A reference numeral 113 denotes an electric current source to supply the electric current to two electrodes 114 and 114 for current supplying the joining agent 103 in accordance with the command from the controller 112. A reference numeral 115 denotes a torch for projecting the gas flame as an auxiliary heating means to pre-heat the butted portion to be jointed. In this embodiment, two torches 115 and 115 are arranged in a way to envelope the whole of the butted portion to be jointed with flames from the both sides of a longitudinal direction of the butted portion to be jointed between the two ceramic bodies 101 and 102. The two torches 115 and 115 are fixed to the moving carrier 108 (not shown in the drawing) and is moved with the movement of the moving carrier 108. Accordingly, the butted portion to be jointed can be always enveloped with the gas flame. It is noted that the number or the attaching condition of electrodes 114 . . . and the torches 115 . . . is arbitrary. For a purpose of generating a relative movement in a longitudinal direction of the butted portion to be jointed between the two ceramic bodies 101 and 102 and the electrodes 114 or the torches 115, the present embodiment manages the driving apparatus 116 to send a driving power and a driving command to a motor arranged in the inside of the moving carrier 108. The driving apparatus is controlled by the controller 112.

The controller 112 controls the electric current supplying apparatus 113 or the driving apparatus 116 to change the electric power per unit area to be supplied to every portion along with a longitudinal direction of the butted portion to be jointed in accordance with a variation in the heat capacity. A variation in the heat diffusion coefficient and the electric resistance varies with the shape of two ceramic bodies can be obtained by a theoretical calculation or the preliminary experiment. As a result, it is possible to determine the electric power W or the current I and the moving rate S (relative moving rate) of the moving carrier 108. The controller 112 is caused to memory these data and to control.

Figure 38A:
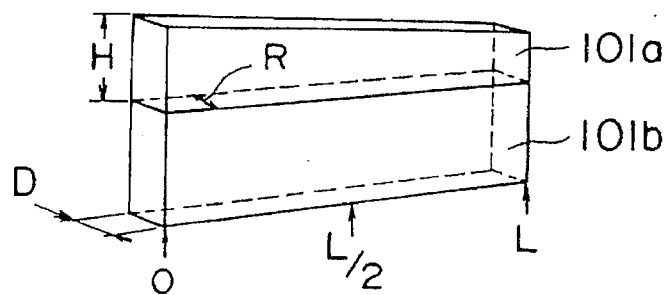
FIG. 38 (A) is a perspective view of two bodies to be jointed and FIG. 38 (B) is a graph showing a relationship among the heat diffusion coefficient, electric resistance, supplying electric power and relative moving speed in a relation to the length of bodies to be jointed.
Figure 38B:
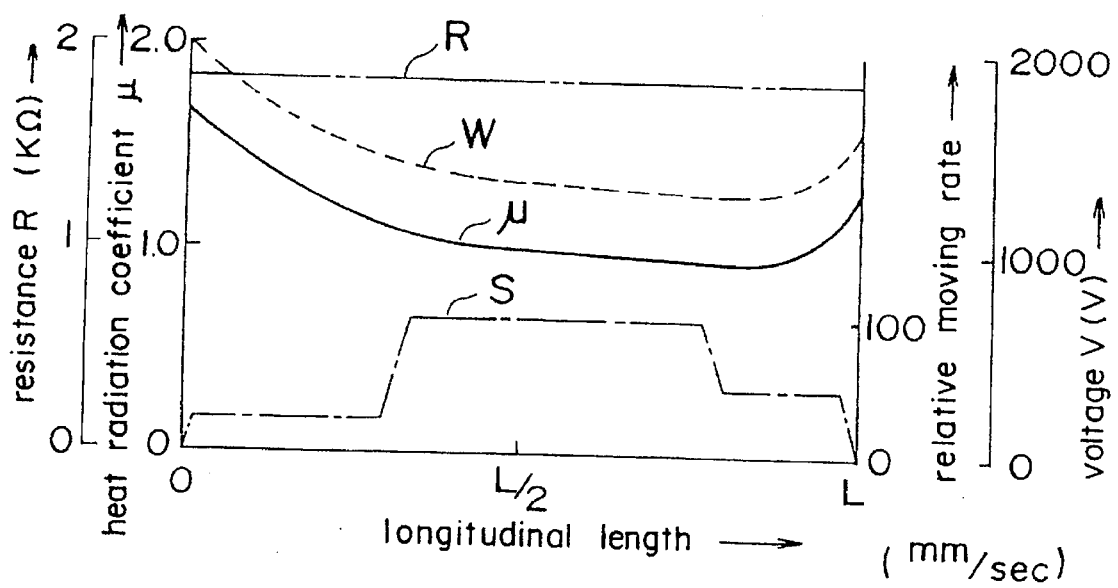

Referring to FIGS. 38 (A) and (B), the description will be directed to a controlling method by using a controller 112. Referring to FIG. 38 (A), two ceramic bodies 101a and 101b are the same in the width D and the length L as each other. The ceramic body 101a placed at upper position has a height H rating with the longitudinal direction of the butted portion to be jointed but the ceramic body 101b placed at a lower position has a constant height. In this case, the current-flowing distance (width D) is constant along with the longitudinal direction of the butted portion to be jointed. Accordingly, the electric resistance in spite of current-flowing portion is constant. In connection with a case shown in FIG. 38 (A), FIG. 38 (B) shows a variation in the heat diffusion coefficient $\mu$, a variation in the electric power W at a constant value of relative moving rate S and a variation in the relative moving rates at the constant value of the electric power as a function of the longitudinal length of the ceramic body (horizontal axis). It is noted heat that the heat diffusion coefficient $\mu$ is expressed by 1 of diffusion amount at the center of the longitudinal direction (L/2). The terminal portion of ceramic bodies 101 and 102 at the longitudinal direction act as a heat radiator and diffuse heat in a large amount. Further, as the ceramic body 101a has a height H increasing with a longitudinal direction, that causes the heat to diffuse toward the height direction from butted portion and therefore, has a high heat diffusion coefficient $\mu$. As a result, in the case of FIG. 38 (A), the terminal portion at the longitudinal direction of the butted portion to be jointed have a large heat diffusion coefficient $\mu$ (heat capacity in a indirect meaning). In order to melt sufficiently the joining agent at the butted portion to be jointed, it is necessary to determine the electric power to be supplied to every portion under consideration of the heat diffusion (heat capacity). The electric power per unit area can be easily controlled by changing at least one factor of the electric current or electric power and the relative moving rate. With a constant value of relative moving rate S, the electric current can be changed with the pattern shown by the curve W of FIG. 38 (B). With a constant value of the electric power W, the relative moving rate can be controlled with the pattern shown by a broken line S of FIG. 38 (B).

Next, referring to FIG. 37, the description is directed to a method for joining two ceramic bodies. The two ceramic bodies 101 and 102 shown in FIG. 37 are of a rectangular form in the same size to each other. A variation in the heat capacity at every portion of the butted portion to be jointed can be known indirectly with the heat diffusion coefficient in a similar way to that of FIG. 38 (A). In order to make the relative moving rate constant, it is necessary to enlarge the moving distance of the moving carrier 108. Accordingly, the present embodiment is to control the relative moving rate at a constant value of the electric power W. First, the butted portion to be jointed are pre-heated with the gas flame from the torches 115 . . . . The pre-heating continues until the butted portion to be jointed are heated at, for example, 800° C. Then, the current supplying starts through the electrodes 114. During the current supplying period, the gas flame is projected to the butted portion to be jointed in order to prevent every portion from lowering down.

The controller 112 sends the current supplying command to the current supplying apparatus 113 and manages the current supplying apparatus 113 to start supplying current to the joining agent. At the same time, the controller 112 send the command to the driving apparatus 116 to move the moving carrier 108. The moving carrier 108 is controlled in the moving rate with the given moving rate pattern shown in a broken line of FIG. 38 (B). In general, the moving carrier 108 carries out reciprocal movements several times to supply current the joining agent repeatedly. This makes it possible to heat uniformly the whole of the butted portion to be jointed to a desired temperature. After the joining agent melts sufficiently and reacts with the two ceramic bodies 102 and 102, the controller 112 manages the current supplying apparatus 113 to stop supplying current and at the same time, the moving carrier 108 to stop. The stop position of the moving carrier 108 is predetermined in such a way that the pressing mechanism 107 can press given pressure the ceramic body placed at the upper position in a direction toward the ceramic body placed at a lower position. When the moving carrier 108 stops, the controller 112 manages the pressing mechanism 107 to press with a given pressure the ceramic body placed at the upper position against the ceramic body placed at the lower position. As a result, the two ceramic bodies are pressed in a direction at which the two ceramic bodies are joined and then combined at the butted planes to be jointed. The current supplying of the butted portion to be jointed can be stopped at any time after or before the operation of the pressing mechanism 107 or at the same time with operation of the pressing mechanism 107. After the two ceramic bodies are pressed by the pressing mechanism 107, the two ceramic bodies are cooled to complete the joining process. When there is no enough room around the butted portion to be jointed, it is preferable that the torches 115 and the electrodes 114 are independently moved. In such a way, the butted portion to be jointed can be heated sufficiently by the torches in a necessary number and can be supplied current by moving freely the electrodes 114 even at a narrow place.

In the above embodiment, the auxiliary heating is executed by the torches 115 but can be carried out by any other method such as an electric resistance furnace or a halogen lamp. The electric joining method used in this embodiment is carried out by an A method but can be carried out by any other method. When there is no need to consider the thermal stress, it is not necessary to use the auxiliary heating to elevate the electric conduction.

The electric joining method according to the present invention is to control the electric energy supplied from two electrodes to the joining agent in accordance with the heat capacity or every portion of the ceramic bodies in view of the heat radiation. When the two ceramic bodies are in a complicated shape or have a long butted portion to be jointed, this electric joining method achieves an joint in a good condition by heating uniformly the whole of the butted portion to be jointed without an excess or a lack of the heat.

It is possible to control easily the electric energy by at least one of the relative moving speed and the electric power to be supplied to the electrodes or at least one of the moving speed and the electric current to be supplied to the electrodes.

An arrangement that the electrodes can be operated independently on the auxiliary heating means permits the electrodes to supply electric current to the joining agent from a position close to the butted portion to be jointed under pre-heating the butted portion to be jointed with the auxiliary heating means positioned at a place to permit the pre-heating operation. As a result, it is possible to obtain a good joining condition.

Embodiment 18

Figure 39:
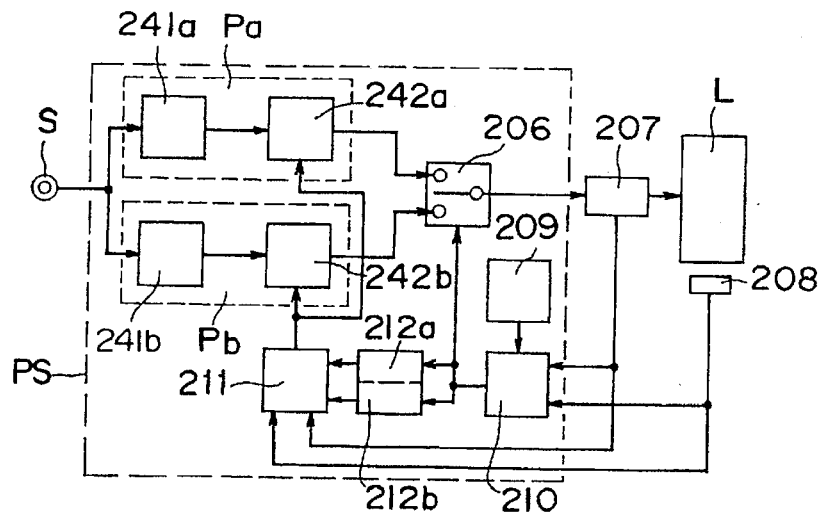
FIG. 39 is a block diagram of an electric power source for practicing the eighteenth embodiment.

FIG. 39 is a block diagram of an electric power source relating to the joining method according to the present invention. Referring to FIG. 39, a reference character S denotes a terminal for the electric power source, reference numerals 241a and 242a denote a first transformer and a first electric current (voltage) control circuit comprising saturable reactor or semiconductor control elements such as cylystor or transistor, respectively, for use in a high voltage, a low current output electric source Pa and reference numerals 241b and 242b denote a second transformer and a second electric current (voltage) control circuit comprising saturable reactor or semiconductor control elements, respectively, for use in a low voltage, a high current output electric source Pb.

A reference numeral 206 denotes an electric power source switching circuit for switching between the output of the first control circuit 242a and the second control circuit 242b. A switching signal generator 210 outputs a signal in accordance with the difference between a signal from a electric (voltage) current detector 207 for detecting the current (voltage) supplied to the load L of the two ceramic bodies or a signal from a temperature detector 208 for detecting the temperature at the butted portion to be jointed having the load L, for example, a signal from a radiation thermometer and a signal from an electric source setting circuit 209. The electric power source switching circuit 206 is switched by the signal from the switching signal generator 210 in accordance with the difference between the two signals.

A reference numeral 211 denotes a electric current (voltage) control signal generator for controlling a gate circuit, base driving circuit and reactance control circuit for outputting a signal to change the electric current (voltage) supplied to the load L. The electric current (voltage) control signal generator 211 selects either of a first and a second heating pattern setting circuit 212a and 212b for use in a high voltage and low current output electric power source Pa and a high current and a low voltage power source Pb in accordance with the output signal from the switching signal generator 210. When the signal is one from each of heating pattern setting circuit, for example, when a constant current control, a constant voltage control and a constant temperature control are carried out, the control signal generator 211 operates with the difference between an electric signal corresponding to the current, voltage and temperature and the output signal from the current (voltage) detector 207 or a temperature detector 208, the load L being heated based on the desired heating pattern. It is noted that the electric power source PS is composed of components excluding the electric power source terminal S, the current (voltage) detector 207, the temperature detector 208 and the load L.

Figure 43:
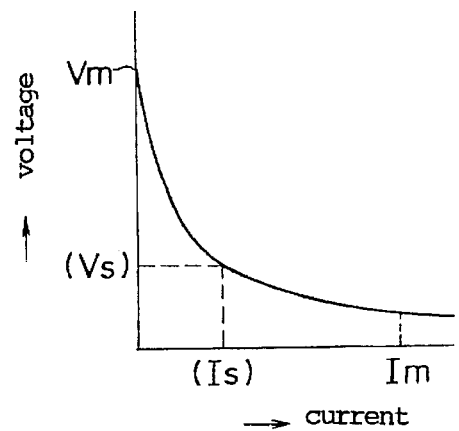
FIG. 43 is a graph showing the electric current vs voltage characteristics.

The setting value of the electric power source switching circuit 209 can be a current value (Is) or voltage (Vs) corresponding to a portion having a maximum value of the variation in the voltage-current characteristics shown in FIG. 43 and a current value or voltage value which are minimum in view of the cost. It is necessary to vary this value in accordance with a kind of the two ceramic bodies, the joining agent and the inserting member for heating to which current is supplied, the joining condition and the joining state.

Figure 40:
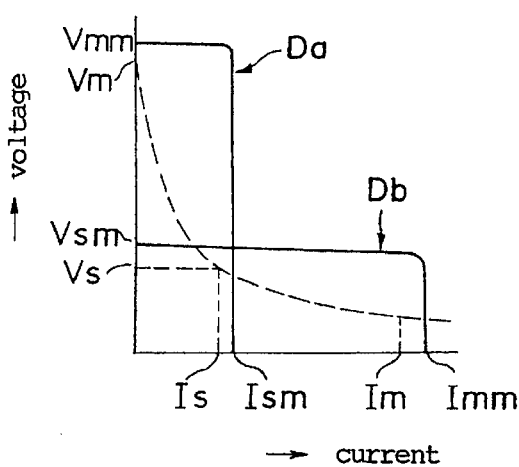
FIG. 40 is a graph showing the electric current vs voltage characteristics of the electric power source of the 18th embodiment.

In a condition that both electric power sources Pa and Pb are in a constant current characteristic and the additional values are given to the current supplying starting voltage Vm, the maximum current Im and the electric current value (Is) and the voltage value (Vs) shown in FIG. 43, the electric power source Pa for a high voltage and a low current has maximum rated values of voltage Vmm and current Ism and shows a voltage-current characteristic shown in a solid line Da of FIG. 40. On the other hand, the electric power source Pb for a low voltage and a high current has maximum rated values of voltage Vsm and current Imm and shows a voltage-current characteristic shown in a solid line Db of FIG. 40. It is necessary to vary this value in accordance with a kind of the two ceramic bodies, the joining agent and the inserting member for heating, the joining condition and the joining state.

The electric power source applicable for the joining method according to the present invention is an electric power source in a constant voltage characteristic or a constant electric power characteristic besides the conventional electric power source in a drooping characteristic or a constant current down characteristic. As a practical matter, an available electric source is an AC electric power source in a commercial frequency or AC or DC electric power source of variable frequency by an invertor type.

When a body to be jointed has a load L in a negative temperature dependence of electric resistance, it is necessary to measure the voltage-current curve shown in FIG. 43 and determine Vm, Im and (Vs) and (Is). The next step is to prepare two kind of the electric power source, one is the electric power source Pa for a high voltage and a low current having maximum rating values of voltage Vmm and the current Ism and the other is the electric power source Pb for low voltage and a high current having maximum rated values of voltage Vsm and current Imm.

After the electric current supplying starts by applying the output voltage from the electric power source Pa for a high voltage and a low current, the electric current increases gradually with a first current (voltage) control circuit 242a in accordance with the heating pattern predetermined with the first heating pattern setting circuit 212a. On the other hand, the voltage between the electrodes decreases gradually.

When a value of the electric current or the voltage between the electrodes detected by a current (voltage) detector 207 reaches the current value Is or the voltage value Vs set by an electric power source switching circuit 209, an electric power source switching circuit 206 operates with the output signal from the switching signal generator 210 to switch to the electric power source for a low voltage and a high current Pb and also to a second heating pattern setting circuit 212b.

After that, the electric current increases gradually with a second current (voltage) control circuit 242b in accordance with the heating pattern predetermined with the second heating pattern setting circuit 212b. Then the butted portion to be jointed is heated to a desired temperature for a given time and is cooled to room temperature by decreasing the electric current to complete the joining process.

Embodiment 19

Figure 42:
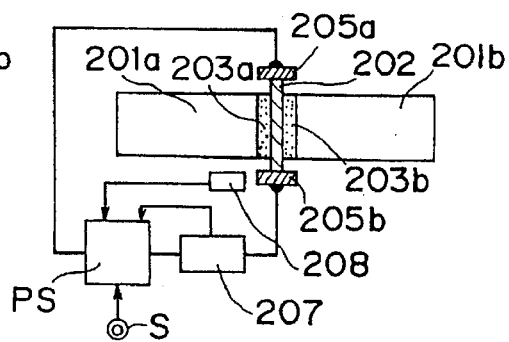
FIG. 42 is an outline figure showing a joining process applied to the nineteenth embodiment.

FIG. 42 shows an embodiment in which the electric power source PS according to the present invention is applied for the conventional method C. Two ceramic bodies to be jointed 201a and 201b are made of a high density SiC ceramic and the inserting member for inserting member for heating made of reaction sintering SiC ceramic having Si dipped therein, which has a high negative temperature dependence of the electric resistance.

The measurement is first carried out with the voltage-current characteristic shown in FIG. 43 in advance and is used for the determination of Vm, Im and (Vs), (Is). The used electric power source for use in joining process is an invertor type of an electric power source in a constant current characteristic characterized by that the electric power source for a high voltage and a low current Pa is determined to have the maximum rated values Vmm=250 V, Ism=10 A and the electric power source for a low voltage and a high current Pb is determined to have the maximum rated values Vsm=20 V, Imm=250 A. Accordingly, the capacity of electric power source is 62.5 kVA with the conventional method and is 7.5 kVA with the method according to the present invention and the input power kVA is in a reduction rate the same as that of the capacity of the electric power source.

When the electrodes 205a and 205b are provided with the output voltage from the electric power source Pa for a high voltage and a low current, the electric current starts at about 240 V and then increases gradually with a first current (voltage) control circuit 242a in accordance with the heating pattern predetermined with the first heating pattern setting circuit 212a. On the other hand, the voltage between the electrodes decreases gradually.

When a value of the electric current or the voltage between the electrodes detected by a current (voltage) detector 207 reaches the current value Is=8 A or the voltage value Vs=15 V set by an electric power source switching circuit 209, an electric power source switching circuit 206 operates with the output signal from the switching signal generator 210 to switch to the electric power source for a low voltage and a high current Pb and also to a second heating pattern setting circuit 212b.

After that, the electric current increases gradually with a second current (voltage) control circuit 242b in accordance with the heating pattern predetermined with the second heating pattern setting circuit 212b. Then the butted portion to be jointed is heated to a desired temperature 1450° C. for 10 min with the current of 230 A and the voltage of 9 V between the electrodes 205a and 205b and is cooled to room temperature by decreasing the electric current to complete the joining process. It is necessary to control the electric current to rise every 0.1 A in order to prevent the ceramic bodies from the damage due to the thermal shock in this embodiment.

Embodiment 20

Figure 41:
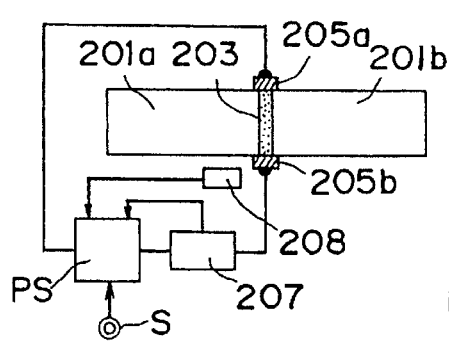
FIG. 41 is an outline figure showing a joining process applied to the twentieth embodiment using an electric power source PS according to the present invention.

FIG. 41 shows a second embodiment in which the electric power source PS according to the present invention is used. Two ceramic bodies to be jointed 201a and 201b are made of a insulating $Si_3N_4$ ceramic in a plate form of (50×20×25 mm). A joining agent 203 of a solder including, as a main ingredient, $CaF_2$ and kolinite is inserted at the butted planes to be jointed between the two ceramic bodies. The two electrodes 205a and 205b faced to each other are linked with the butted portion to be jointed and are connected to an electric power source PS. The joining agent 203 has a very negative temperature dependence of the electric resistance and is in a non-conduction at room temperature but comes to be in a conduction at high temperature.

The measurement is first carried out with the voltage-current characteristics shown in FIG. 43 in advance and is used for the determination of Vm, Im and (Vs), (Is). The electric power source for electric joining is a reactor type of electric power source Pa in a drooping characteristic having the maximum rated values Vmm=3000 V, Ism=200 mA or a sylistor type of electric power source Pb in a constant current characteristic having the maximum rated values Vsm=400 V, Imm=2 A. Accordingly, the capacity of electric power source is 6 kVA with the conventional method and is 1.4 kVA as a whole with the method according to the present invention and the input power kVA is in a reduction rate the same as that of the capacity of the electric power source.

The two ceramic bodies 201a and 201b are pre-heated at the butted portion to be jointed with gas torches (not shown in the drawing) to a temperature of 850° to 900° C. and then the joining agent 203 is increased in the electric conductivity. By providing the electrodes 205a and 205b with a higher voltage from the electric power source Pa, the electric current starts at about 2800 V and thereafter increases gradually with a first current (voltage) control circuit 242a in accordance with the heating pattern predetermined with the first heating pattern setting circuit 212a.

When a value of the electric current or the voltage between the electrodes detected by a current (voltage) detector 207 reaches the current value Is=150 mA or the voltage value Vs=380 V set by an electric power source switching circuit 209, an electric power source switching circuit 206 operates with the output signal from the switching signal generator 210 to switch to the electric power source Pb for a low voltage and a high current.

After that, the electric current increases gradually with a second current (voltage) control circuit 242b in accordance with the heating pattern predetermined with the second heating pattern setting circuit 212b. Then the butted portion to be jointed is heated to a desired temperature 1700° C. with the current of 1.6 A and the voltage of 370 V between the electrodes 205a and 205b and after 10 min is cooled to room temperature by decreasing the electric current to complete the joining process. It is noted that the pre-heating temperature is decided to be the above temperature in view of the pre-heating facility, pre-heating cost and the prevention of the ceramic bodies from degradation.

In the above embodiment, the first and the second transformer 241a and 241b are independent from each other but it is possible to use a one transformer using a common iron core and outputting two powers.

When the voltage vs. current curve is in a high slop at a low current range, or when the ceramic body is low in the thermal resistance to the thermal shock, it is possible to use a plurality of the electric power sources for a high voltage and a low current divided the output power moreover.

In such a way, the joining method according to the present invention achieves the large amount of the reduction in the facility cost and the running cost. When a ceramic body having a poor thermal resistance to the thermal shock is joined, it is possible to prevent the ceramic body from the damage by using an electric power source in a low cost because the temperature control can be easily achieved by the current supplying control at a low current range.

Embodiment 21

Figure 44A:
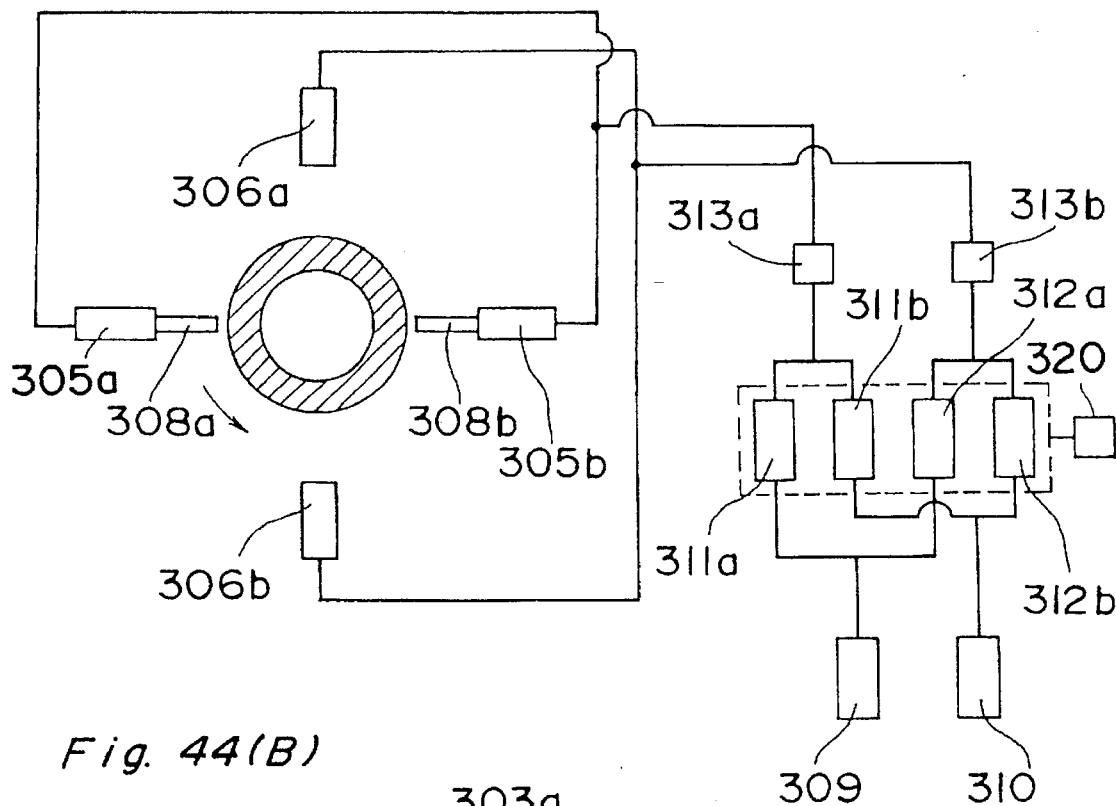
FIG. 44 (A) and FIG. 44 (B) are a cross sectional top view and a cross sectional front view of a joining apparatus practicing the 21th embodiment, respectively.
Figure 44B:
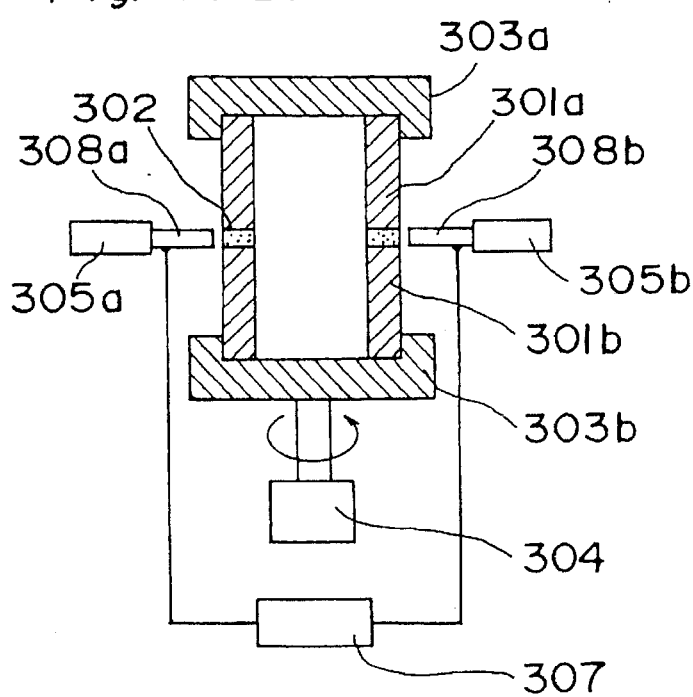

FIGS. 44 (A) and (B) are a top view and a front view of an apparatus practicing the joining method according to the present invention, respectively. Referring to FIG. 44, reference numerals 301a and 301b denote two $Al_2O_3$ ceramic bodies in a pipe form (φ60×φ55×100 mm length) and have a joining agent 302 inserted at the butted planes to be jointed therebetween. The two ceramic bodies 301a and 301b with the joining agent 302 are fixed by fixing jigs 303a and 303b and are rotated with a rotating device 304 which rotates with the jig 303b.

Reference numerals 305a, 305b and 306a, 306b denote gas torches for first and second systems, respectively and are arranged in a way that the heading portion of each of the torches is apart from the butted portion to be jointed at a distance of 20 mm. The first system of the torches 305a and 305b are combined with electrodes 308a and 308b connected to an electric power source 307 into one body. The electrodes 308a and 308b are linked or positioned closely, at each of their heading portion, to the butted portion to be jointed.

Reference numeral 309 and 310 denote an inflammable gas cylinder and a burning support gas cylinder, respectively. The gas flow is adjusted by gas flow adjusters 311a, 312a and 311b, 312b. The gas flow adjusters 311a, 312a and 311b, 312b are switched to the first and the second systems by a system switching control device 320. The above both gases are mixed together by gas mixers 313a and 313b and are supplied to the first system of torches 305a and 305b and the second system of the torches 306a and 306b.

The torches 305a, 305b and 306a, 306b are controlled in a firing or stopping time, a system switching time, an current supplying starting time or an current supplying stopping time with a time program predetermined with a heating pattern or a temperature setting signal from a temperature sensor (not shown).

In such a structure, the two ceramic bodies are pre-heated, at the butted portion to be jointed and its vicinity, with the first system of torches 305a and 305b fired under being rotated. Propane gas as a inflammable gas and oxygen gas as a burn support gas are caused to flow at rates of 0.4 l/min and 1.0 l/min, respectively. After 5 min, the butted portion to be jointed are heated to a temperature of about 500° C. and then the second system of torches 306a and 306b are fired to continue the pre-heating. The gas flow of the second system is the same as that of the first system. After 10 min, the butted portion to be jointed are heated to a saturated temperature of 900° C. After that, the electrodes 308a and 308b are applied with voltage from the electric power source 307 to supply current to the joining agent 302. The current is controlled to increase gradually in a way that the joining agent reaches a desired temperature with a control device attached to the electric power source 307. After the two ceramic bodies are kept for 5 min, the current is gradually decreased and finally the electric power source is stopped. After that, the second system of torches 306a and 306b are stopped and after 10 min, the first system of torches 305a and 305b are also stopped. The two ceramic bodies are cooled naturally to complete the joining process.

The joint part is subjected to a dye penetration test by applying dye to the joint and observed with an optical microscope. The test result indicates no cracking at the joint.

Embodiment 22

Figure 45A:
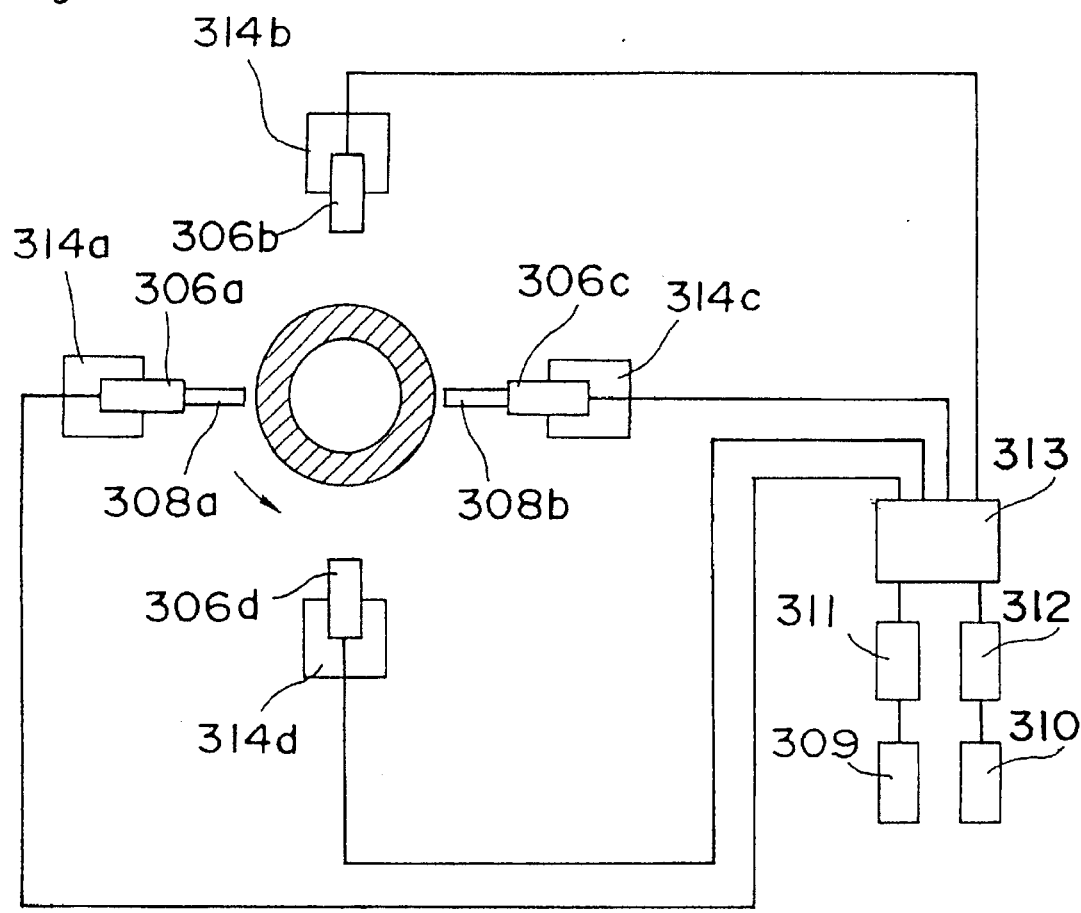
FIG. 45 (A) and FIG. 45 (B) are a cross sectional top view and a cross sectional front view of a joining apparatus practicing the 22th embodiment, respectively.
Figure 45B:
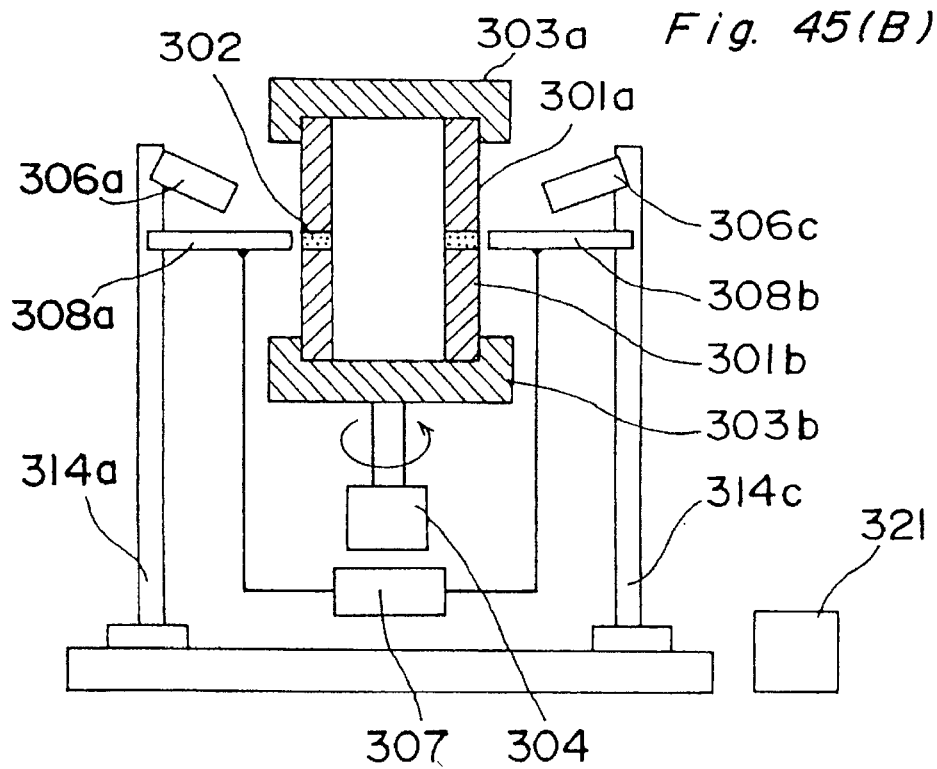

FIGS. 45 (A) and (B) are a top view and a front view of an apparatus practicing the joining method according to the present invention, respectively. Referring to FIG. 45, the same structural elements are indicated by the same reference numeral as that of FIG. 44. Reference numeral 301a and 301b denote two ceramic bodies; a reference numeral 302 denotes a joining agent; reference numerals 303a and 303b denote fixing jigs; a reference numeral 304 denotes a rotation device; reference numerals 306a, 306b, 306c, 306d denote torches; a reference numeral 307 denotes an electric power source; reference numerals 308a and 308b denote electrodes arranged indipendently at the vicinity of the torches 306a and 306c; reference numerals 311 and 312 denote gas flow adjustors; a reference numeral 313 denotes a gas mixer for supplying gas to the torches 306a to 306d.

The different point from the embodiment 21 is that the torches 306a to 306d are attached to torch moving devices 314a to 314d, respectively in order to change the distance between each of the heading portion of torches and the butted portion to be jointed and to change the moving rate of the torches. These changes are controlled by a position control device 321.

The torches 306a to 306d are controlled in a firing or stopping time, a system switching time, an current supplying starting time or an current supplying stopping time with a time program predetermined with a heating pattern or a temperature setting signal from a temperature sensor in a similar way to that of Embodiment 21.

In such a structure, the two ceramic bodies are pre-heated, at the butted portion to be jointed, with the torches 306a to 306d fired at a position apart from the butted portion to be jointed by 100 mm under being rotated. The torches 306a to 306d are moved close to the butted portion to be jointed at a moving rate of 10 mm/min and then kept at a position apart from the butted portion to be jointed from 20 mm for 5 min. Propane gas and oxygen gas are caused to flow at rates of 0.4 l/min and 1.0 l/min, respectively. The butted portion to be jointed are heated to a saturation temperature of 900° C. at a heating rate of 60° C./min. After that, the butted portion to be jointed are heated by supplying current to be electrode in a similar way to that of Embodiment 21 and after a given time, the electric power source is stopped. The torches are removed from the butted portion to be jointed at a speed of 10 mm/min and then kept at a position apart from the butted portion to be jointed by 100 mm for 5 min. After the flame is erased, the two ceramic bodies are cooled naturally. The observation with the joint indicates no cracking in a similar way to that of Embodiment 21.

Embodiment 23

Figure 46:
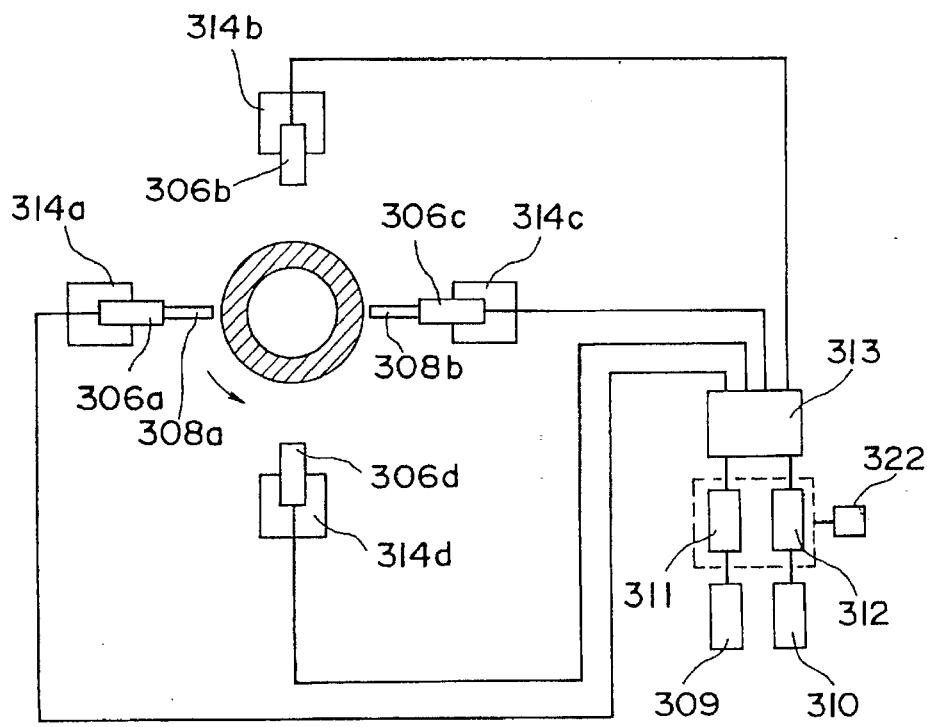
FIG. 46 is a cross sectional top view of a joining apparatus practicing the 23th embodiment.

FIG. 46 is top view of an apparatus practicing the joining method according to the present invention. Referring to FIG. 46, the same structural elements are indicated by the same reference numerals as that of embodiment 22.

The different point from the Embodiment 22 is that the a gas flow rate changes stepwisely from an increase to a decrease with the time passage by a gas flow control device 322. A position control device control suitably the distance between each of the torches 306a to 306d and the butted portion to be jointed in order to prevent the flame from being erased by the close approach of the torches to the ceramic bodies.

The torches 306a to 306d are controlled in a firing or stopping time, a system switching time, an current supplying starting time or an current supplying stopping time with a time program predetermined with a heating pattern or a temperature setting signal from a temperature sensor in a similar way to that of Embodiment 21.

In such a structure, the two ceramic bodies are pre-heated, at the butted portion to be jointed, with the torches 306a to 306d fired at a position apart from the butted portion to be jointed by 20 mm under being rotated. Propane gas and oxygen gas gas start to flow at rates of 0.1 l/min and 0.25 l/min, respectively and are fired. The flow ratio between propane gas and oxygen is controlled to be about 1:2.5. The flow rate of propane gas is increased by 0.1 l/min every 2 min and finally the flow rates are 0.4 l/min and 1.0 l/min with propane gas and oxygen gas, respectively. The butted portion to be jointed are heated with this gas flow for 5 min to a saturation temperature of about 900° C. After that, the butted portion to be jointed are heated by supplying current to the electrode in a similar way to that of Embodiment 21 and after a given time, the electric power source is stopped. The flow ratio between propane gas and oxygen is controlled to be about 1:2.5. The flow rate of propane gas is decreased by 0.1 l/min every 2 min and finally the flow rates are 0.1 l/min and 0.25 l/min with propane gas and oxygen gas, respectively. After the ceramic bodies are kept for 2 min at the final flow rate, the flame is erased. The ceramic bodies are cooled naturally to complete the joining process. The observation with the joint indicates no cracking in a similar way to that of Embodiment 21.

In the above embodiment, the torches are arranged only around the butted portion to be jointed. However, it is possible to arrange the torches any other portion than the butted portion to be jointed, for example, an area in a longitudinal direction of two ceramic bodies in view of the temperature distribution in accordance with the size, shape of the ceramic bodies. It is possible to use a combination of Embodiments 21 to 23. The number of the torches can be arbitrary. It is possible to use a structure to rotate the torches with fixing the two ceramic bodies. The joining method according to the present invention is directed to a method A type but is applicable for any other methods. The present embodiment uses a gas flame as an auxiliary heating means but it is possible to any other heating method such as lamp heating or resistor heater. The present joining method is applicable for the case when the joining is carried out with a ceramic body and a metallic body and further applicable for the case when the butted portion to be jointed are heated with laser in a high heat density instead of the electric heating.

In such a way, the joining method according to the present invention makes it possible to achieve a joint in a good condition without cracking due to the thermal stress at the butted portion to be jointed by using a control device to control the heat amount during the pre-heating time and the cooling time in connection with a joining process by a local heating of ceramic bodies.

Embodiment 24

Figure 47:
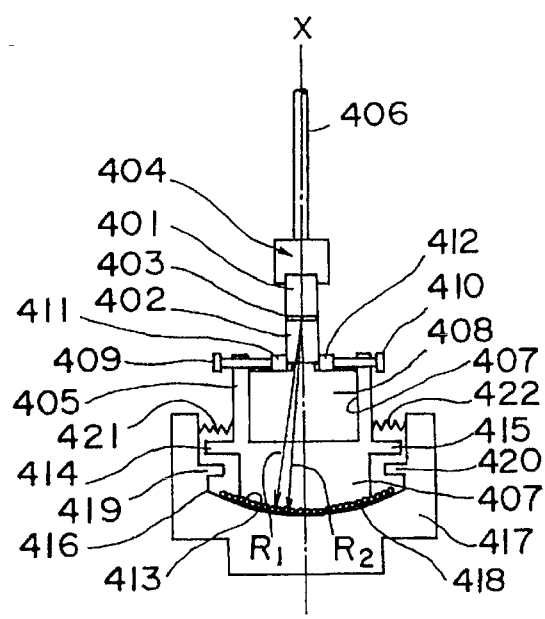
FIG. 47 is a structural model view illustrating the joining process when two clamp jigs are apart from each other in a vertical direction in order to practice the 24th embodiment.

FIG. 47 is a cross sectional view of a ceramic holding apparatus having two clamp jigs arranged in a vertical direction. This apparatus is used for the electric joining method according to the present invention. Referring to FIG. 47, reference numerals 401 and 402 denote two ceramic bodies to be jointed; a reference numeral 403 denotes a joining agent in a sheet form; and reference numerals 404 and 405 denote an upper clamp jig and a lower clamp jig, respectively. The two ceramic bodies 401 and 402 are in a cross sectional shape of 15 mm square and 20 mm length. The upper clamp jig 404 has a position adjusting rod 406 attached to the top terminal thereof in order to make the axis of the upper clamp jig 404 coincident with a vertical line. The position adjusting rod 406 is supported by a supporting means (not shown in the drawing) and is moved in a vertical direction when the ceramic body 401 is attached to or removed from the upper clamp jig 404. The position adjusting rod 406 has a rod driving device (not shown in the drawing) attached to the terminal thereof to adjust a distance between the butted planes of the butted planes of the two ceramic bodies to be jointed 401 and 402 when the joining agent melts. The upper clamp jig 404 can be in any structure capable of holding the terminal of the ceramic body 401.

The lower clamp jig 405 comprises a clamp body 407 having a concave housing 407a which has an opening at the upper direction thereof, a lower heat insulator 408 put in the concave housing 407a, two adjusting bolts 409 and 410 engaged with the opening end of the clamp body 407 and side heat insulators 411 and 412 fixed at the terminal of the adjusting bolts 409 and 410, respectively. The lower heat insulator 408 is linked with the terminal of the ceramic body 402 and supports the two ceramic bodies from an axial direction. The side heat insulators 411 and 412 cause the adjusting bolts 409 and 410 to rotate for the position adjustment and support the ceramic body 402 from the horizontal direction under being linked with the both facing sides of the ceramic body 402. These heat insulators 408, 411 and 412 prevent the heat from diffusing from the ceramic body 402 to the clamp body 407 when the joining agent is electrically heated.

The clamp body 407 has a convex spherical plane 413 formed at the no-clamping side terminal thereof and has stoppers 414 and 415 formed at the side wall thereof into one body. The clamp body 407 is placed into a housing 417 which has a concave spherical plane 416 corresponding to the convex spherical plane 413 and supports movably a convex spherical plane 413. Boll bearings 418 are arranged between the convex spherical plane 413 and the concave spherical plane 416 in order to move the clamp body smoothly. It is possible to make the convex spherical plane 413 and the concave spherical plane 416 from the bearing material instead of using the boll bearings 418. The convex spherical plane 413 and the concave spherical plane 416 have a curvature radius R1 and R2, respectively in a way that the centers of the convex spherical plane 413 and the concave spherical plane 416 are positioned at a point where a vertical line X crosses the butted portion to be jointed (403) between the two ceramic bodies 401 and 402. The housing 417 has fixing stoppers 419 and 420 formed in a projection form in accordance with the stoppers 414 and 415. These stoppers have a function to prevent the clamp body 407 from rotating by an excess amount. Adjustment actuating means 421 and 422 composed of springs having the same strength to each other are arranged between the inside wall of the opening of the housing 417 and the outside wall of the clamp body 407 in order to adjust an initial position of the clamp body 407 and to suppress the plane rotation of the clamp body 407.

In the above embodiment, a clamp angle position displacement mechanism is composed of the convex spherical plane 413, the concave spherical plane 416, boll bearings 418 and the housing 417.

Figure 48A:
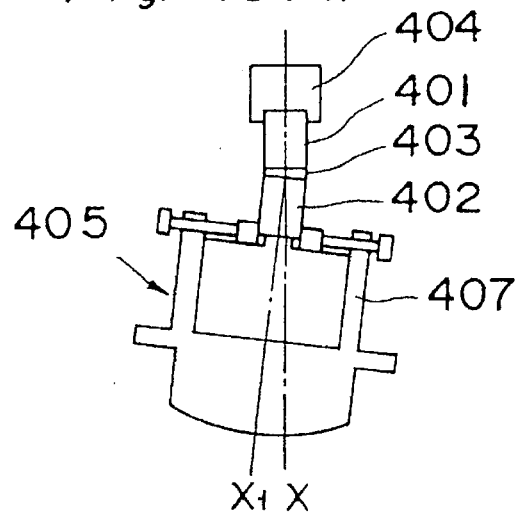
FIGS. 48 (A) and (B) are structural model views illustrating the operation of the embodiment of FIG. 47, respectively.
Figure 48B:
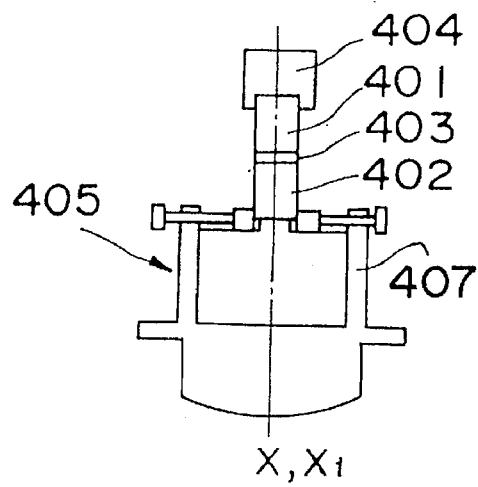

Next, the following description is directed to an operation of this embodiment. When the joining agent 403 is not uniform in the thickness as shown in FIG. 48 (A), the lower ceramic body to be jointed 402 is arranged in a manner that the axial line X1 inclines against the axial line of the upper ceramic body to be jointed 401, that is, a vertical line X. When the joining agent 403 melts by the electrical heating, the lower clamp jig 405 moves to change the angle of the axial line X1 against the vertical line X by means of the gravity force and the action of the convex spherical plane 413 formed at the opposite side from the clamping side and the concave spherical plane 416 formed in the housing 417. Finally, the axial line X1 of the lower clamp jig 405 coincides with the vertical line X as shown in FIG. 48 (B). As a result, the ceramic body 402 clamped by the lower clamp jig 405 comes to be joined with ceramic body 401 clamped by the upper clamp jig 404 in a manner that the axial line coincident with the axial line of the ceramic body 401 clamped by the upper clamp jig 404. When the joining agent 403 melts and solidifies, the rod driving means (not shown in the drawing) connected to the position adjusting rod 406 operates to adjust the distance between the butted planes to be jointed of the two ceramic bodies 401 and 402.

It is possible to obtain the strongest joint in an uniform thickness when the two ceramic bodies 401 and 402 have the butted planes parallel to each other. Even when the joining agent 403 has an uniform thickness and two ceramic bodies 401 and 402 having the butted planes not parallel to each other, the joining method according to the present invention makes it possible to achieve the straight joint in a high accuracy. In this case, it is necessary to manage the vertical line to cross rectangularly the terminal planes faced to clamp jigs of the ceramic bodies.

Embodiment 25

Figure 49A:
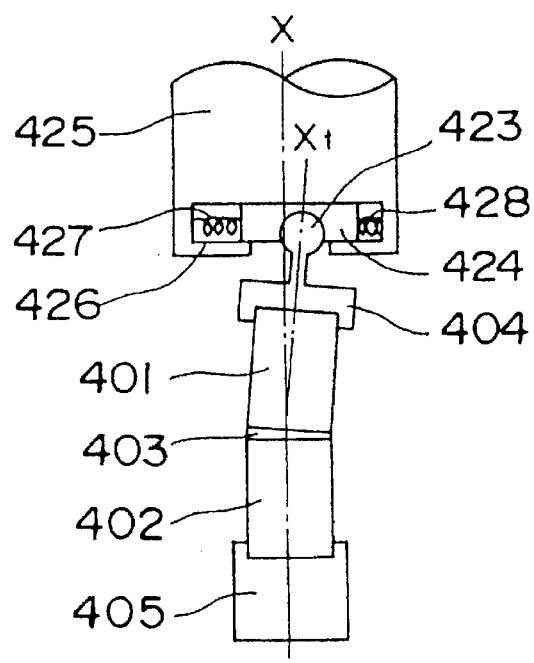
FIGS. 49 (A) and (B) are a structural model view illustrating the joining process when two clamp jigs are apart from each other in a vertical direction in order to practice the 25th embodiment.
Figure 49B:
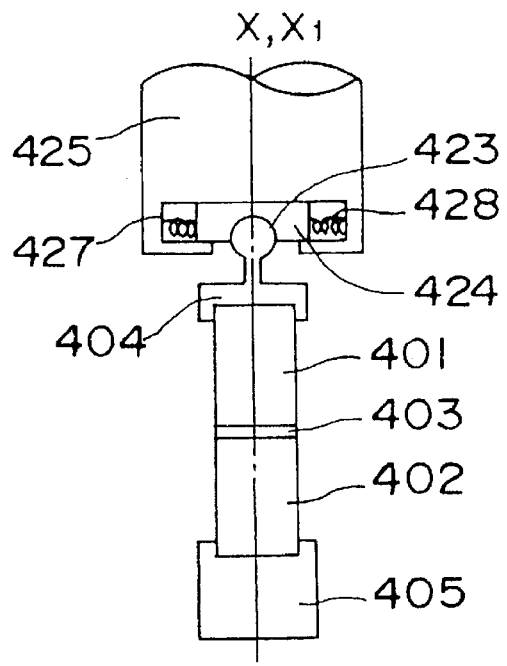

FIGS. 49 (A) and (B) are cross sectional view of a holding apparatus having a clamp angel displacement mechanism formed at the upper clamp jig in accordance with the present invention. FIG. 49 (A) shows the state before the joining process and FIG. 49 (B) shows the state after the joining process. In this embodiment, the ceramic body 402 clamped by the lower clamp jig 405 is fixed to have the axial line coincident with the vertical line X. The upper clamp jig 404 has a rotator in a sphere form 423 formed at the terminal opposite the clamping side. The rotator 423 is supported rotatably with a rotator supporter 424. The rotator supporter 424 is placed in a sliding manner in a concave housing 426 formed at the terminal of a position adjusting rod 425. The position adjusting rod 425 makes up a supporter to support movably the rotator supporter 424 in a direction crossing the vertical line in a rectangular way. There are arranged spring members 427 and 428 as an actuating means for actuating the rotator supporter 424 in a way to locate the rotation center (center of the rotator 423) on the vertical line X between the inside wall of the concave housing 426 and the terminal of the rotator supporter 424 in a longitudinal direction.

Next, the following description is directed to an operation of this embodiment. Before the joining process, the upper ceramic body 401 has the axial line X1 not coincident with the vertical line X. When the joining agent melts by the electrical heating, the upper ceramic body 401 is released from the lock at the butted plane. The rotator supporter 424 supporting movably the upper clamp jig 404 moves at the inside of the concave housing 426 in a way to move the rotation center to the vertical line X with the actuating force of the spring members 427 and 428. The rotator 423 formed at the upper clamp jig 404 rotates around the rotation center of the rotator supporter 424 in a way to make the axial line X1 of the clamp jig 404 coincident with the vertical line X by means of gravity force on the clamp jig 404. As a result, the ceramic body 402 clamped by the lower clamp jig 405 is joined with the ceramic body 401 clamped by the upper clamp jig 404 in a manner that the axial line coincident with the axial line of the ceramic body 401 clamped by the upper clamp jig 404.

It is necessary to form the terminal planes opposite to the butted planes of the two ceramic bodies in a way to have each of the axial lines of the two ceramic bodies coincident with that of the clamp jigs when the two ceramic bodies 401 and 402 are clamped with the clamp jigs 404 and 405.

Embodiment 26

Figure 50A:
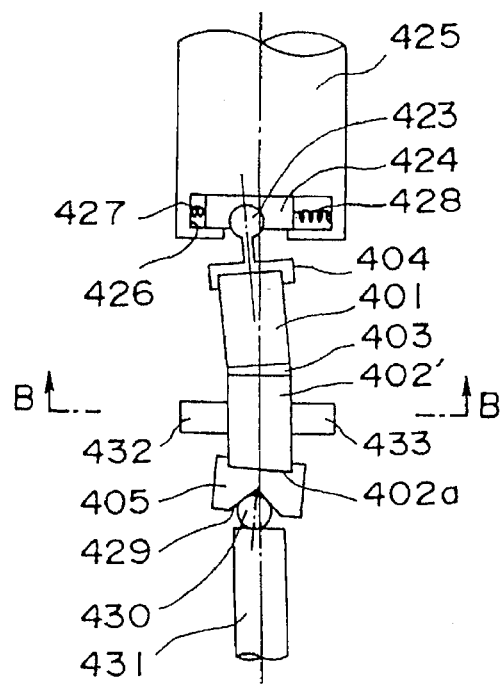
FIG. 50 (A) and FIG. 50 (C) are a structural model view illustrating the joining process when two clamp jigs are apart from each other in a vertical direction in order to practice the 26th embodiment.
Figure 50B:
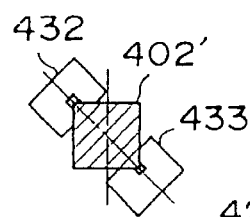
Figure 50C:
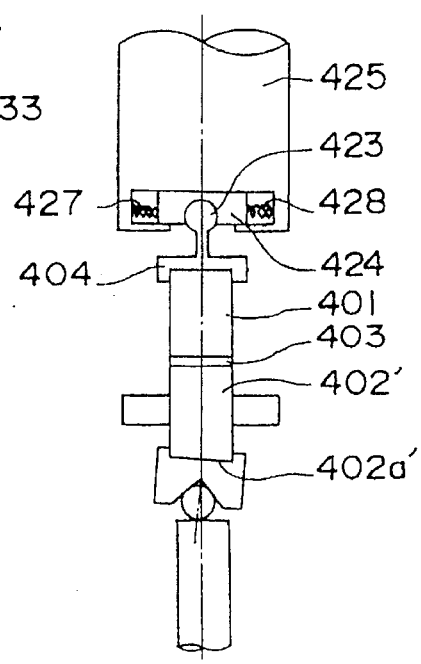

This embodiment is an improvement of the Embodiment 25 and is to provide a clamp angle displacement mechanism at the fixing side against the clamp jigs at the fixing side in order to join the two ceramic bodies at a joint in a straight line even when the two ceramic bodies have the butted planes inclined against the axial line and not to cross the axial lines in a rectangular manner. FIGS. 50 (A) to (C) are prepared for explaining the embodiment. The same elements in FIGS. 50 (A) to (C) as those of FIG. 49 are provided with the same reference numerals and are omitted in the detailed description. Referring to FIG. 50 (A), a ceramic body 402' clamped at a lower clamp jig 405 has a terminal plane 402'a opposite to a butted plane inclined against the axial line of the ceramic body 402', that is, the terminal plane 402'a and the axial line of the ceramic body 402' are not in a rectangular crossing. Therefore, the present embodiment is to form a sphere supporter 429 at the terminal plane of the lower clamp jig 405 opposite to the clamping side. The sphere supporter 429 has a sphere body 430 engaged movably therewith. The sphere body is supported movably by a supporting rod 431. Further, there are provided two vertical line guides 432 and 433 to guide the axial line of the ceramic body 402' in a vertical direction. As shown in FIG. 50 (B) showing the cross sectional view at B—B line of FIG. 50 (A), the vertical line guides 432 and 433 have shapes which are engaged in a sliding manner with the ceramic body 402 at two corners facing to each other since the ceramic bodies 401 and 402' are in a rectangular cross sectional shape. It is possible to form the vertical line guide in a arbitrary shape in accordance with a cross sectional shape of the ceramic body to be jointed.

Even when the terminal plane 402'a of the lower ceramic body 402' is inclined against the vertical line before the joining process as shown in FIG. 50 (A), the sphere supporter 429 rotates around the sphere body 430 and the clamp jig 405 is displaced in the angel with the sliding of the sphere body 430 on the terminal plane of the supporting rod 431. As a result, the ceramic body 402' can be supported by the clamp jig 405. At the joining time, the upper clamp jig 404 changes in the angle in a similar way to that of the FIG. 49. Accordingly, the two ceramic bodies 401 and 402' are joined together in a condition that the two ceramic bodies have the axial lines coincident with each other as shown in FIG. 50 (C).

Embodiment 27

Figure 51A:
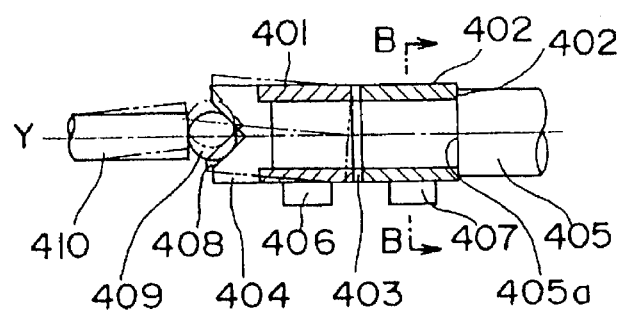
FIG. 51 (A) is a structural model view illustrating the joining process when two clamp jigs are apart from each other in a horizontal direction in order to practice the 27th embodiment.
Figure 51B:
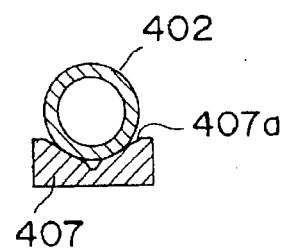

FIGS. 51 (A) and (B) shows an embodiment in which two ceramic bodies are joined to each other under a horizontal arrangement of two clamp jigs. Especially, the present embodiment is to carry out the joining process with two ceramic bodies 401 and 402 in a pipe form in a straight joint. A reference numeral 403 denotes a joining agent; a reference numeral 404 denotes a clamp jig; and a reference numeral 405 denotes a linking member. In FIG. 51 (A), the state before the joining process is expressed by a broken line and the state after the joining process is expressed by solid line. The joining agent layer 403 uses a sheet form subjected to a hole making work. Reference numerals 406 and 407 denote a horizontal holding guide for holding the two ceramic bodies in a horizontal direction when the two ceramic bodies 401 and 402 have the axial lines coincident with each other. The horizontal holding guides 406 and 407 have a cross sectional shape shown in FIG. 51 (B).

The linking jig 405 links at the linking plane 405a with the terminal plane of the ceramic body 402 in a pipe form. The linking plane 405a of the linking jig 405 is formed to be a rectangular angle against the plane 407a of the horizontal guide member 407 and links with the terminal plane 402a of the ceramic body 402 in a way that the axial line of the ceramic body 402 can be a horizontal line Y. The terminal plane 402a opposite against the butted plane is finished finely to cross the axial line in a rectangular manner. In order to make up a clamp angle displacement mechanism for adjusting the angle of the clamp 404, the clamp jig 404 has a sphere supporter 408 formed at the terminal portion opposite against the clamping side thereof. The sphere supporter 408 has a sphere body 409 included therein. A sphere pressing member 410 is linked with the sphere body 409. The sphere pressing member 410 is made of a flexible material or is formed into a shape having a flexible property. The sphere pressing member 410 is strained to press, with a given pressure, the sphere body which displaces in accordance with the inclination. When the joining agent layer 403 melts and solidifies, the sphere pressing member 410 moves in a horizontal direction in order to permit the clamp jig 404 to move in a horizontal direction.

Next, the operation of this embodiment is described. In this embodiment, two ceramic bodies 401 and 402 have the axial lines coincident with each other by means of a gravity force. When the joining layer 403 is not in a uniform thickness before the joining process, the ceramic body 401 having the joining agent layer 403 integrated thereon is arranged in a inclined manner against the axial line of the ceramic body 402 at the fixing side. When the ceramic body 401 is inclined, the sphere supporter 408 formed at the terminal portion opposite the clamping side of the clamp jig 404 rotates around the sphere body 409 and the sphere pressing member 410 having a flexible property is strained. In such a way, the ceramic body 401 can be supported. When the joining agent layer melts by heating, the ceramic body 401 is released from the lock at the butted plane. The rotation function between the sphere supporter 408 and the sphere body 409, the horizontal movement of the clamp jig 404 due to the sphere pressing member 410 and the gravity force make the ceramic body 401 has the terminal portion rising upward to be moved downward and thereby the ceramic body 401 is supported with the horizontal holding guide 406. As a result, the two ceramic bodies can be jointed to each other with the axial lines coincident to each other. It is possible to obtain the strongest joint in an uniform thickness when the two ceramic bodies 401 and 402 have the butted planes parallel to each other. Even when the joining agent 403 has an uniform thickness and two ceramic bodies 401 and 402 having the butted planes not parallel to each other, the joining method according to the present invention makes it possible to achieve the straight joint in a high accuracy.

Embodiment 28

Figure 52:
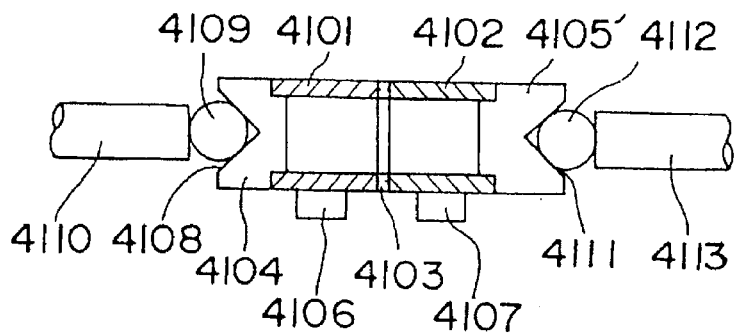
FIG. 52 is a structural model view illustrating the joining process when two clamp jigs are apart from each other in a horizontal direction in order to practice the 28th embodiment.
Figure 53A:
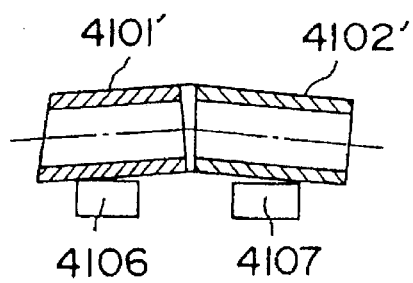
FIG. 53 (A) and FIG. 53 (B) are a structural model view illustrating two ceramic bodies which are able to be jointed by a joining method of FIG. 52.
Figure 53B:
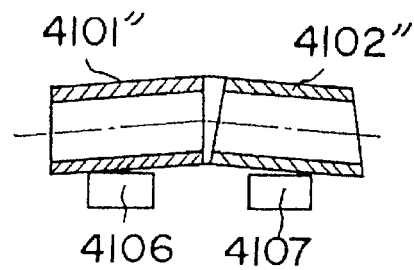
Figure 54:
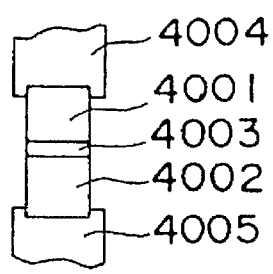
FIG. 54 is a cross sectional view of two ceramic bodies to be jointed with the conventional joining method.
Figure 55:
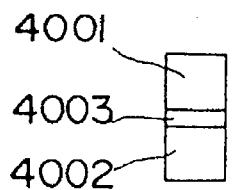
FIG. 55 (A) is a cross sectional view of two ceramic bodies to be jointed with a joining agent in a best arrangement.
Figure 55:
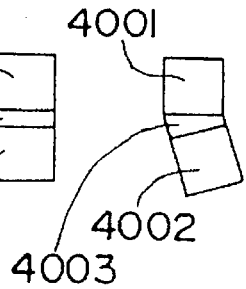
Figure 55:
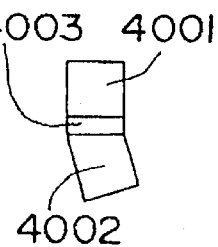

The holding apparatus according to the embodiment 27 requires that the ceramic body to be linked with the linking jig 405 must be subjected to a determined fine finishing work. On the other hand, the present embodiment makes it possible to join the two ceramic bodies even in a poor finishing work and to obtain a straight joint. FIG. 52 shows the outline of the arrangement of joining method. The same elements in FIG. 52 as those of FIG. 51 are provided with the same reference numerals and are omitted in the detailed description. In this embodiment, a clamp jig 4105' at a fixing side is provided with a clamp angel displacement mechanism. The clamp angle displacement mechanism at the fixing side comprises a sphere supporter 4111, a sphere body 4112 included in the sphere supporter 4111 and a flexible sphere pressing member 4113 linked with the sphere body 4112, all of which are formed at the terminal portion of the clamp jig 4111 opposite the clamping side. According to this apparatus, it is possible to join two ceramic bodies 4101', 4102', 4101" and 4102" in a straight line when the ceramic bodies have the terminal portion inclined against the axial lines, that is, the terminal portion do not cross the axial lines at an angle of 90°. In this case it is preferable to select the ceramic bodies having the butted planes parallel to each other if possible.

In the above embodiment, when the joining process is carried out with the two ceramic bodies having butted planes not parallel to each other due to the slightly poor finishing work, the two ceramic bodies are allowably combined at the butted portion to be jointed after the joining agent melts. As a result, the ceramic bodies show a butted joint slightly curved but are accepted as a product. In the above embodiments 24 to 28, the method of A is described but the method of B or C is executed with the present method. The method according to the present invention can be applicable for the case when one of bodies to be jointed is a metallic body.

The method according to the present invention is provided with a clamp angle displacement mechanism and has a feature to displace an angle of at least one clamp jig in a way to make the axial lines of the two ceramic bodies coincident to each other on melting of the joining agent layer and to join two ceramic bodies in a straight line even when the joining agent layer is not uniform thickness or when the joining agent layer is in a uniform thickness but the two ceramic bodies have the butted planes not parallel to each other.

The method according to the present invention has an advantage that the two ceramic bodies have the axial lines coincident to each other in an easy and accurate way by using the gravity when two clamp jigs are arranged apart from each other in a vertical direction.

The method according to the present invention provides a clamp angle displacement mechanism at the fixing side to cause the axial line of the ceramic body clamped by a clamp jig at the fixing side to coincide with the vertical line and accordingly makes it possible to join the two ceramic bodies subjected to a poor finishing work in a straight line.

The method according to the present invention has an advantage that the two ceramic bodies have the axial lines coincident to each other in a simple way by using a gravity force when two holding members including the clamp jig are arranged independently apart from each other in a horizontal direction. The method according to the present invention provides a clamp angle displacement mechanism for the clamp jig at the fixing side and achieves a joining process in a good condition even when the ceramic bodies are subjected to a poor finishing work.

Embodiment 29

(1) First Embodiment of 29

Figure 56:
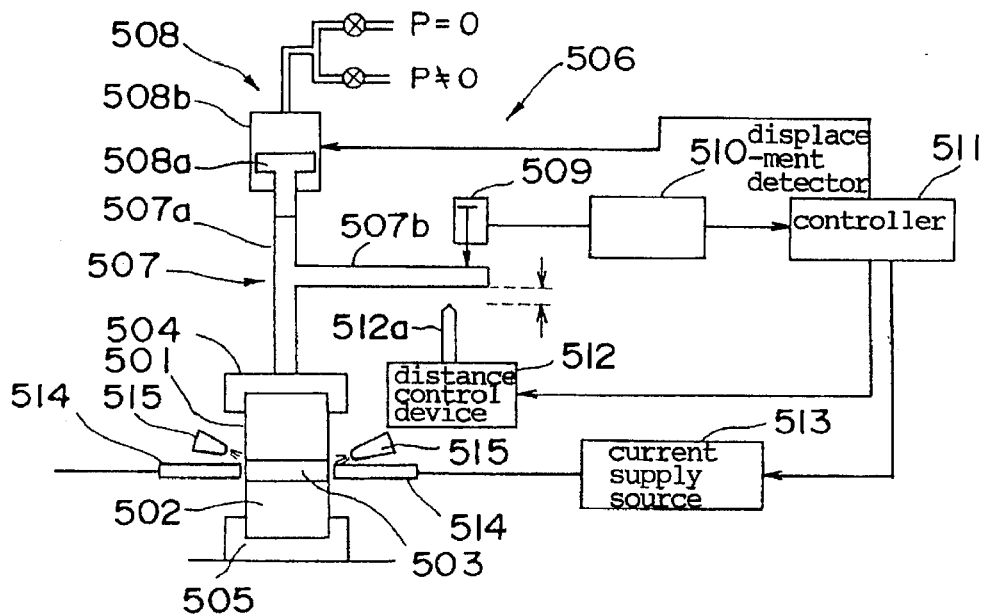
FIG. 56 is an outline drawing of a joining apparatus practicing the joining method according to the 29-1th embodiment.

FIG. 56 is a structural model view of a joining apparatus according to the present invention. Reference numerals 501 and 502 denote ceramic bodies in a rectangular bar. It is possible to use the ceramic bodies in a type of either an electric conduction and the non conduction. Numeral 503 denotes an solid joining agent in a sheet form or in a paste form, which is inserted between the ceramic bodies to be jointed. The joining agent has an electric conductivity higher than the two ceramic bodies at a high temperature. During the current supplying, the electric current flows predominantly through the joining agent. The resultant Juel heat make joining agent to be melt and react with the ceramic bodies and thus to form a strong joint layer. The joining agent 503 varies in the composition with the material variation in the ceramic body. When the joining agent melts due to the electrical heating, the joining agent generates a variation in the composition due to a reaction between the ingredients thereof, a reaction with components of the ceramic body and a reaction with the atmosphere and becomes gradually in a higher electric resistance. Thereby, the current flowing area moves through the butted planes to be jointed to complete the joining process. Accordingly, the composition of the joining agent layer is different from that of the initial time.

Numerals 504 and 505 are clamp jigs for holding the ceramic bodies 501 and 502, respectively in a vertical direction. The upper clamping jig 504 is provided firmly with a linking jig or linking member 507 making up a portion of a control mechanism 506. The linking member 507 is composed of a vertical linking portion 507a which moves up and down along with the vertical axis of the ceramic bodies 501 and 502 and a horizontal linking portion 507b extending in a horizontal direction. It is noted that a holding mechanism for holding movably the linking member 507 is omitted. The upper terminal of the vertical linking portion 507a is joined to a plunger rod 508a of a pressing mechanism 508 composed of a liquid cylinder. The liquid supplied to a cylinder chamber 508a is controlled in such a way that the pressing mechanism 508 works selectively in a way taking either of a pressing state to press the plunger rod 508a or a non-pressing state (P=0) to release the plunger rod 508a to move freely in a vertical axis direction in accordance with a command from the outside. In order to prevent restricting the movement of the ceramic bodies 501 and 502 in a vertical axis direction by the pressing mechanism 508, it is possible not only to set the pressing mechanism 508 to the non-pressing state (P=0) but also to prevent the plunger rod 508a from being in touch with the vertical linking portion 507a by elevating the plunger rod 508a by a large distance.

The movement of the horizontal linking portion 507b of the inking member 507 is detected by a position sensor 509 such as a differential transformer, and the output power of the position sensor is sent to a displacement detector 510. The position sensor 509 is equipped in a way not to lock the movement of the horizontal linking portion 507b. The displacement detector 510 transforms a shifting amount of the linking member 507 into a signal necessary for a calculation control at a controller 511. The horizontal linking portion 507b is arranged to cowork with a distance control device 512 for adjusting finally the distance between butted planes to be jointed of two ceramic bodies 501 and 502 by adjusting the position of the horizontal linking portion 507b. The distance control device 512 is provided with a rod 512a to vary in the position in accordance with the command from the controller 511. The position of the rod 512a determines the lower limit of the position for the movement of the linking member 507. In this apparatus, the linking member 507 and the distance control device 512 build up a distance control mechanism.

A reference numeral 513 is an electric source for supplying an electric current through a electrode 514 to the joining agent 503 and portion of the ceramic bodies at the vicinity of the joining agent in accordance with the command from controller 511. A reference numeral 515 is a torch to inject a flame for pre-heating the butted portion to be jointed. The number and the installing position of the electrode and the torch can be determined arbitrarily. It is possible to install the electrode 514 with in the torch 515. Such a construction make handling of sample easy and apparatus size compact. Electrode may be a rod or plate shape. While current supplying may be executed by discharge in air between the electrode and the butted portion to be jointed which are apart from each other, close positioning of the electrode and the butted portion permit current supplying without generation of discharge in air to result in depression of equipment cost due to decrease in required power, improvement of safety and decrease in partially decomposition and deterioration of the butted portion due to over-heating. In this embodiment, two electrodes 514, 514 are positioned in a way to face to each other against the butted portion to be jointed and two torches 515, 515 are also positioned in a similar way to face to each other. A relative movement of the butted portion can be achieved by moving the ceramic bodies 501 and 502 without moving the electrodes 514 and the torches 515 or by moving the electrodes 514 and the torches 515 without moving the ceramic bodies 501 and 502. On contrary to the relative movement, the joining process may be carried out by contacting a plate-like electrode to the whole length to be jointed, or by supplying current to a plurality of electrodes arranged along the portion to be jointed, or by supplying current between a pair of selected electrodes arranged around the portion to be jointed by switching.

Figure 57:
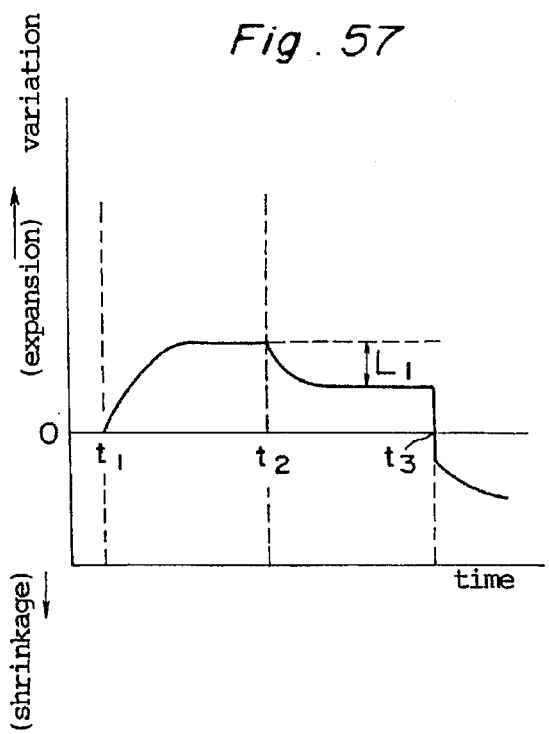
FIGS. 57 and 58 are graphs showing the displacement curve which vary with the control mode.

Next, the description is directed to a method for joining two ceramic bodies by using an apparatus according to the embodiment shown in FIG. 56. There may be various ways for the operation modes of the pressing mechanism 508 and the distance control device 512. The pressing mechanism 508 and the distance control device 512 are controlled in a way shown in a position shifting curve of FIG. 57. The position shifting curve of FIG. 57 is obtained from the output signal of the position detector 510 which has the output signal set to 0 when the pre-heating starts. At a time t1, the pressing mechanism 508 is set to a release state (P=0) so as to release the two ceramic bodies from the fixing to the pressing mechanism 508. Then, the portion to be jointed are is pre-heated by the flame injected from the torch 515 until the temperature at the portion to be jointed reaches about 800° C. The pre-heating time is expressed by a time period from t1 to t2. Since the pressing mechanism 8 is in a release state during this time period, the two ceramic bodies to be jointed 501 and 502, the clamp jig 504, and the linking member 507 are released from being locked with the outside. Therefore, the two ceramic bodies 501 and 502, the joining agent, the clamp jig 504, and the linking member 507 are in a position to execute freely the thermal expansion. Accordingly, the position detector 510 has the output signal varying in a expansion direction with the time passage of t1 to t2. At the pre-heating stage, the joining agent does not melt. When the output signal of the position detector 510 indicates the saturation of expansion, the controller 511 sends to the distance control device 512 a command signal and then the distance controller 512 manages the rod 512a to move to a given position. After completion of the pre-heating, the portion to be jointed is energized and is heated up to a higher temperature so that the joining agent melts and shrinks. On the other hand, the two ceramic bodies 501 and 502, the clamp jigs 504 and 505 and the linking member 507 continue still the expansion. The width between the butted planes to be jointed decreases regardless of the heat expansion, which cause the two ceramic bodies 501 and 502, the clamp jigs 504 and 505 and the linking member 507 to expand until the horizontal linking portion 507b of the linking member 507 links to the rod 512a. When the horizontal linking portion 507b links to te rod 512a, the portion over the horizontal linking portion 507b of the vertical linking portion 507a extends upward due to the thermal expansion and the portion below the horizontal linking portion 507b of the vertical linking portion 507a extends downward. That is, the clamp jig 504 and the ceramic body 501 extend downward and the ceramic body 502 and the clamp jig 505 extend upward. Therefore, it is necessary to take the expansion into consideration for determination of the distance between the two ceramic bodies, which is set to the distance control device 512. Otherwise, the actual distance between the butted planes is smaller than the set distance. This may cause the defective joint. It is preferable to carry out the control due to the controller 511 under consideration of the expansion on current supplying. The controller 511 of present embodiment calculates the distance between the butted planes of the two ceramic bodies necessary for the formation of the suitable joint by considering the temperature distribution obtained from the thermal conduction analysis and the thermal expansion coefficient and determines the position of the rod 512a by driving the position control device 12 in order to hold a distance L1 for the ceramic body 501 to move down in a purpose to hold the calculated distance. In an alternative way, it is possible to obtain the distance through the preliminary experiment and to command the controller 511 to memorize the data L1 from the preliminary experiment. By the way, the preferable distance between the butted planes of the two ceramic bodies is in a range from 100 to 400 micron, which varies with the joining agent and the quality of ceramic body.

At a time t2, the controller 511 commands the electric current supplying source 513 to manage an electric current in a given size to flow into the electrode 514 for starting the current supplying to the portion to be jointed. At a time passing through a period after the initiation of the current supplying, the joining agent 503 starts to melt and the ceramic body 501 moves downward with the sum weight of the ceramic body 501 itself, the clamp jig 504 and the linking member 507. After the ceramic body 501 moves downward to a position at which the horizontal linking portion 507b links to the rod 512a of the distance control device 512, the two ceramic bodies 501 and 502 extend due to the thermal expansion with the heat generated by the electric current from the electrode 514 so as to decrease the distance between the butted planes. As mentioned above, the controller 511 sets the distance L1 under consideration of the expansion after the current supplying. Therefore, it is possible to maintain the distance between the butted planes of two ceramic bodies within a range (100 to 400 micron) necessary for obtaining the superior joint, even if large expansion may generate after current supplying. The current supplying through the electrode is continuing at a time t3. During this period, the joining agent 503 sufficiently melts and reacts with the two ceramic bodies 501 and 502.

At a time (t3) when the joining agent 503 reacts completely with the two ceramic bodies 501 and 502, the controller 511 commands the distance control device 512 to move the rod 512a downward and at the same time, commands the pressing mechanism 508 to enter into the pressing state. As a result, at a time t3, the two ceramic bodies 501 and 502 are pressed in a direction to be jointed and the molten joining agent in a large portion of the total amount is pushed away from the butted planes to be jointed of the two ceramic bodies. At the same time, the two ceramic bodies complete the joint. The current supplying to the portion to be jointed is terminated just before or after the operation of the pressing mechanism 508 or at the same time of operation of the pressing mechanism 508. In such a way, the two ceramic bodies to be jointed are brought into a close contact to each other through a thin joining layer and are joined to each other at a high strength upon being cooled.

Two silicon nitride ceramic bodies in a size of 15×15×200 mm are joined by using a joining agent including, as an electric conductive component, calcium fluoride with the joining method mentioned above. The electric voltage is applied across the two electrodes 514 so that the electric current of 0.8 A flows across the two electrodes 514. The pre-heating temperature is 800° C. (10 min), and the time period between t2 and t3 is about 6 min. The pressing pressure of the pressing mechanism 508 is 100 g/mm². It is confirmed that the average value of the joint strength is about 300 MPa at a room temperature after a four point bending test with ten samples. It should be noted that a very weak joint strength to crack at the joint during the working of test samples is given to the joint obtained with same joining condition such as current supplying condition and the pre-heating temperature except for the additional operation that the two ceramic bodies are pressed at a given pressure by the pressing mechanism 508 at the pre-heating stage.

In the above embodiment, the rod 512a of the distance control device 512 is moved down after the pre-heating. However, in case of a high thermal expansion, it is allowable to elevate the rod 512a in order to set the distance between the butted planes of the two ceramic bodies to a suitable size.

Figure 58:
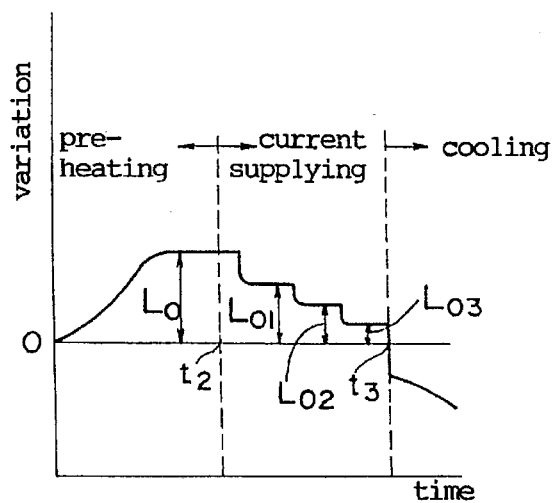

In the above embodiment, the distance between the butted planes of the two ceramic bodies are adjusted in such a way that the two ceramic bodies move down to a given position by the action of the gravity after the initiation of the current supplying at a time t3. As an alternative way, it is possible to achieve the aimed distance ($L_o \rightarrow L_{o3}$) by moving step by step the rod 512a of the distance control device 512 after the initiation of the current supplying at a time t2 as shown in the position shifting curve of FIG. 58. Further the aimed distance can be achieved by a continuous movement of the rod 512a not by the graded movement of the rod 512a. When the distance between the butted planes is changed in a graded way or in a continuous way, it is possible to change the distance between the butted planes in accordance with the variation in melting condition of the joining agent due to the current supplying. As a result, the distance between the butted planes of the two ceramic bodies can be made set to almost the most suitable value in accordance with the decrease in the volume of the joining agent due to the melting without pushing out the molten joining agent in an amount larger than the necessary amount.

Further, it is possible to control the distance control device 512 by managing the controller 511 to receive, as a controlling variable, one of the data of the voltage, electric current, electric power sent to the electrode, the joining temperature and the shifting amount of the ceramic body.

Embodiment 29-2

Figure 59:
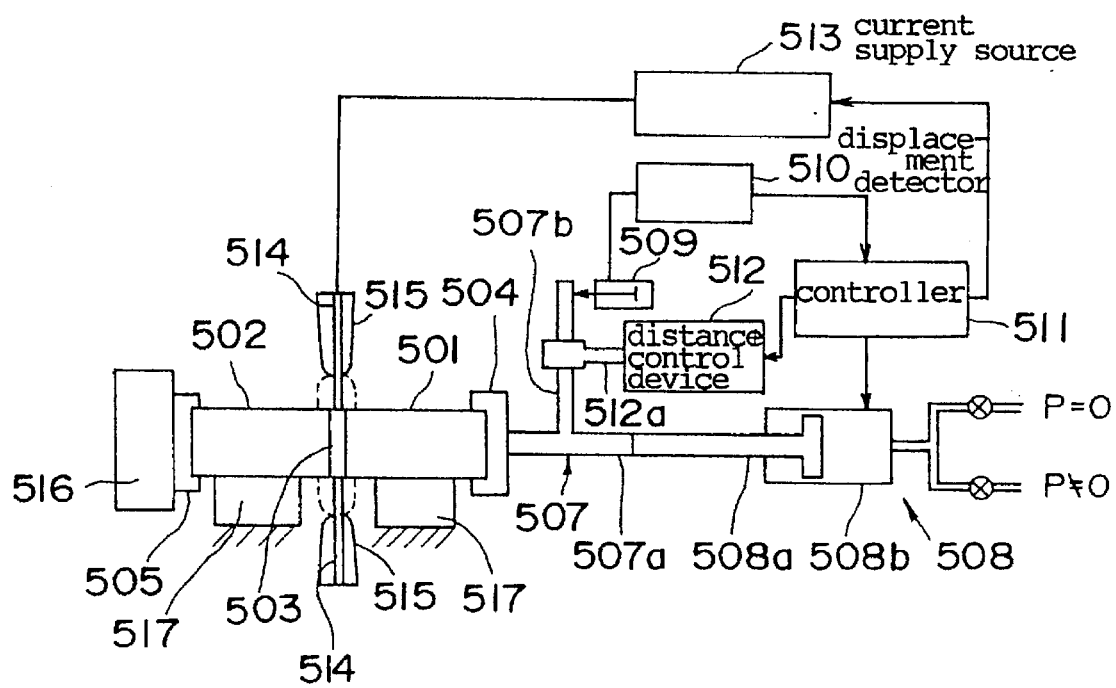
FIGS. 59 and 60 are outline drawings showing other joining apparatus practicing the joining method according to the 29-2th and 29-3th embodiments, respectively.

FIG. 59 is an outline drawing of a joining apparatus for joining ceramic bodies placed in a horizontal position. In FIG. 59, the functions the same as those of FIG. 56 are provided with the reference numerals the same as those of FIG. 56 and are omitted in the detailed description. In FIG. 59, two ceramic bodies 501 and 502 are in a pipe form and a joining agent 503 is formed into a ring form. An electrode 514 is positioned in a torch 515 for injecting a flame. The electrode 514 and the torch 515 rotate around the portion to be jointed. Any other method than the above method to heat the whole of the butted portion to be jointed is applicable.

One is a method of rotating the body to be jointed under fixing the electrode. The other is a method that under fixing the body to be jointed and the electrode, the current is supplied between the two selected from a plurality of electrodes arranged around the periphery of the body to be jointed by means of switching in a way that the supplied area moves from one to another in turn.

In this embodiment, the two ceramic bodies are placed in a horizontal position and are joined to each other. The joining apparatus according to this embodiment has a supporting body 516 for supporting the clamp jig 505 and a ceramic supporting bodies 517 for supporting the two ceramic bodies 501 and 502. The ceramic body 101 does not move with the gravity in a different way from that of FIG. 56. A rod 512a of a distance control device 512 is linked to a linking portion 507b. In order to prevent each thermal expansion of members of the joining apparatus from being locked, the distance control device 512 is in a structure not to lock the free movement of a linking member 507 in a non-operation state in a similar way to that of the liquid cylinder of the pressing mechanism 508. It is necessary to operate immediately the distance control device 512 after saturation of the thermal expansion in order to carry out the position shift shown in FIGS. 57 and 58. When the two ceramic bodies to be jointed are pressed by a pressing mechanism 508, the distance control device 512 is required to be again in a non-operation state, and the pressing must be carried out by the pressing mechanism 508. The control of these members are executed by the command of the controller 511.

A joining process is carried out with the joining apparatus of this embodiment under a position shifting curve the same as that of FIG. 57. The two ceramic bodies 501 and 502 are silicon nitride ceramic bodies in a 18 mm outside diameter, 6 mm inner diameter and 200 mm long. The electrode 514 rotates at a rate of 100 rpm. The pre-heating temperature is about 800° C. The electric voltage is applied across the two electrode 514 so that the electric current of 0.6 A flows across the two electrodes 514 and the time period between t2 and t3 is about 5 min. The pressing pressure of the pressing mechanism 508 is 100 g/mm². The timing for the termination of the current supplying is carried out in a similar way to that of FIG. 56. The gas tight test is carried out with 10 pieces of samples and indicates no sample having the gas leakage. It is confirmed that the average value of the joint strength is about 270 MPa at a room temperature after a four point bending test.

Embodiment 29-3

Figure 60:
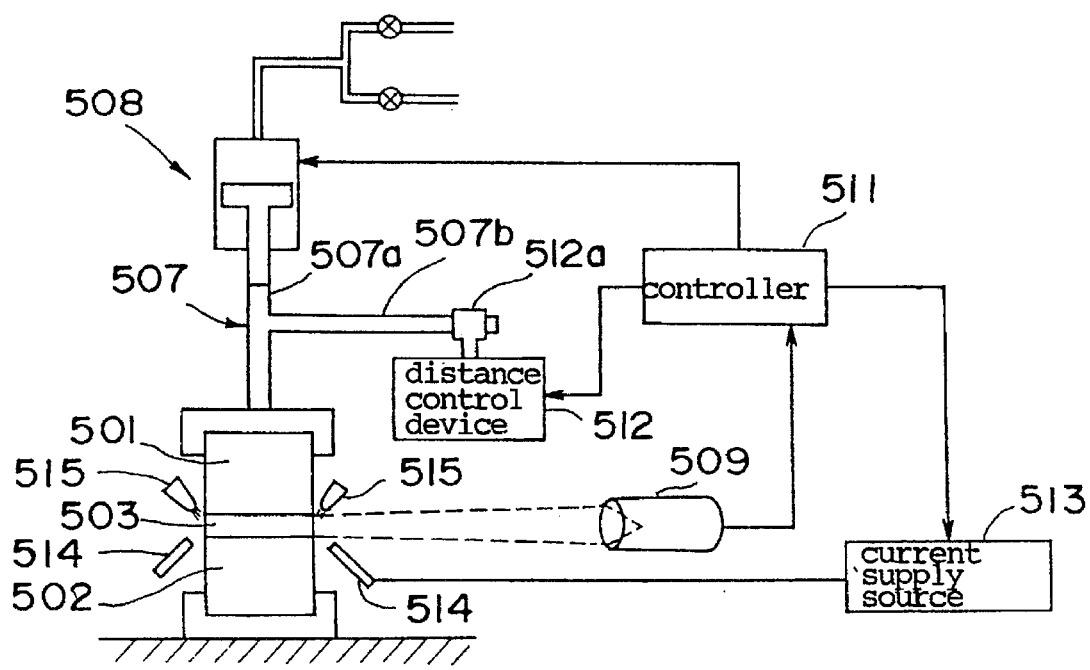

FIG. 60 is an outline drawing of another joining apparatus for practicing the joining method according to the present invention. In FIG. 60, the functions the same as those of FIGS. 56 and 59 are provided with the reference numerals the same as those of FIGS. 56 and 59 and are omitted in the detailed description. A difference point between the apparatus of FIG. 60 and those of FIGS. 56 and 59 is that the saturation of the thermal expansion and the distance between the butted planes of the two ceramic bodies are observed directly with a enlarging inspector 509 having a television camera and an enlargement lens equipped thereon and the control is carried out by the observation data. The distance between the butted planes of the two ceramic bodies are measured with the enlarging inspector 509. On the basis of the observation date, the controller 511 manages the distance control device 512 to drive the rod 512a in a way to obtain the most suitable value of the distance between the butted planes. The driving pattern of the rod 512a is arbitrary. The distance control device is in a structure not to lock the movement of the linking member 507 at the non-operation state in a similar way to that of the distance control device of FIG. 59. According to this apparatus to observe directly the distance between the butted planes, it is not necessary to obtain the shifting amount of the ceramic bodies 501 by carrying out a preliminary experiment or by carrying out a complicated calculation. Further, this apparatus has another advantage that the distance between the butted planes is adjusted in the most suitable way since the direct measurement data on the distance with the enlarging inspector 5112 is feedbacked to the controller 511.

In the embodiments shown in FIGS. 56 and 60, since the two ceramic bodies are in a rectangular bar form, a relative movement between the ceramic bodies to be jointed and the electrode are carried out. When the ceramic body is in a round bar form or a round pipe form, the ceramic bodies can be rotated by placing on a supporting block rotating and joined with a motor positioned beneath the clamp jig 502 with fixed atate of the electrode in a similar way to that described in the Japanese Patent Publication (examined) 1988-225583.

The joining apparatus shown in FIGS. 56 and 59 use, as a position sensor 509, the position sensor in a contact type but can use the position sensor in a non-contact type such as magnetic or optical method. The measuring point of the position sensor 509 and the operation point of the distance control device are placed on the linking member 507 in the same way as each other but can be placed at the different positions from each other.

In a process to practice the joining method according to the present invention, the control mode after the saturation of the thermal expansion is arbitrary. The joining can be performed with a position shifting curve other than those of FIGS. 57 and 58. For example, when the ceramic body is relatively light, the ceramic body 501 can be moved down only by the gravity without in the apparatus of FIGS. 56 and 60 using distance control mechanism after the saturation of the thermal expansion. Then it is possible to press the ceramic bodies with the pressing mechanism after the termination of the shifting of the distance between the butted planes of the two ceramic bodies 501 and 502. When the ceramic body 501 is heavy, it is possible to control only with the position control mechanism without using the pressing mechanism.

The saturation of thermal expansion is performed only by the pre-heating in the above embodiment but can be performed by the pre-heating and the current supplying when the current supplying is executed before the saturation.

The pre-heating is carried out by using the torch such as a gas burner in the embodiment but can be performed by using other heating method.

The joining method according to the present invention manages a control mechanism not to prevent the two ceramic bodies from moving freely in an axial direction. When the joining agent, ceramic bodies, and jigs perform the thermal expansion, the clamp jig and the structural portion of the control mechanism are free from the strain because the thermal expansion is not suppressed by the jig system. This is an advantage not to damage the jig system and to solve the problem to make the distance control uncertain when the distance control mechanism is used. As a result, a atable current supplying is can be performed without pushing out extremely the melt joining agent between the planes to be jointed during the current supplying and thus a good joined body is obtained.

Further, the joining method according to the present invention has an advantage to perform the more accurate control by making the effect of the thermal expansion as low as possible because the control mechanism is operated after the measurement and completion of saturation of the thermal expansion.

Embodiment 30

Figure 61:
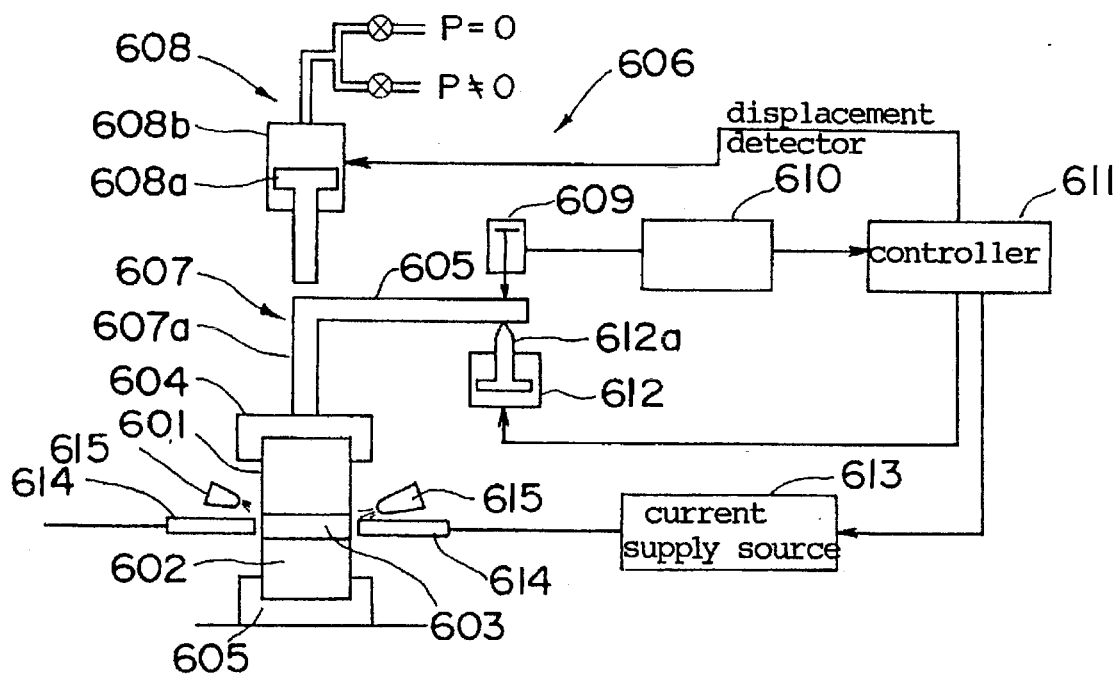
FIG. 61 is an outline drawing of a joining apparatus practicing the joining method according to the embodiment 30.

FIG. 61 is a structural model view of a joining apparatus according to the present invention. Reference numerals 601 and 602 denote ceramic bodies in a pipe form. It is possible to use the ceramic bodies in a type of either an electric conduction or the non conduction. Numeral 603 denotes an solid joining agent in a ring sheet form. The joining agent 603 varies in the composition with the variation in the ceramic body material and is described in detail in the Japanese Patent Publication (examined) 1987-65986 and other Japanese Patent publications. Therefore, the detailed description with the joining agent is omitted. Numerals 604 and 605 are clamp jigs for holding the ceramic bodies 601 and 602, respectively in a vertical direction. The upper clamping jig 604 is provided in a fixed manner with a linking jig or linking member 607 making up a portion of a control mechanism 606. The linking member 607 is composed of a vertical linking portion 607a which moves up and down along with the vertical axis of the ceramic bodies 601 and 602 and a horizontal linking portion 607b extending in a horizontal direction. It is noted that a holding mechanism for holding movably the linking member 607 is omitted. The upper terminal of the vertical linking portion 607a is joined to a plunger rod 608a of a pressing mechanism 608 composed of a liquid cylinder. The liquid supplied to a cylinder room 608b is controlled in such a way that the pressing mechanism 608 works selectively in a way taking either of a pressing state to press the plunger rod 608a or a non-pressing state (P=0) to release the plunger rod 608a to move freely in a vertical axis direction in accordance with a command from the outside. In order to prevent the pressing mechanism 608 from restricting the movement of the ceramic bodies 601 and 602 in a vertical axis direction, it is possible not only to set the pressing mechanism 608 to the non-pressing state (P=0) but also to prevent the plunger rod 608a from being in touch with the vertical linking portion 607a by elevating the plunger rod 608a by a large distance.

The movement of the horizontal linking portion 607b of the linking member 607 is detected by a position sensor 609 such as a differential transformer, and the output power of the position sensor is sent to a displacement detector 610. The position sensor 609 is equipped in a way not to lock the movement of the horizontal linking portion 607b. The displacement detector 610 transforms a displacement amount of the linking member 607 into a signal necessary for a calculation control at a controller 611.

The horizontal linking portion 607b links with a load balance device 612 for balancing apart of the sum W1 of the weight of the ceramic body 601 placed at the upper position and the weight of the clamp jig 604 and the linking portion 607 (external load) with a balance load W2 and transforming the weight of the ceramic body and the external load into a small apparent load. The load balance device 612 transmits the force to the horizontal linking portion 607b through a rod 612a. The load balance device 612 is to generate a balance load to be subtracted from the sum of the weight of the upper ceramic body and the external load and is composed of a liquid cylinder in this embodiment. The supporting structure of the linking member 607 (not shown) is constructed in such a way that when the rod 612a of the load balance device 612 is actuated to move upward, the linking member 607 also receives a force acting upward. It is possible to supply the vertical linking portion 607a with a force acting upward by linking the rod 612a with the horizontal linking portion 607b through a supporting point prepared at the medium point of the horizontal linking portion 607b and by actuating the rod 612a to move downward. The balance load W2 generated from the load balance device 612 is set to a value smaller than the sum W1 of the weight of the ceramic body and the external load against the ceramic body 601 placed at the upper position and the jig system (604, 607). Accordingly, the apparent weight Wo of the ceramic body placed at the upper position is W1–W2. The apparent weight Wo differs with the joint area and is several g per unit area.

A reference numeral 613 is an electric source for supplying an electric current through a electrode 614 to the butted portion composed of the joining agent 603 and the ceramic bodies at the vicinity of the joining agent in accordance with the command from controller 611. A reference numeral 615 is a torch to inject a flame for pre-heating the butted portion. The number and the installing position of the electrode and the torch can be determined in a arbitrary way. It is possible to install the electrode 614 with in the torch 615. In this embodiment, two electrodes 614, 614 are positioned in a way to face to each other against the portion to be jointed and two torches 615, 615 are also positioned in a similar way to face to each other. A relative movement between the two ceramic bodies 601 and 602 and the electrode 614 and the torch 615 can be generated along the portion to be jointed by rotating the electrode 614 and torch 615 around the portion to be jointed.

Figure 62:
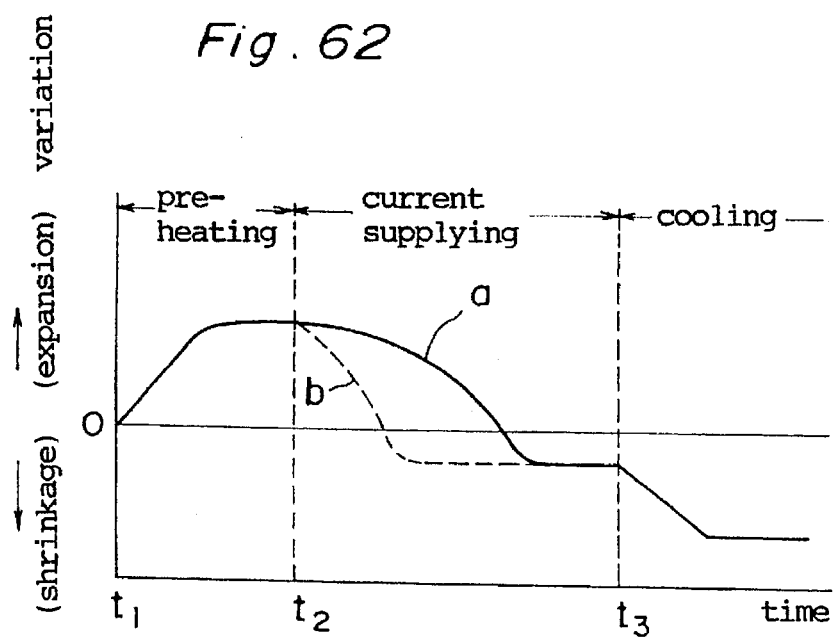
FIG. 62 is graphs showing the displacement curves with a joining method according to the embodiment 30.

Next, the description is directed to a method for joining two ceramic bodies by using an apparatus according to the embodiment shown in FIG. 61. A curve of FIG. 62 is a displacement curve showing the movement of the horizontal linking portion 607b (displacement at the joint layer) and is obtained from the output signal of the displacement detector 610 which has the output signal set to 0 when the pre-heating starts. At a time t1, the pressing mechanism 608 is set by the controller 611 to a release state (P=0) so as to release the two ceramic bodies 601 and 602 from the fixing in an axial direction. The controller 611 commands the load balance device 612 in order to decrease the sum of the ceramic body placed at the upper position and the clamp jig 604 and the linking member 607. The load balance device 612 provides the horizontal linking portion 607b with the balance force in accordance with the command from the controller 611 and decreases the apparent weight of the ceramic body placed at the upper position. Then, the portion to be jointed are pre-heated by the flame injected from the torch 615 until the temperature at the butted portion reaches about 800° C. The pre-heating time is expressed by a time period from t1 to t2. Since the pressing mechanism 608 is in a release state during this time period, the two ceramic bodies 601 and 602, the clamp jig 604, and the linking member 607 are released from being locked with the outside. Therefore, the two ceramic bodies 601 and 602, the joining agent 603, the clamp jig 604, and the linking member 607 are in a position to execute freely the thermal expansion. Accordingly, the displacement detector 610 has the output signal varying in a expansion direction with the time passage of t1 to t2. At the pre-heating stage, the joining agent does not melt. At the same time the displacement detector 610 detects the saturation of the thermal expansion or at t2 after a time passed, the controller 611 sends to the current supplying source 613 a command to supply electric current to the butted portion. After pre-heating, the portion to be supplied current is heated up to a higher temperature and the joining agent melts and shrinks. On the other hand, the two ceramic bodies 601 and 602, the clamp jig 604 and 605, and the linking member 607 continue still the expansion. Even with the continuation of the expansion of the ceramic body 601 and so on, the load balance device 612 is only balancing the load. Hence, the ceramic body placed at the upper position is in the apparent weight Wo and moves down gradually. Finally the movement stops, and the displacement reaches the saturation. During this time, the joining agent 603 melts completely and reacts with the two ceramic bodies sufficiently.

The displacement detector 610 detects the saturation of the displacement amount of the ceramic body 601 and at the same time or at a time $t_3$ after a given time has passed, the controller 611 commands the pressing mechanism 608 to press the ceramic body placed at the upper position against the ceramic body placed at the lower position. As a result, at a time t3, the two ceramic bodies 601 and 602 are pressed in a joined direction. At the same time, the two ceramic bodies complete the joining. The current supplying of the portion to be jointed is terminated just before or after the operation of the pressing mechanism 608 or at the same time of operation of the pressing mechanism 608. In such a way, the two ceramic bodies are brought into a close contact to each other through a thin joining layer and are joined to each other at a high strength upon being cooled.

Two silicon nitride ceramic bodies in a pipe form of an outside diameter 60 mm, an inner diameter 45 mm and a length 100 mm are joined by using a joining agent including, as an electric conductive component, calcium fluoride. The joining agent 603 is applied in an initial thickness of 400 micron. As the sum W1 of the weight of the coated ceramic body 601 placed at the upper position and the external load 1877 g, the load balance W2 caused by the load balance device 612 is set to 1847 g. Accordingly, the apparent weight Wo becomes 30 g. The pre-heating temperature is 800° C. (15 min). The electric current is gradually increased and kept at 0.8 A. The time period between t2 and t3 is about 10 min. The current supplying is stopped at a time $t_3$. The pressing pressure of the pressing mechanism 608 is set to 5 Kg/mm$^2$. At a time t3, the joint layer comes to heve a thinner thickness, for example 20 micron in a thickness. A gas tight test with a helium detector indicates that there is no sample showing the gas leak among 10 test pieces. It is confirmed that the average value of the joint strength is about 300 MPa at a room temperature after a four point bending test with a sample in JIS size.

For a comparison, two ceramic bodies are joined with the same condition as that of the above embodiment except for no use of a load balance device 612. At this time, the shifting curve is in a pattern shown by a curve b of FIG. 62. As shown in a curve b of FIG. 62, when the joining agent starts melting upon initiation of the electric current supplying, the ceramic body placing at the upper position starts rapidly moving down. Then the displacement amount reaches the saturation value at the early stage. When the resultant joint is tried to be cut to a size of the JIS testing sample, the joint is cracked. Then, it is impossible to carry out the bending test for measuring the joint strength. The reason is that the molten joining agent is extruded from the planes to be jointed before the sufficient reaction with the two ceramic bodies.

In the above embodiment, the pressing mechanism 608 executes the pressing operation after the saturation of the displacement amount upon the initiation of electric current supplying. However, it is possible to carry out the pressing operation with the pressing mechanism 608 before the saturation of the displacement amount under a condition after the molten joining agent reacts sufficiently with the two ceramic bodies. The saturation displacement amount means the completion of a sufficient reaction between the joining agent and the two ceramic bodies, which results in the thin joint layer and the resultant sample ensures a joint strength sufficiently high upon cooled after termination of the current supplying.

In the above embodiment, which the load balance device 612 is composed of a liquid cylinder, it is possible to use any type of mechanism capable of balancing the load such as a power increasing mechanism based on a lever principle or a pulley principle.

The method according to the present invention can decrease the apparent weight of the ceramic body placed at the upper position by balancing the weight of the ceramic body and the external load with the balance load even when the ceramic body placed at the upper position and the external load is heavy. Therefore, in a joining method to move downward the ceramic body placed at the upper position by the gravity action, it is possible to move downward the ceramic body placed at the upper position in accordance with the shrinkage of the molten joining agent under executing the reaction between the molten joining agent and the two ceramic bodies only by changing the balance load in accordance with the weight of the ceramic body placed at the upper position.

A method according to the present invention is to press the ceramic body placed at the upper position against the ceramic body placed at the lower position at the final joining step. Therefore, this method is capable of forming the joint layer in a high density by expelling the gas included in the joint layer and of correcting the inclined plane between the two ceramic bodies at the upper and lower positions.

The method according to the present invention is to prevent the excessive electric current supplying by terminating the current supplying upon detection of the saturation of the displacement amount.

Embodiment 31

Figure 63:
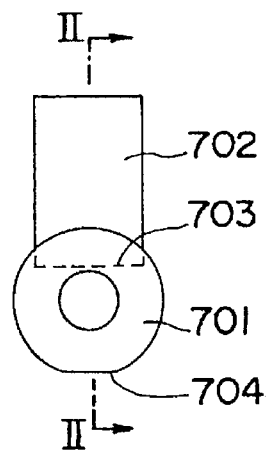
FIG. 63 is a side view of a ceramic pipe joint obtained with the embodiment 31.
Figure 64:
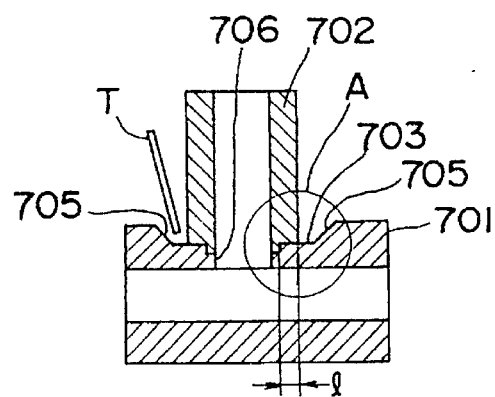
FIG. 64 is a cross sectional view at II—II line of FIG. 63.
Figure 65:
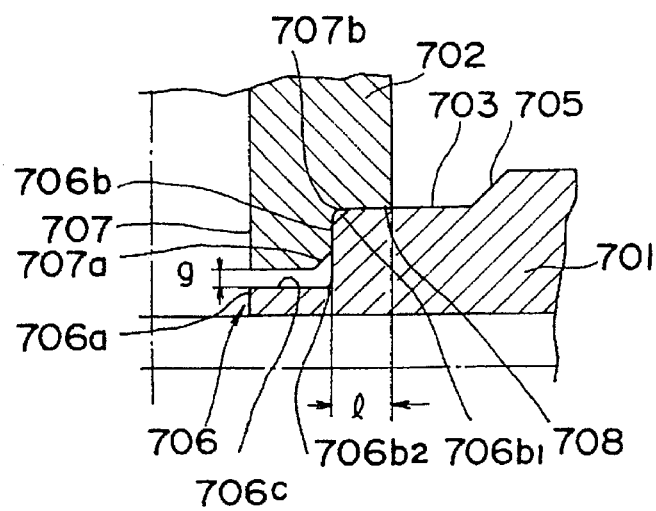
FIG. 65 is a portionial enlargement of FIG. 64.

FIG. 63 is a side view of a T-joint manufactured by the electric joining method according to the present invention. FIG. 64 is a cross sectional view obtained by cutting at II—II line of FIG. 63. FIG. 65 is an enlargement of a portion shown by a circle in FIG. 64. The T-joint of a ceramic pipe is used not only for a joint but also for a housing of valve. A reference numeral 701 denoted a first ceramic pipe for making up a main path member subjected to a planer work at the outside periphery and a reference numeral 702 denotes a second ceramic pipe for making up a blanch path member connected to the first ceramic pipe. It is noted that the ceramic pipe is composed of a silicon nitride ceramic or syalon.

The first ceramic pipe 701 has a flat plane 703 for forming a butted plane at the outside periphery thereof. In a case of formation of the flat plane 703, a ceramic pipe is provided with a reference working plane 704. The reference working plane 704 is prepared for preventing the ceramic pipe 701 from rolling. The flat plane 703 can be formed by shaving the outside periphery with a NC working machine under fixing the ceramic pipe 701 at the reference working plane 704 on a working desk. The both terminals of the flat plane 703 in an axial direction have tapers 705 for causing a joining torch T to enter easily. Next, the flat plane 703 has a through hole formed therethrough by a drill. The through hole 706 is composed of a hole having a small diameter 706a and a hole 706b having a large diameter. The large hole 706b and a ring flat plane 706c make up a stair engagement. A corner 706b1 positioned at the opening of the large hole 706b is tapered. A corner 706b2 between the another terminal of the large hole 706b and the ring flat plane is made curved.

Next, the second pipe is described. A ceramic pipe is shaved at one terminal in a axial line through all periphery and has a convex cylinder 707 and a butted plane 708 formed thereon. The size l in a radius direction is set to a relatively larger value in order to achieve a sufficiently high strength at the joint portion when the ceramic pipes are joined electrically. For example, it is preferable to make the size l more than 4 mm with a second ceramic pipe of an outside diameter 30 mm and an inside diameter 16 mm. The terminal 707a at the outside of the radius direction of the convex portion 707 is tapered at a given angle and the corner 707b at the base portion is curved. In such a way, the formation of the taper (706b1, 707a) and the curve (706b2, 707b) releases the generation of the concentration of stress at the corner during the solidification of the joining agent at a joining step and prevents the ceramic pipe from cracking. The taper and the curve are also useful for preventing the ceramic pipe from cracking during the handling and the heating.

A gap g is formed between the ring flat plane 706c and the terminal plane at the convex portion 707 under the engagement between the large hole 706b and the convex portion 707 constructing the stair engagement. When the joining agent melts and shrinks in the volume, the gap g is to execute a function to prevent the generation of poor joints by decreasing the distance between the butted planes of the two ceramic pipes in accordance with the melting and the volume shrinkage of the joining agent. The size tolerance of the large hole 707b and the convex portion 707 must be made a value to permit both to move smoothly even when the ceramic pipes 701 and 702 generate the difference in the thermal expansion due to the temperature difference. As a practical matter, the clearance after the thermal expansion is set to a value of a gap caulking (H7 and f6 relation) in a common use.

In order to suppress the degradation of the joining strength obtained with an electric joining method, it is preferable that the flat plane 703 and the butted plane 708 have a surface roughness less than 10 S. This embodiment uses about 2 S.

Next, the following description is directed to a working step under inserting the joining agent between the flat plane 703 and the butted plane 708.

The electric joining can be carried out by the joining method type A, which comprises following steps of inserting a joining agent between the large flat plane 703 of a first ceramic pipe 701 and the butted plane 708 to be jointed of the second ceramic pipe, pre-heating the butted portion with the flame from the joining torch T approaching close thereto, heating the joining agent with the Joule heat caused by supplying current to a high temperature for short time to melt the joining agent and then joining strongly the ceramic bodies.

Figure 66:
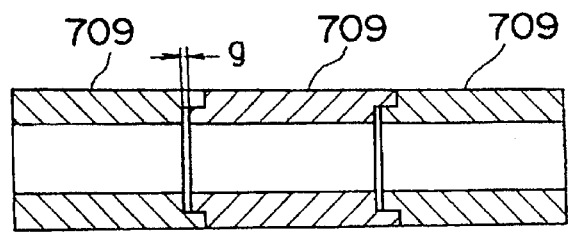
FIG. 66 is a cross sectional view of a ceramic pipe in a long size.

When a ceramic pipe in a long size, a plurality of short ceramic pipes 709 are combined to each other as shown in FIG. 66. The gap g is formed necessarily when plurality of ceramic pipes are combined to each other.

In the above embodiment, the joining process is carried out by an electric joining method type A but the other types are applicable. Further it is possible to use a conventional furnace heating method to heat the joining agent in a furnace and carry out the joining process.

The ceramic joint which can be manufactured by the method according to the present invention is not limited to the T-joint in the above embodiment. Y-joint, a cross joint or any other ceramic joint can be manufactured by the method according to the present invention.

As explained clearly above, the joining method according to the present invention is to form a flat plane on the outside periphery of a first ceramic pipe with a planer working and can join the first ceramic pipe and the second ceramic pipe at the flat portion to enable the complicated joint manufacturing at a low cost and a short time. Further it is possible to reduce the size error in the distance between the butted planes to be jointed and to obtain the sufficiently high joining strength according to the joining method according to the present invention.

The joining method according to the present invention comprises the steps of forming a stair engagement portion at the terminal of the flat plane side of the through hole and forming engagement convex portion which is engaged with the stair engagement at the terminal where the butted plane of the second ceramic pipe is formed. Accordingly, this method makes it easy to determine the position of the two ceramic pipes when the joining agent is inserted between the two ceramic pipes. The stair engagement and the engagement convex portion are formed in a way that the gap is formed between the stair engagement and the engagement convex portion under a state to engage the stair engagement with the engagement convex portion. Therefore, when the joining agent shrinks upon solidification thereof, it is possible to decrease the distance between the butted planes of the two ceramic pipes in accordance with the shrinkage. As a result, there is no generation of poor joint.

A formation of a large flat plane makes it possible to arrange the joining torch at the most suitable position and to ensure the good joint with the electric joining method.

[Joining Agent For Use in Silicon Nitride Ceramic]

In the following embodiments, a joining agent is a mixture of various powders in a given mixing ratio and is of a paste form incorporated with organic binder solved in a solvent such as acetone or toluene.

A test piece for strength test (bending test) is prepared by making jointed silicon nitride ceramic body obtained by joining two silicon nitride square bars in a size of 15 mm×15 mm×20 mm with the joining agent. A ceramic square bar in a size of 3 mm×4 mm×40 mm (JIS size) is obtained by cutting the jointed ceramic bodies. The used joining agent is in an amount of 50 mg/cm². The strength test is carried out with the test piece in a JIS form at the following condition by using a four points bending test: An upper span is 10 mm, and a lower span is 30 mm. The loading rate is 0.5 mm/min. The testing result is shown by the average value Mpa (mega pascal) obtained with 10 testing pieces subjected to the four points bending test.

The electric joining method is carried out at the following condition: The pre-heating is carried out up to a temperature of 800° to 900° C. with a mixing gas of propane and oxygen. The flowing electric current through the joining agent is 0.6 to 1 A. The electrode is moved at a rate of 5 cm/min to heat all of the joining agent. In the following embodiment, the table showing experimental data is described in a collection manner after description of the invention.

Embodiment 32

In order to confirm the effect of the joining agent shown by claim 25, the joining agent in a composition of $CaF_2$ and $Al_2O_3$ in a mixing ratio shown in Table 1 is tested with the joint strength at room temperature and at 1000° C. The joining agent including 10 to 40 weight % of $Caf_2$, 60 to 90 weight % of $Al_2O_3$ (range attached with a symbol *) shows the strength higher than 210 MPa at a temperature range of room temperature to 1000° C.

The joining agent in a composition of $CaF_2$, $Al_2O_3$ and $SiO_2$ in a mixing ratio shown in Table 2 is tested with the joint strength at room temperature and at 1000° C. The joining agent including 10 to 40 weight % of $Caf_2$, more than 10 weight % of $Al_2O_3$ and more than 10 weight % of $SiO_2$ shows the strength higher than 250 MPa at a temperature range of room temperature to 1000° C.

Embodiment 33

In order to confirm the effect of the joining agent of claim 26, the joining agent in a composition of $CaF_2$, $Al_2O_3$ and $Y_2O_3$ in a mixing ratio shown in Table 3 is tested with the joint strength at room temperature and at 1000° C. The joining agent including 10 to 40 weight % of $Caf_2$, more than 10 weight % of $Al_2O_3$ and 10 to 55 weight % of $Y_2O_3$ shows the strength higher than 300 MPa at a temperature range of room temperature to 1000° C.

The joining agent in a composition of $CaF_2$, $Al_2O_3$, $SiO_2$ and $Y_2O_3$ in a mixing ratio shown in Table 4-1 to 4-3 is tested with the joint strength at room temperature and at 1000° C. The joining agent including 10 to 40 weight % of $Caf_2$, more than 10 weight % of $Al_2O_3$, 10 weight % $SiO_2$ and 10 to 55 weight % of $Y_2O_3$ shows the strength higher than 350 MPa at a temperature range of room temperature to 1000° C.

Embodiment 34

In order to confirm the effect of the joining of claim 27, the joining agent in a composition of $CaF_2$, $Al_2O_3$, and $Si_3N_4$ in a mixing ratio shown in Table 5 is tested with the joint strength at room temperature and at 1000° C. The joining agent including 10 to 40 weight % of $CaF_2$, 15 to 45 weight % of $Si_3N_4$ and the residual of $Al_2O_3$ shows the strength higher than 300 MPa at a temperature range of room temperature to 1000° C.

The joining agent in a composition of $CaF_2$, $Al_2O_3$, $SiO_2$ and $Si_3N_4$ in a mixing ratio shown in Table 6-1 to 6-3 is tested with the joint strength at room temperature and at 1000° C. The joining agent including 10 to 40 weight % of $CaF_2$, more than 10 weight % of $Al_2O_3$, more than 10 weight % of $SiO_2$ and 15 to 45 weight % of $Si_3N_4$ shows the strength higher than 350 MPa at a temperature range of room temperature to 1000° C.

Embodiment 35

In order to confirm the effect of the joining agent of claim 28, the joining agent in a composition of 30 weight % of CaF$_2$, 20 weight % of Al$_2$O$_3$, 25 weight % of Y$_2$O$_3$ and 25 weight % of Si$_3$N$_4$ is tested with the joint strength at room temperature and at 1000° C. The strength at room temperature is 425 MPa and the strength at 1000° C. is 422 MPa.

The joining agent in a composition of 30 weight % of CaF$_2$, 15 weight % of Al$_2$O$_3$, 15 weight % of SiO$_2$, 20 weight % of Y$_2$O$_3$ and 20 weight % of Si$_3$N$_4$ is tested with the joint strength at room temperature and at 1000° C. The strength at room temperature is 465 MPa and the strength at 1000° C. is as high as 470 MPa.

TABLE 1

| Samples | CaF$_2$ | Al$_2$O$_3$ | Room Temp | 1000° C. |
|---|---|---|---|---|
| *1 | 0 | 100 | — | — |
| 2 | 5 | 95 | 92 | 101 |
| *3 | 10 | 90 | 230 | 228 |
| *4 | 20 | 80 | 259 | 262 |
| *5 | 30 | 70 | 283 | 288 |
| *6 | 40 | 60 | 265 | 212 |
| 7 | 45 | 55 | 259 | 137 |
| 8 | 50 | 50 | 244 | 71 |

TABLE 2

| Samples | CaF$_2$ | Al$_2$O$_3$ | SiO$_2$ | Room Temp | 1000° C. |
|---|---|---|---|---|---|
| 1 | 5 | 10 | 85 | 35 | 54 |
| 2 | 5 | 50 | 45 | 61 | 55 |
| 3 | 5 | 85 | 10 | 27 | 19 |
| 4 | 10 | 5 | 85 | 251 | 213 |
| *5 | 10 | 10 | 80 | 262 | 258 |
| *6 | 10 | 45 | 45 | 266 | 271 |
| *7 | 10 | 80 | 10 | 259 | 258 |
| 8 | 10 | 85 | 5 | 208 | 214 |
| 9 | 30 | 5 | 65 | 289 | 230 |
| *10 | 30 | 10 | 60 | 305 | 275 |
| *11 | 30 | 35 | 35 | 319 | 333 |
| *12 | 30 | 60 | 10 | 298 | 296 |
| 13 | 30 | 65 | 5 | 238 | 244 |
| 14 | 40 | 5 | 55 | 263 | 203 |
| *15 | 40 | 10 | 50 | 267 | 255 |
| *16 | 40 | 30 | 30 | 289 | 293 |
| *17 | 40 | 50 | 10 | 301 | 262 |
| 18 | 40 | 55 | 5 | 263 | 219 |
| 19 | 45 | 10 | 45 | 278 | 192 |
| 20 | 45 | 25 | 30 | 290 | 195 |
| 21 | 45 | 45 | 10 | 259 | 135 |

TABLE 4-3

| Sample | CaF$_2$ | Al$_2$O$_3$ | SiO$_2$ | Y$_2$O$_3$ | Room Temp | 1000° C. |
|---|---|---|---|---|---|---|
| 1 | 40 | 5 | 10 | 45 | 328 | 300 |
| 2 | 40 | 5 | 25 | 30 | 351 | 282 |
| 3 | 40 | 5 | 45 | 10 | 343 | 275 |
| 4 | 40 | 10 | 5 | 45 | 339 | 351 |
| *5 | 40 | 10 | 10 | 40 | 370 | 354 |
| *6 | 40 | 10 | 25 | 25 | 366 | 354 |
| *7 | 40 | 10 | 40 | 10 | 358 | 362 |
| 8 | 40 | 10 | 45 | 5 | 345 | 322 |
| 9 | 40 | 25 | 5 | 30 | 333 | 319 |
| *10 | 40 | 25 | 10 | 25 | 381 | 358 |
| *11 | 40 | 25 | 20 | 15 | 379 | 380 |
| *12 | 40 | 25 | 25 | 10 | 368 | 363 |
| 13 | 40 | 25 | 30 | 5 | 328 | 332 |
| *14 | 40 | 40 | 10 | 10 | 367 | 353 |
| 15 | 40 | 45 | 5 | 10 | 309 | 303 |
| 16 | 40 | 45 | 10 | 5 | 313 | 321 |

TABLE 5

| Sample | CaF$_2$ | Al$_2$O$_3$ | Si$_3$N$_4$ | Room Temp | 1000° C. |
|---|---|---|---|---|---|
| 1 | 5 | 80 | 15 | 29 | 54 |
| 2 | 5 | 65 | 30 | 57 | 52 |
| 3 | 5 | 50 | 45 | 36 | 23 |
| 4 | 10 | 80 | 10 | 245 | 258 |
| *5 | 10 | 75 | 15 | 310 | 313 |
| *6 | 10 | 60 | 30 | 316 | 323 |
| *7 | 10 | 45 | 45 | 304 | 306 |
| 8 | 10 | 40 | 50 | 284 | 288 |
| *9 | 20 | 65 | 15 | 315 | 320 |
| *10 | 20 | 50 | 30 | 329 | 339 |
| 11 | 20 | 30 | 50 | 260 | 272 |
| 12 | 30 | 60 | 10 | 289 | 276 |
| *13 | 30 | 40 | 30 | 337 | 341 |
| *14 | 30 | 25 | 45 | 318 | 319 |
| 15 | 40 | 50 | 10 | 306 | 222 |
| *16 | 40 | 45 | 15 | 325 | 320 |
| *17 | 40 | 30 | 30 | 323 | 305 |
| *18 | 40 | 15 | 45 | 329 | 311 |
| 19 | 40 | 10 | 50 | 202 | 219 |
| 20 | 45 | 40 | 15 | 269 | 108 |
| 21 | 45 | 25 | 30 | 321 | 133 |
| 22 | 45 | 10 | 45 | 303 | 135 |

TABLE 6-1

| Sample | CaF$_2$ | Al$_2$O$_3$ | SiO$_2$ | Si$_3$N$_4$ | Room Temp | 1000° C. |
|---|---|---|---|---|---|---|
| 1 | 10 | 5 | 70 | 15 | 340 | 316 |
| 2 | 10 | 5 | 50 | 35 | 352 | 310 |
| 3 | 10 | 5 | 35 | 50 | 315 | 312 |
| 4 | 10 | 10 | 70 | 10 | 321 | 304 |
| *5 | 10 | 10 | 65 | 15 | 366 | 358 |
| *6 | 10 | 10 | 45 | 35 | 355 | 360 |
| *7 | 10 | 10 | 20 | 50 | 362 | 361 |
| 8 | 10 | 10 | 25 | 55 | 265 | 259 |
| *9 | 10 | 20 | 20 | 50 | 357 | 366 |
| 10 | 10 | 20 | 15 | 55 | 254 | 262 |
| 11 | 10 | 25 | 10 | 55 | 239 | 244 |
| 12 | 10 | 30 | 50 | 10 | 335 | 314 |
| *13 | 10 | 30 | 45 | 15 | 368 | 370 |
| *14 | 10 | 30 | 25 | 35 | 378 | 369 |
| *15 | 10 | 30 | 10 | 50 | 355 | 361 |
| 16 | 10 | 35 | 5 | 50 | 323 | 334 |
| *17 | 10 | 50 | 20 | 20 | 365 | 362 |
| *18 | 10 | 50 | 10 | 30 | 359 | 362 |
| 19 | 10 | 50 | 5 | 35 | 340 | 351 |
| *20 | 10 | 65 | 10 | 15 | 358 | 355 |
| 21 | 10 | 70 | 10 | 10 | 320 | 313 |
| 22 | 10 | 70 | 5 | 15 | 302 | 316 |

TABLE 6-2

| Sample | CaF$_2$ | Al$_2$O$_3$ | SiO$_2$ | Si$_3$N$_4$ | Room Temp | 1000° C. |
|---|---|---|---|---|---|---|
| 1 | 30 | 5 | 50 | 15 | 343 | 299 |
| 2 | 30 | 5 | 35 | 30 | 352 | 316 |
| 3 | 30 | 5 | 20 | 45 | 333 | 304 |
| 4 | 30 | 10 | 50 | 10 | 325 | 313 |
| *5 | 30 | 10 | 45 | 15 | 370 | 370 |
| *6 | 30 | 10 | 30 | 30 | 367 | 358 |
| *7 | 30 | 10 | 15 | 45 | 359 | 365 |
| 8 | 30 | 10 | 10 | 50 | 258 | 243 |
| *9 | 30 | 15 | 10 | 45 | 360 | 358 |
| 10 | 20 | 20 | 5 | 45 | 303 | 300 |
| 11 | 30 | 30 | 30 | 10 | 321 | 304 |
| *12 | 30 | 30 | 25 | 15 | 376 | 378 |
| *13 | 30 | 30 | 20 | 20 | 282 | 373 |
| *14 | 30 | 30 | 10 | 30 | 380 | 377 |
| 15 | 30 | 30 | 5 | 35 | 310 | 306 |
| *16 | 30 | 45 | 10 | 15 | 365 | 368 |

TABLE 6-2-continued

| Sample | CaF₂ | Al₂O₃ | SiO₂ | Si₃N₄ | Room Temp | 1000° C. |
|---|---|---|---|---|---|---|
| 17 | 30 | 50 | 10 | 10 | 325 | 331 |
| 18 | 30 | 50 | 5 | 15 | 330 | 323 |

TABLE 6-3

| Sample | CaF₂ | Al₂O₃ | SiO₂ | Si₃N₄ | Room Temp | 1000° C. |
|---|---|---|---|---|---|---|
| 1 | 40 | 5 | 40 | 15 | 344 | 308 |
| 2 | 40 | 5 | 25 | 30 | 352 | 327 |
| 3 | 40 | 5 | 10 | 45 | 355 | 310 |
| 4 | 40 | 10 | 40 | 10 | 343 | 306 |
| *5 | 40 | 10 | 35 | 15 | 364 | 366 |
| *6 | 40 | 10 | 20 | 30 | 383 | 373 |
| *7 | 40 | 10 | 10 | 40 | 360 | 359 |
| 8 | 40 | 10 | 5 | 45 | 327 | 339 |
| 9 | 40 | 25 | 25 | 10 | 354 | 322 |
| *10 | 40 | 25 | 20 | 15 | 354 | 351 |
| *11 | 40 | 25 | 15 | 20 | 374 | 350 |
| *12 | 40 | 25 | 10 | 25 | 362 | 355 |
| 13 | 40 | 25 | 5 | 30 | 341 | 339 |
| *14 | 40 | 35 | 10 | 15 | 359 | 355 |
| 15 | 40 | 40 | 10 | 10 | 323 | 308 |
| 16 | 40 | 40 | 5 | 15 | 383 | 315 |

The joining agent of the above embodiment is applied for the silicon nitride ceramics having a high heat resistance. However, the joining agent according to the present invention is applicable for a silicon nitride system ceramics including a silicon nitride component such as syaron ceramics.

Further, the joining agent according to the present invention can be prepared by using the compound of alumina and silica such as kaolinite ($Al_2O_3 \cdot 2SiO_2 \cdot 2H_2O$) and mullite ($3Al_2O_3 \cdot 2SiO_2$) in place of a mixture of individual alumina and silica.

In such a way, the joining agent according to the present invention includes, as an electric conductive component, $CaF_2$ and achieves the joint strength practically usable at high temperature and is very suitable for joining the ceramic body having a high heat resistance.

[Joining Agent For Use in Oxide System Ceramic]

In the following embodiments, a joining agent is a mixture of various powders in a given mixing ratio and is of a paste form incorporated with organic binder solved in a solvent such as acetone or toluene. A test piece for strength test (bending test) is prepared by making jointed silicon nitride ceramic body obtained by joining two silicon nitride square bars in a size of 15 mm×15 mm×20 mm with the joining agent. A ceramic square bar in a size of 3 mm×4 mm×40 mm (JIS size) is obtained by cutting the jointed ceramic bodies. The used joining agent is in an amount of 50 mg/cm². The strength test is carried out with the test piece in a JIS format the following condition by using a four points bending test: An upper span is 10 mm, and a lower span is 30 mm. The loading rate is 0.5 mm/min. The testing result is shown by the average value Mpa (mega pascal) obtained with 10 testing pieces subjected to the four points bending test.

The electric joining method is carried out at the following condition: The pre-heating is carried out up to a temperature of 850° to 900° C. with a mixing gas of propane and oxygen. The flowing electric current through the joining agent is 0.3 to 2 A, the whole of the butted portion to be jointed is heated. In the following embodiment, the table showing experimental data is described in a collecting manner after description of the invention.

Embodiment 36

The joining agent in a composition of NaF, $Al_2O_3$ and $SiO_2$ in a mixing ratio shown in Table 7 is tested with the joint strength at room temperature and at 600° C. The joining agent including 5 to 20 weight % of Naf, 20 to 60 weight % of $Al_2O_3$ and 30 to 70 weight % of $SiO_2$ shows the strength higher than 150 MPa at a temperature range of room temperature to 600° C.

The joining agent in a composition of NaF, $Al_2O_3$, $SiO_2$ and MgO is tested with the joint strength at room temperature and at 600° C. The joining agent including 5 to 20 weight % of Naf, 20 to 60 weight % of $Al_2O_3$, 30 to 70 weight % of $SiO_2$ and 2.5 to 10 weight % of MgO, and exhibited a strength higher than 230 MPa at a temperature range of room temperature to 600° C.

Table 9 indicates the test result that the composition having a further additives $Y_2O_3$ and $TiO_2$ is tested with the joint strength at room temperature and 600° C.

TABLE 7

| Sample | NaF | Al₂O₃ | SiO₂ | Room Temp | 600° C. |
|---|---|---|---|---|---|
| 1 | 50 | 20 | 30 | — | — |
| 2 | 30 | 40 | 30 | 165 | 98 |
| 3 | 30 | 20 | 50 | 172 | 74 |
| 4 | 20 | 60 | 20 | 158 | 131 |
| *5 | 20 | 50 | 30 | 227 | 157 |
| *6 | 20 | 30 | 50 | 221 | 163 |
| *7 | 20 | 20 | 60 | 223 | 151 |
| 8 | 20 | 10 | 70 | 196 | 119 |
| 9 | 10 | 70 | 20 | — | — |
| *10 | 10 | 60 | 30 | 238 | 210 |
| *11 | 10 | 40 | 50 | 226 | 206 |
| *12 | 10 | 20 | 70 | 229 | 151 |
| 13 | 10 | 10 | 80 | 212 | 108 |
| 14 | 5 | 65 | 30 | 153 | 162 |
| *15 | 5 | 60 | 35 | 233 | 213 |
| *16 | 5 | 42 | 53 | 235 | 202 |
| *17 | 5 | 25 | 70 | 216 | 162 |
| 18 | 5 | 20 | 75 | 201 | 113 |
| 19 | 3 | 60 | 37 | — | — |
| 20 | 3 | 47 | 50 | 38 | 42 |
| 21 | 3 | 27 | 70 | — | — |

TABLE 9

| Sample | NaF | Al₂O₃ | SiO₃ | MgO | Y₂O₃ | TiO₂ | Room Temp | 600° C. |
|---|---|---|---|---|---|---|---|---|
| 1 | 10 | 45 | 40 | 5 | 2.5 | 2.5 | 292 | 242 |
| 2 | 10 | 35 | 45 | 2.5 | 2.5 | 5 | 288 | 246 |
| 3 | 10 | 30 | 50 | 5 | 2.5 | 2.5 | 285 | 236 |
| 4 | 10 | 36 | 46.5 | — | 7.5 | — | 284 | 243 |
| 5 | 10 | 38.3 | 49 | — | — | 2.5 | 279 | 238 |

The above embodiment uses, as an oxide ceramic body, aluminum oxide but the joining agent according to the present invention is applicable for an oxide ceramic such as mullite and $ZrO_2$.

Further, the joining agent according to the present invention can be prepared by using the compound of alumina and silica such as kaolinite ($Al_2O_3 \cdot 2SiO_2 \cdot 2H_2O$) and mullite ($3Al_2O_3 \cdot 2SiO_2$) in place of a mixture of individual alumina and silica.

In order to give the joining agent according to the present invention another effect or improved effect, it is possible to add the various additives into the joining agent according to the present invention. For example, the joining agent according to the present invention can have nitride such as $Si_3N_4$ or AlN and carbide such as SiC or TiN incorporated therein in order to include N or C in the glass of the joint layer. Various properties of the joint layer are improved by the formation of oxynitride glass or oxycarbide glass.

The present invention can provide a joining agent suitable for joining the oxide ceramic by using, as a electric conducive component, NaF. The joining agent according to the present invention does not impair the ceramic body and ensures the excellent sealing property and the joint strength at room temperate to a high temperature, which is practically usable.

[Joining Agent Using a Fluoride of a Third Element]

Embodiment 37

A joining agent used is composed of a mixture of 60 weight % of $YF_3$, 20 weight % of $Al_2O_3$ and 20 weight % of $SiO_2$.

A test piece for strength test is prepared by the jointed silicon nitride ceramic body obtained by joining two silicon nitride ceramic square bars in a size of 15 mm×15 mm×20 mm with the joining agent in an amount of 50 mg/cm². The silicon nitride ceramic bodies with the joining agent is heated by an electric current of 0.6 to 1.0 A for 5 to 10 min under moving the electrode at a rate of 5 cm/min.

A ceramic square bar in a size of 3 mm×4 mm×40 mm is obtained by cutting the jointed ceramic bodies. The strength test is carried out with the test piece at the following condition by using a three points bending test: A span is 30 mm, and the loading rate is 0.5 mm/min. The testing result is shown by the average value Mpa (mega pascal) obtained with three testing pieces. The resultant strength is 420 Mpa at room temperature and is kept nearly to 420 MPa at 1050° C. as shown in Table 10.

TABLE 10

| Main Ingredient | Room Temperature | 1000° C. | Unit: MPa 1050° C. |
|---|---|---|---|
| (Conventional) CaF—$Al_2O_3$—$SiO_2$ | 400 | 350 | 35 |
| (Invention) $Y_2O_3$—$Al_2O_3$—$SiO_2$ | 421 | 419 | 413 |

Embodiment 38

A joining agent used here is composed of a mixture of 50 weight % of $ScF_3$, 25 weight % of $Al_2O_3$ and 25 weight % of $SiO_2$. Two ceramic bodies are jointed by using the above joining agent and is tested with the jointed strength in a similar way to that of the embodiment 37. As shown in Table 11, the strength is 416 MPa at a temperature from room temperature to 1050° C.

TABLE 11

| Main Ingredient | Room Temperature | 1000° C. | Unit: MPa 1050° C. |
|---|---|---|---|
| (Conventional) CaF—$Al_2O_3$—$SiO_2$ | 400 | 350 | 35 |
| (Invention) $ScF_3$—$Al_2O_3$—$SiO_2$ | 421 | 419 | 413 |

The joining agent according to the present invention is applicable for an oxide ceramic such as $Al_2O_3$ and $ZrO_2$ and non-oxide ceramic such as syaron in addition to $Si_3N_4$.

Further, the joining agent according to the present invention can be prepared by using the compound of alumina and silica such as kaolinite ($Al_2O_3 \cdot 2SiO_2 \cdot 2H_2O$) and mullite ($3Al_2O_3 \cdot 2SiO_2$) in place of a mixture of individual alumina and silica.

In order to give the joining agent according to the present invention another effect or improved effect, it is possible to add the various additives besides the third group element fluoride and $Al_2O_3$, $SiO_2$ into the joining agent according to the present invention. For example, the joining agent according to the present invention can have nitride such as $Si_3N_4$ or AlN and carbide such as SiC or TiN incorporated therein in order to include N or C in the glass of the joint layer. Various properties of the joint layer are improved by the formation of oxynitride glass or oxycarbide glass.

The joining agent according to the present invention comprises, as a main ingredient, $YF_3$ or the combination of $YF_3$ and at least one element selected from the group consisting of $Al_2O_3$ and $SiO_2$. The joint strength, especially at high temperature, and the corrosion resistance to alkali or acid are extremely improved by using the joining agent according to the present invention.

What is claimed is:

1. A method for joining two ceramic bodies comprising the steps of; inserting a joining agent between the butted planes to be jointed of the two ceramic bodies; pre-heating said joining agent and the vicinity including a portion of said two ceramic bodies; melting said joining agent by supplying current to said butted portion to be jointed; causing the molten joining agent to react with said two ceramic bodies by using at least one distance control mechanism for controlling the distance between the said butted planes to be jointed of said two ceramic bodies, and a pressing mechanism for pressing said two ceramic bodies in a joining direction, wherein to prevent restricting the movement of the two ceramic bodies in a vertical direction by the pressing mechanism, said two ceramic bodies are free from displacement in their axial direction by said control mechanism until said control mechanism starts controlling operation.

2. A method for joining two ceramic bodies according to claim 1, wherein said controlling mechanism starts the controlling operation of said two ceramic bodies after detection of the saturated thermal expansion upon detecting whether or not the thermal expansion of said joining agent and said two ceramic bodies reaches the saturation value.

3. A method for joining two ceramic bodies arranged in a vertical direction comprising the steps of; inserting a joining agent between the butted planes to be jointed of the two ceramic bodies; pre-heating said joining agent and the vicinity including a part of said two ceramic bodies; melting said joining agent by supplying current to said butted portion to be jointed; and joining said two ceramic bodies by lowering the ceramic body placed at the upper position under its own weight and by an external load applied to the upper ceramic body after the displacement of the upper ceramic body is saturated after supplying the current thereto, wherein a sum of the weight of said upper ceramic body and a part of said external load is transformed into a small load by balancing the sum with a balance load.

4. A method for joining two ceramic bodies arranged in a vertical direction according to claim 3, wherein said upper ceramic body is pressed against the lower ceramic body after the upper ceramic body moves down at a given position.

5. A method for joining two ceramic bodies arranged in a vertical direction according to claim 3, wherein a position detector detects the displacement of the upper ceramic body after the initiation of the current supplying, and the current supplying process is stopped after detection of the saturated displacement of the upper ceramic body.

* * * * *

UNITED STATES PATENT AND TRADEMARK OFFICE
CERTIFICATE OF CORRECTION

PATENT NO. : 5,639,322

DATED : June 17, 1997

INVENTOR(S) : Kouji Okuda, et al.

It is certified that error appears in the above-identified patent and that said Letters Patent is hereby corrected as shown below:

On the Title Page, Section [62]: "PCT/JP91/00561" should read --PCT/JP91/00560--

On the Title Page, Section [56], under "FOREIGN PATENT DOCUMENTS", insert the following: --0,362,217 7/62 Germany--

Column 1, line 8, insert the following as a new paragraph: --The present invention concerns a joining method for joining electrically ceramic bodies and a joining apparatus and joining agent for use in the joining method.--

Column 2, line 5: delete "to be heated"

Column 25, line 22: "51d,51h---51b" should read --51d, ...,51h--51b--

Column 42, line 35: "rated" should read --varing--

Signed and Sealed this

Twentieth Day of July, 1999

Attest:

Q. TODD DICKINSON

Attesting Officer

Acting Commissioner of Patents and Trademarks